United States Patent
Jakobsson

(10) Patent No.: US 11,323,464 B2
(45) Date of Patent: May 3, 2022

(54) ARTIFACT MODIFICATION AND ASSOCIATED ABUSE DETECTION

(71) Applicant: RightQuestion LLC, Portola Valley, CA (US)

(72) Inventor: Bjorn Markus Jakobsson, Portola Valley, CA (US)

(73) Assignee: RightQuestion, LLC, Portola Valley, CA (US)

( * ) Notice: Subject to any disclaimer, the term of this patent is extended or adjusted under 35 U.S.C. 154(b) by 169 days.

(21) Appl. No.: 16/530,037

(22) Filed: Aug. 2, 2019

(65) Prior Publication Data

US 2020/0053111 A1  Feb. 13, 2020

Related U.S. Application Data

(60) Provisional application No. 62/716,073, filed on Aug. 8, 2018.

(51) Int. Cl.
*H04L 29/06* (2006.01)

(52) U.S. Cl.
CPC ...... *H04L 63/1425* (2013.01); *H04L 63/0428* (2013.01); *H04L 63/102* (2013.01); *H04L 63/1416* (2013.01); *H04L 63/30* (2013.01)

(58) Field of Classification Search
None
See application file for complete search history.

(56) References Cited

U.S. PATENT DOCUMENTS

| 8,533,350 B2 | 9/2013 | Jakobsson et al. |
| 8,549,641 B2 | 10/2013 | Jakobsson |
| 8,839,369 B1 | 9/2014 | Dai et al. |
| 8,930,549 B1 | 1/2015 | Jakobsson et al. |
| 9,294,452 B1 | 3/2016 | Jakobsson |
| 9,686,308 B1 * | 6/2017 | Srivastava ........... G06Q 10/107 |

(Continued)

FOREIGN PATENT DOCUMENTS

GB  2514328 A  11/2014

OTHER PUBLICATIONS

A. Juels et al., "Cache Cookies for Browser Authentication," 2006 IEEE Symposium on Security and Privacy, May 21-24, 2006, 15 pages.

(Continued)

*Primary Examiner* — Brandon S Hoffman
(74) *Attorney, Agent, or Firm* — Ryan, Mason & Lewis, LLP

(57) ABSTRACT

An apparatus comprises at least one processing device comprising a processor coupled to a memory. The processing device is configured to identify artifacts in a plurality of messages of an account of a user, and to replace the identified artifacts in the messages with respective modified artifacts while also maintaining in access-controlled storage at least information related to the identified artifacts. The processing device receives from a requestor a request for a given one of the identified artifacts that has been replaced with a corresponding modified artifact, determines a profile of the requestor based at least in part on the request, makes a security determination based at least in part on the determined profile, and takes at least one automated action based at least in part on the security determination.

20 Claims, 7 Drawing Sheets

(56) References Cited

U.S. PATENT DOCUMENTS

| | | | |
|---|---|---|---|
| 9,954,881 | B1 | 4/2018 | Lin et al. |
| 9,972,010 | B1 | 5/2018 | Jakobsson |
| 10,129,195 | B1 | 11/2018 | Jakobsson |
| 10,277,628 | B1 | 4/2019 | Jakobsson |
| 10,360,351 | B1 | 7/2019 | Jakobsson |
| 2007/0094332 | A1* | 4/2007 | Cama ............ G06Q 30/02 709/206 |
| 2012/0278887 | A1 | 11/2012 | Vitaldevara et al. |
| 2014/0123261 | A1 | 5/2014 | Blair |
| 2016/0142350 | A1* | 5/2016 | Mutha ............ H04L 51/04 709/206 |
| 2016/0352777 | A1 | 12/2016 | Goutal |
| 2017/0206545 | A1 | 7/2017 | Gupta et al. |
| 2017/0230323 | A1 | 8/2017 | Jakobsson |
| 2017/0244746 | A1* | 8/2017 | Hawthorn ............ G06F 21/55 |
| 2017/0272464 | A1 | 9/2017 | Goutal |
| 2018/0007066 | A1 | 1/2018 | Goutal |
| 2018/0013710 | A1 | 1/2018 | Khan |
| 2018/0033089 | A1 | 2/2018 | Goldman et al. |
| 2018/0091453 | A1* | 3/2018 | Jakobsson ............ H04L 51/12 |
| 2018/0152471 | A1 | 5/2018 | Jakobsson |

OTHER PUBLICATIONS

P. Verleg, "Cache Cookies: Searching for Hidden Browser Storage," Bachelor Thesis, Radboud University, Jun. 26, 2014, 35 pages.

Counter Threat Unit Research Team, "Gold Galleon: How a Nigerian Cyber Crew Plunders the Shipping Industry," Secureworks, https://www.secureworks.com/research/gold-galleon-how-a-nigerian-cyber-crew-plunders-the-shipping-industry, Apr. 18, 2018, 19 pages.

F. Stajano et al., "Understanding Scam Victims: Seven Principles for Systems Security," Communications of the ACM, Mar. 2011, pp. 70-75, vol. 54, No. 3.

S. Sheng et al., "Who Falls for Phish? A Demographic Analysis of Phishing Susceptibility and Effectiveness of Interventions," Proceedings of the SIGCHI Conference on Human Factors in Computing Systems, Apr. 10-15, 2010, 10 pages.

M. Moorehead, "How to Explain DMARC in Plain English," https://blog.returnpath.com/how-to-explain-dmarc-in-plain-english/, Jul. 20, 2015, 7 pages.

B. Krebs, "Russian 'Dukes' of Hackers Pounce on Trump Win," Krebs on Security, https://krebsonsecurity.com/2016/11/russian-dukes-of-hackers-pounce-on-trump-win/, Nov. 10, 2016, 10 pages.

J. Buchanan et al., "Investigating and Prosecuting Nigerian Fraud," United States Attorneys' Bulletin, Nov. 2001, pp. 39-47.

C. Herley, "Why Do Nigerian Scammers Say They Are From Nigeria?" WEIS, Jun. 2012, 14 pages.

A. Rege, "What's Love Got to Do with It? Exploring Online Dating Scams and Identity Fraud," International Journal of Cyber Criminology (IJCC), Jul.-Dec. 2009, pp. 494-512, vol. 3, No. 2.

S. Hao et al., "Drops for Stuff: An Analysis of Reshipping Mule Scams," Proceedings of the 22nd ACM SIGSAC Conference on Computerand Communications Security, CCS '15, Oct. 12-16, 2015, pp. 1081-1092.

Y. Park et al., "Scambaiter: Understanding Targeted Nigerian Scams on Craigslist," 21st Annual Network and Distributed System Security Symposium, Feb. 23-26, 2014, 15 pages.

Federal Bureau of Investigation, "Business Email Compromise: The 12 Billion Dollar Scam," https://www ic3.gov/media/2018/180712.aspx, Jul. 12, 2018, 3 pages.

Osterman Research Inc., "Best Practices for Protecting Against Phishing, Ransomware and Email Fraud," An Osterman Research White Paper, Apr. 2018, 21 pages.

A. Najarian, "BEC: What Real Estate Marketers Need to Know about the Spike in Email Scams," https://www.agarl.com/email-security-blog/bec-real-estate-scams/, Aug. 29, 2018, 5 pages.

M. Jakobsson et al., "How Vulnerable Are We To Scams?" BlackHat, 2015, 20 pages.

T. Bradley, "Cisco Report—Email Attacks: This Time It's Personal," https://itknowledgeexchange.techtarget.com/security-detail/cisco-report-email-attacks-this-time-its-personal/, Jun. 30, 2011, 3 pages.

S. Gallagher, "All Your Googles Are Belong to US: Look Out for The Google Docs Phishing Worm," Ars Technica, https://arstechnica.com/information-technology/2017/05/google-docs-phish-worm-grabs-your-google-app-permissions-contacts/, May 3, 2017, 5 pages.

Microsoft Dev Center, "Embedding an iFrame into a Word Document," https://social.msdn.microsoft.com/Forums/office/en-US/e981fe5c-4c59-4b6f-9076-c7ea90909616/embedding-an-iframe-into-a-word-document?forum=vsto, May-Jun. 2008, 7 pages.

T. Jagatic et al., "Social Phishing," Communications of the ACM Draft Preprint, Dec. 12, 2005, 10 pages.

Y. Park et al., "Understanding Craigslist Rental Scams," International Conference on Financial Cryptography and Data Security, Feb. 22-26, 2016, 18 pages.

E. Bursztein et al., "Handcrafted Fraud and Extortion: Manual Account Hijacking in the Wild," Proceedings of the 2014 Conference on Internet Measurement Conference, Nov. 5-7, 2014, 12 pages.

* cited by examiner

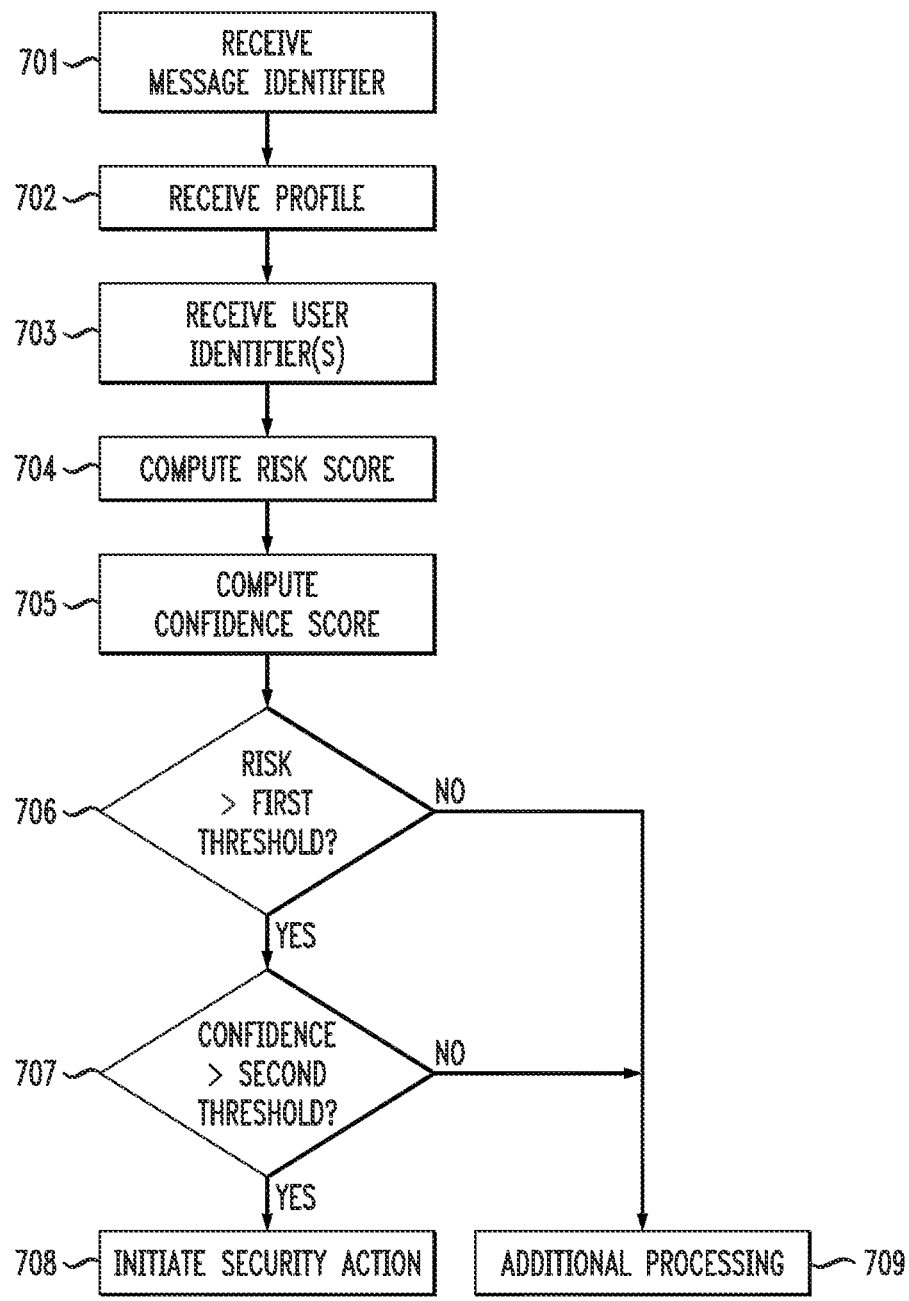

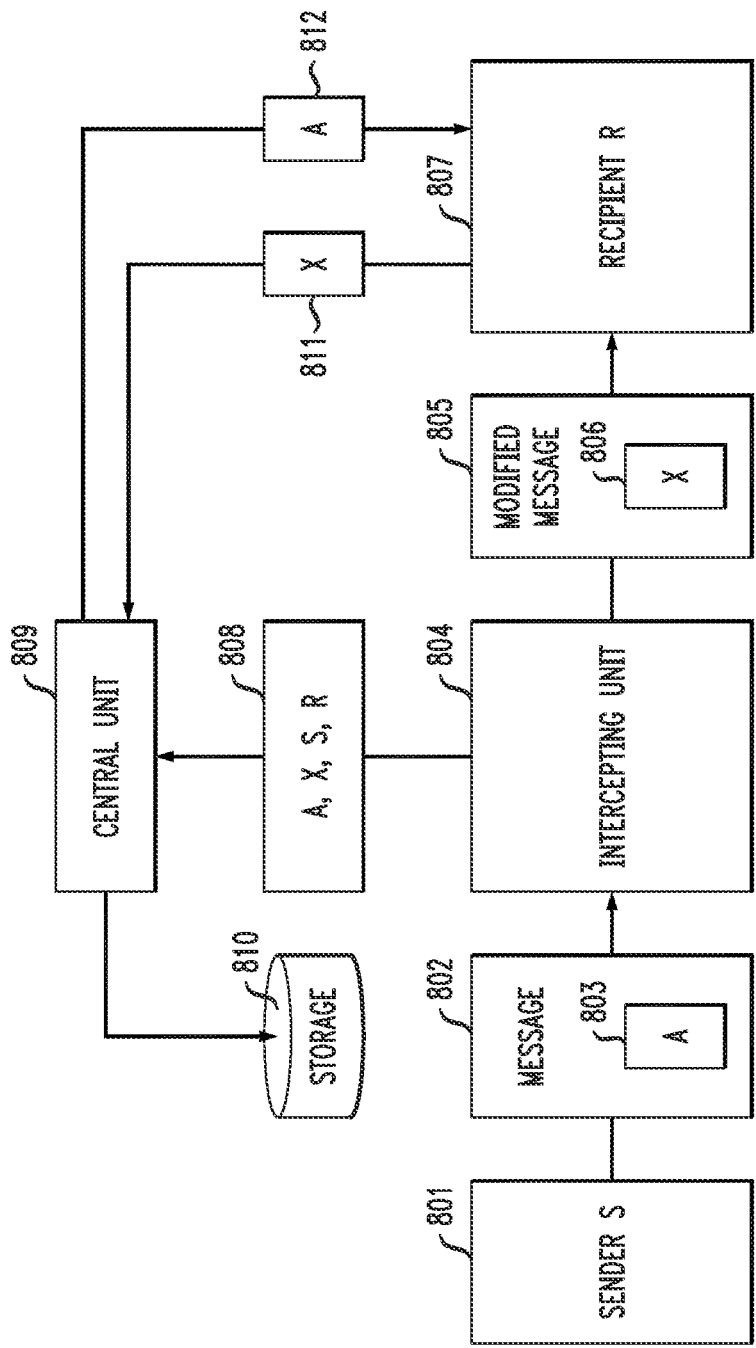

ARTIFACT MODIFICATION AND ASSOCIATED ABUSE DETECTION

RELATED APPLICATION(S)

The present application claims priority to U.S. Provisional Patent Application Ser. No. 62/716,073, filed Aug. 8, 2018 and entitled "Artifact Modification and Associated Abuse Detection," which is incorporated by reference herein in its entirety.

BACKGROUND

Human history is rife with examples of deception, and it should not surprise anybody that the rapid expansion of the Internet in the 1990s was followed by an almost equally rapid rise of abuse. Some of this abuse targeted computers—what is commonly referred to as hacking—but most of it targeted humans—what is referred to as social engineering. In a social engineering attack, a victim is tricked to perform an action that is undesirable to him or her, but which benefits an attacker (for a good overview of general techniques, see F. Stajano and P. Wilson, "Understanding scam victims: Seven principles for systems security," Commun. ACM, vol. 54, no. 3, pp. 70-75, March 2011.)

Phishing is the may be best known example of social engineering. Phishing started in the 90s, when online criminals attempted to steal Internet access time from AOL users by posing as an AOL staff member and asking for the log-in credentials of the victims. Ten years later, with the popularization of online payments and online banking in the early 2000s, the phishers were given a new and much more profitable target, and the threat grew accordingly. In these financial phishing attacks, phishers typically used email spoofing to impersonate large financial institutions and request for the recipients of these emails to log in to their bank using a URL in the phishing email—which led to a phishing website. At first, there were no technical countermeasures in place, whether to block the spoofed emails or the phishing websites. Therefore, the principal line of defense became awareness, with financial institutions and security specialists asking people to be on the lookout for poorly spelled emails and to be careful not to click on links in emails. The first type of advice soon became rather useless as phishers made an effort to have their phishing emails carefully proofread; the second was never very helpful given that most legitimate companies would, at times, send emails with links in, in effect training their users that clicking was safe. While more carefully designed awareness campaigns have been shown to have positive effects (see, e.g., S. Sheng, M. Holbrook, P. Kumaraguru, L. F. Cranor, and J. Downs, "Who falls for phish?: A demographic analysis of phishing susceptibility and effectiveness of interventions," in Proceedings of the SIGCHI Conference on Human Factors in Computing Systems, CHI'10. New York, N.Y., USA: ACM, 2010, pp. 373-382), these effects are likely to be of a much lesser magnitude for targeted attacks—such as emails appearing to come from known parties.

Phishing is credential theft, and is a scam type, whereas spoofing is a method of masquerading messages as legitimate, i.e., is a delivery method. Phishing remained a substantial problem until the deployment of DMARC in 2012 (see, e.g., M. Moorehead, "How to Explain DMARC in Plain English," Jul. 20, 2015.) DMARC is a security control that combines digital signatures with whitelists of approved servers to make email spoofing detectable, thereby addressing the delivery method that phishers often used. With DMARC adoption still being incomplete, spoofing is sometimes still possible; the probably most famous examples—whether of spoofing or phishing—relate to attacks associated with the 2016 U.S. presidential election (see, e.g., B. Krebs, "Russian 'Dukes' of Hackers Pounce on Trump Win," Nov. 16, 2016.) In spite of a small number of prominent spoofing attacks, DMARC has been hugely successful, forcing many online criminals to consider alternative approaches.

One prominent alternative scam of criminals has been Nigerian scams, which gained prominence in the late 90s, and which was starting to be seen as a serious problem in the early 2000s (see, e.g., J. Buchanan and A. J. Grant, "Investigating and Prosecuting Nigerian Fraud," United States Attorneys' Bulletin, 2001). Nigerian scams, initially, were directed mostly at consumers and were not very sophisticated (see, e.g., C. Herley, "Why do Nigerian scammers say they are from Nigeria?" WEIS, June 2012.) However, as the scammers realized that their yield could be improved by making their messages more plausible, various targeting techniques were developed—with contexts ranging from romance scams (see, e.g., A. Rege, "What's Love Got to Do with It? Exploring Online Dating Scams and Identity Fraud," International Journal of Cyber Criminology (IJCC), vol. 3. 974-2891, 2009) and rental scams (Y. Park, D. McCoy, and E. Shi, "Understanding craigslist rental scams," in Financial Cryptography and Data Security, J. Grossklags and B. Preneel, Eds. Berlin, Heidelberg: Springer Berlin Heidelberg, 2017, pp. 3-21) to reshipping mule scams (see, e.g., S. Hao, K. Borgolte, N. Nikiforakis, G. Stringhini, M. Egele, M. Eubanks, B. Krebs, and G. Vigna, "Drops for stuff: An analysis of reshipping mule scams," in Proceedings of the 22Nd ACM SIGSAC Conference on Computer and Communications Security, ser. CCS'15. ACM, 2015, pp. 1081-1092) and Craigslist scams (see, e.g., Y. Park, J. Jones, D. McCoy, E. Shi, and M. Jakobsson, "Scambaiter: Understanding Targeted Nigerian Scams on Craigslist," system, vol. 1, p. 2, 2014.)

Around 2015, Nigerian scammers realized that vaster profits could be reaped by modifying their techniques and targeting companies. As a result, Business Email Compromise (BEC) was seeing a meteoric rise in popularity. BEC is an attack in which a criminal poses as a colleague of a victim—such as a CEO at a company—and requests sensitive information or funds transfers. This has been a very successful form of attack (see, e.g., Federal Bureau of Investigation, "Business Email Compromise: The 12 Billion Dollar Scam," Jul. 12, 2018), given that most people want to help their colleagues—and are prone to agree to requests made by their bosses. Instead of spoofing emails, the BEC attackers commonly use free webmail accounts with strategically selected usernames, i.e., matching the impersonated person. In the last few years, security controls that detect such impersonation have been developed and deployed, again forcing criminals to consider where to go next, thereby propelling the growth of launchpad attacks.

Human failure is the weakest link in many—if not most—security systems. As a result, criminals are increasingly relying on social engineering as a way to circumvent security controls. To improve their yield, the criminals constantly experiment with methods aiming at making their attacks harder to detect—both to security systems and to the end users behind them. Naturally, an attack that successfully evades detection, both by man and machine, has the potential of making criminals very wealthy. Therefore, once discovered and successfully tested, such attacks exhibit dramatic growth and are commonly copied and tweaked by other criminals spotting an opportunity when they see it. What we term the launchpad attack is the newest example of such an attack. While virtually unheard of just a few years ago, 44% of organizations have now experienced this type of attack according to a recent industry report (Osterman Research, "Best Practices for Protecting Against Phishing, Ransomware and Email Fraud.")

Online attackers commonly attempt to deceive intended victims, whether the attackers' goals are to extract data, funds or credentials from the intended victims, or to trick them to install or execute malicious code. The attackers commonly use identity deception to convey a trusted identity to the intended victim. The may be oldest method of doing this is to use spoofing of emails. This is protected against by the DMARC standard, and while spoofing used to be very common for deceptive emails and targeted email attacks, these days it is not, as a result of the very successful deployment of DMARC.

Another common approach is the use of deceptive display names, whether with or without the use of deceptive look-alike domains. Deceptive display names can be detected and addressed using technologies that detect trusted display names used in conjunction with untrusted email addresses, and to some extent also by detecting traffic from unknown sources. The use of deceptive look-alike domains is commonly fought by automatic scanning of recently registered domains, and comparison of these to domains corresponding to high common levels of trust.

Another source of deception, and one that is ballooning in commonality since there are no good methods to fight it, is account compromise. This is also referred to as Account Take-Over, or ATO. This type of attack typically starts by a user getting phished or his or her computer being infected by malware; then, the attacker, whether automatically or manually, identifies contacts of the compromised user/account/ computer; evaluates these; and sends emails—from the compromised account—to the contacts. These emails are very credible to the recipients, since they come from users they are likely to have a trust relationship with. Moreover, traditional security solutions do not detect this type of attack, which causes its popularity with attackers to increase. Moreover, the increased availability of breached accounts on the dark web, as well as of password crackers and commercial malware, causes this threat to become increasingly common. It is therefore of significant importance to develop technologies to detect account compromises, whether of senders of messages or of recipients of messages.

The growth of targeted attacks over the last few years, along with the estimated losses due to such attacks, has spurred enormous interest within the security industry to solve this problem, but so far, no meaningful solutions to the problem have been identified. The need for methods to detect and defuse attacks based on compromises is extreme, especially as national security due to account compromise is a great concern, and corporations are concerned with infiltration and abuse on a daily basis. The explosive nature of the problem is also illustrated by the growth of ransomware attacks, which is a form of compromise, and by breaches. Breaches, which provide the dark web with massive numbers of user credentials, are so common that it is commonly understood that most users have been affected by one or more breaches.

Whereas there are commercial solutions for dynamic URL rewriting, these only address the problem of some URLs not being known to be good or bad at the time of the delivery of the message containing the URLs, which is distinct from the problem of detecting compromise, and existing solutions do not detect account compromise. Moreover, whereas there are commercial solutions for automatically generating honeypot contents and using this to deceive intruders, these solutions are neither addressing messaging nor account compromise. Furthermore, whereas there are data loss prevention (DLP) technologies that detect when sensitive data is exfiltrated from accounts controlled by malicious insiders, this is not a matter of deceptive communication and is not a targeted attack. It is also arguably not the situation which researchers or practitioners refer to when they mention corrupted accounts. Existing DLP solutions do not detect account compromise. Traditional spam filters detect keywords associated with abuse, sequences of characters associated with abuse, and anomalous traffic volumes associated with abuse. Whereas the email accounts sending spam may very well be compromised, spam filters do not detect that fact, and react the same way if a sender is compromised as if it is attacker-owned. Traditional spam filters do not detect targeted attacks, and do not detect when the sender is compromised. Anti-virus technologies commonly block emails containing malicious content, and some of the emails containing malicious content are sent from compromised accounts. However, it is not whether the sender is compromised or not that is detected by the anti-virus software. Accordingly, anti-virus technologies do not detect whether senders of messages are compromised. There are no deployed solutions that can reliably detect that a sender of a message is likely to be compromised. There are also no deployed solutions that can reliably detect that a recipient of a message is likely to be compromised.

Another unfulfilled need is to classify attacks to determine what type of attack they are, and to attribute them, when possible, to an offender. This is of importance to prioritize law enforcement efforts, but is not easy with today's security tools.

The detection of compromises, or account take-overs, is a pressing need that has been of significant concern to the security industry. Reports have been published related to the rise of the problem, and the nature of it. There is significant concern that the recent rise of ATO activity will grow exponentially, as criminals recognize the full potential of such attacks, particularly in the absence of good countermeasures. The security industry has been trying hard to solve this problem, as there are strong indications, based on previously observed trends in fraud, that ATOs will become pervasive in the arsenal of criminals performing targeted attacks on enterprises, government, NGOs, and private citizens, especially high-net worth users. There have been no publications indicating break-through solutions or even significant steps towards addressing this problem.

SUMMARY

Illustrative embodiments provide techniques for artifact modification and associated abuse detection. For example, some embodiments provide technologies to detect that transmitted emails or other types of messages are being sent from or to compromised accounts, as opposed to or from accounts that are likely not to be compromised. The disclosed technologies in some illustrative embodiments work independently of whether the source of the compromise is a phishing attack, a brute-force password guessing attack, a malware attack including a remote access trojan (RAT) or a keylogger.

In one embodiment, an apparatus comprises at least one processing device comprising a processor coupled to a memory. The processing device is configured to identify artifacts in a plurality of messages of an account of a user, and to replace the identified artifacts in the messages with respective modified artifacts while also maintaining in access-controlled storage at least information related to the identified artifacts. The processing device receives from a requestor a request for a given one of the identified artifacts that has been replaced with a corresponding modified artifact, determines a profile of the requestor based at least in part on the request, makes a security determination based at least in part on the determined profile, and takes at least one automated action based at least in part on the security determination.

Security systems incorporating the disclosed technologies in illustrative embodiments provide significant advantages relative to conventional practice by detecting and remediating ATO-based attacks. As attackers increasingly turn to monetize stolen credentials by accessing the accounts of the corresponding users, it is vital that security systems can detect such attacks. It is also beneficial for security systems to classify observed abuse based on the type of attack being performed. An additional benefit of the disclosed technology is that it improves on existing art related to step-up authentication methods, including improvements in hardening SMS-based verification against social engineering attacks. As will be clear to a person skilled in the art, the disclosed technology improves on the prior art in many more ways, solving many long-felt security problems of significant importance.

These and other illustrative embodiments include but are not limited to systems, methods, apparatus, and computer program products. Some of the illustrative embodiments are advantageously configured to address and solve one or more of the above-noted problems of conventional approaches.

BRIEF DESCRIPTION OF THE DRAWINGS

FIG. 7 is flow diagram of an example process associated with artifact modification and associated abuse detection in an illustrative embodiment.

FIG. 8 is a block diagram of another information processing system configured with functionality for artifact modification and associated abuse detection in an illustrative embodiment.

DETAILED DESCRIPTION

Figure 1:
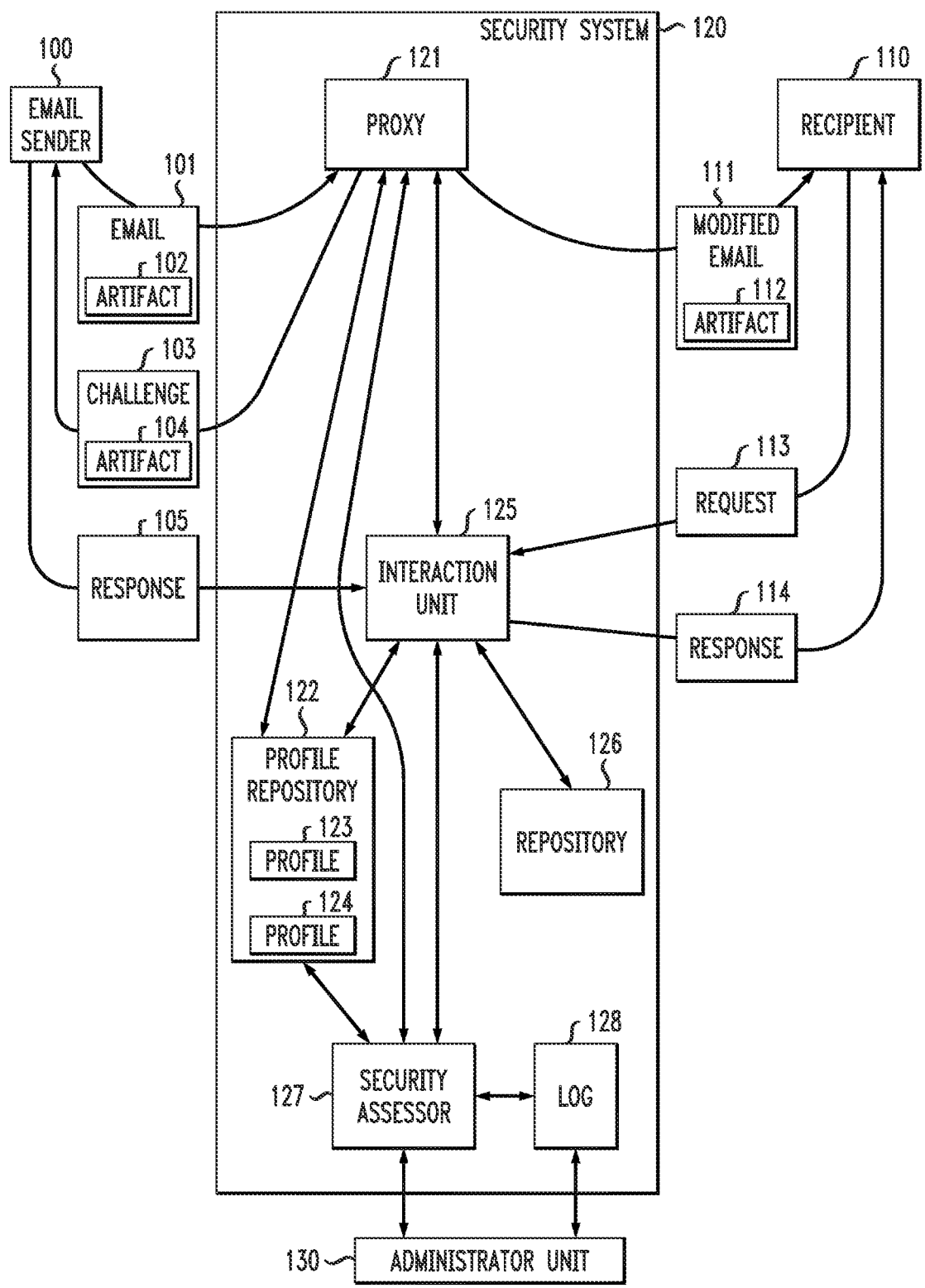
FIG. 1 is a block diagram of an information processing system configured with functionality for artifact modification and associated abuse detection in an illustrative embodiment.

Illustrative embodiments will be described herein with reference to exemplary information processing systems and associated computers, servers, storage devices and other processing devices. It is to be appreciated that the embodiments described below are presented by way of example only, and should not be construed as limiting in any way.

We will initially describe various aspects of what are referred to herein as "launchpad attacks."

In a launchpad attack, a first user—the launchpad user—is compromised by the criminal. This typically means that the criminal gains access to this user's email account, enabling the criminal to review all emails sent and received and identify valuable contacts based on their affiliations and the conversations between the launchpad user and these contacts. Based on this, the criminal selects one or more target victims—the valuable contacts—and sends them messages that, based on the scanned emails, will most likely be both credible (to the victim) and profitable (to the criminal).

In one common version of the launchpad attack, the launchpad user is a realtor. The corruption of the realtor's email account is typically not very difficult, as realtors make a living opening emails—and attachments—from strangers. Accordingly, criminals purchase custom malware on the underground marketplace, add this (e.g., in the form of macros) to Word documents, and, posing as wealthy potential home buyers, send these infected documents to unwitting realtors. The target victim of the attack is not the realtor, though, but a "real" home buyer—a client of the launchpad realtor's—who has just had an offer to purchase a home accepted by a seller. The criminal, accordingly, has information about the property as well as the purchase price and the amount of the down payment—and even more importantly—has the contact information of the home buyer. The criminal now creates an email from what appears to be an escrow agency, and sends an email to the home buyer with instructions for how to transfer funds. The "escrow" account to which the home buyer is instructed to transfer the funds, of course, will be a bank account controlled by the criminal. (For a related case study, see A. Najarian, "BEC: What Real Estate Marketers Need to Know About the Spike in Email Scams," Aug. 29, 2018).

There are many versions of the attack we described above. In one enterprise-facing version, the criminal compromises an email account of a person whose job involves financial transactions—say, a person who invoices clients of a contracting company. Based on the emails this launchpad user has sent and received, the criminal determines where invoices are sent, and sends additional invoices—or just a request for a change of bank accounts—to these unfortunate targets. These emails are typically sent from the compromised account of the launchpad user, making them instantly trustworthy to the target due to the already established trust relationships. Commonly, the criminal sets automated forwarding and deletion rules that rapidly conveys to the criminal any response, while hiding these from the account owner. For example, a slightly suspicious or confounded target user may ask for a confirmation before updating the bank account information to be used to pay invoices. These are messages the criminal wants to receive, but which he does not want the launchpad user to get to see. To achieve that, criminals often set up selective forwarding and deletion rules, e.g., based on an email thread or a subject line.

There are two principal reasons why launchpad attacks are as successful as they are. First of all, the deceptive emails sent to the target users are rarely blocked by automated email filters. For one thing, these emails are not sent from users that have been reported as being abusive, as a spammer or a phisher might have been. The emails are also not sent from unknown users with display names that are deceptively similar to users the target user has a trust relationship with (an otherwise common deception strategy). Therefore, solutions to detect traditional Business Email Compromise (BEC) attacks also do not apply, since these are based on spotting emails from strangers with display names that match parties the recipient have a trust relationship with.

Moreover, while the emails are deceptive, they are not spoofed; therefore, DMARC does not detect them. The deceptive emails are either sent from users with whom the target users have a trust relationship (namely the launchpad user) or from strangers without an abusive history known to the system (such as the fake escrow agency in our example above).

Moreover, considering the content of the deceptive emails, this is also not causing the messages to be blocked. The deceptive messages, typically, are highly similar to legitimate messages, and do not contain keywords indicative of spam (such as "viagra"), nor do they contain high-volume URLs associated with malicious behavior (such as a phishing URL). In other words, today's email filters simply do not block these deceptive messages, or, based on their current detection strategies, they would also have blocked countless benevolent messages. It is known that some security technologies adapt the rules based on the actions of the recipient, thereby becoming less likely to block emails of the types a recipient responds to. (See, e.g., M. Jakobsson and T.-F. Yen, "How Vulnerable Are We To Scams?" BlackHat 2015.) This, unfortunately, weakens the protections of the most vulnerable users. The problem is not that traditional security controls are flawed; rather, they simply do not address launchpad attacks.

Turning now to the human recipients of the deceptive emails, we note that the contents are not unexpected (e.g., nobody claiming that an unknown relative of the target user has died, and the target user has inherited vast fortunes). Instead, the email messages are mostly business as usual, and sometimes, as in our example involving a home buyer, expected or even anticipated. This "logical fit" is made possible by the criminal's use of detailed contextual information for the targeting of the intended victims, both in terms of crafting the deceptive messages and what accounts these are sent from. Indeed, it has been shown (T. N. Jagatic, N. A. Johnson, M. Jakobsson, and F. Menczer, "Social Phishing," Commun. ACM, vol. 50, no. 10, pp. 94-100, 2007; and Cisco, "Email Attacks: This Time It's Personal") that the success rate of deceptive emails can be increased from single-digit percentages to more than 70% by using contextual information for targeting. In terms of the initial compromise, it is noteworthy that the launchpad user is typically in another organization than the targeted victims, demonstrating that the weakest link associated with a user and her organization may be another user and organization.

There are many ways for the attacker to compromise the account of the launchpad user. The most common methods involve traditional phishing or some form of malware, such as a Trojan. Sometimes, attackers gain access to accounts using reused passwords that are obtained from breaches. The Google Docs phishing worm of May 2017 showed how attackers can also compromise accounts by being granted OAUTH access by the account owner. (S. Galagher, "All your Googles are belong to us: Look out for the Google Docs phishing worm," May, 2017.) Whereas there are no recorded instances of attackers corrupting legitimate services with OAUTH access to user accounts, if that were to happen then there would be two degrees of separation between corruption and losses.

In order to understand the attack and how to counter it, it is not sufficient to understand how existing countermeasures are circumvented—whether these are computational or psychological. It is critical to also understand the behavior of a successful attacker. Launchpad attacks always start with information collection.

At the heart of the problem is the fact that traditional security controls do not identify from where (i.e., what locations or what computers) actions are initiated, and therefore, do not detect when an attacker rummages through the mailbox of a launchpad user to identify suitable target victims, nor when the attacker remotely sends emails from the launchpad user's account.

We disclose an approach that addresses this problem, based on tracking the access to artifacts. By artifacts, we mean, for example, attachments (such as invoices and purchase orders) and URLs. Other artifacts can be documents stored on a computer or in a file repository, for example.

A simplified illustrative example will now be presented. For concreteness, let us consider attachments only, to convey the intuition of the solution:

Step 1: Replace Artifacts with Links. The security system scans incoming and outgoing emails of protected users; detects artifacts in these emails; and replaces them with references to cloud hosted copies of the artifacts. This can be done, for example, at a message transfer agent (MTA). Moreover, the system can scan the sent box of protected users and perform analogous replacements there. This is straightforward for cloud-hosted email services, such as O365, but can also be achieved for other services, e.g., using OAUTH. This way, the messages visible by inspection of the emails in the mailbox of a protected user will not have artifacts, but instead, links to cloud hosted copies of these. For the same reason, an email from a protected user, in the mailbox of its recipient, will also not have artifacts. The system can to a very large extent maintain the visual appearance of the modified emails, e.g., by replacing an attached document with a hyperlinked image that appears like the thumbprint of the attached document. When a user interacts with a reference to a removed artifact (e.g., by double-clicking on the thumbprint representing the artifact) a request is made for the cloud-hosted artifact. However, before this is served, the system characterizes the requester, as described in the next step.

Step 2: Characterize Requesters. Every time a user clicks on an artifact reference to load the corresponding artifact, the system characterizes the requester along three dimensions: device, environment, and automation. The device identifier corresponds to a stored state (e.g., using HTML cookies or flash cookies), and user agent information (e.g., information relating to operating system, screen size, application name and version, etc.). The stored state of a given device may change over time, but typically, does not undergo dramatic changes. The environmental identifier corresponds to information about the requester's geographical and service context, such as her geolocation; server name; and carrier or Internet provider. Like the device identifier, the environmental identifier may change—but typically not in a dramatic manner, and rarely at the same time at which the device identifier undergoes dramatic changes.

A third identifier indicates the extent to which automation was used for accessing an artifact or sending of an email; this can be determined from script and API indications in the headers, or from the timing of multiple requests. Most email users never use automation; some (like e-commerce email servers) always use it. Very few email users switch back and forth. A given user is associated with a profile, which corresponds to one or more sets of identifiers of the type described above. As a new user is observed by the system, it has no profile, but as she requests artifacts, the system gradually builds a profile. An attacker is detected—and classified—based on the types of mismatch his artifact access requests result in.

We will now consider an attacker that corrupts a user to use her account as a launchpad in the attack against another user. Let us start by assuming that the launchpad victim is a protected user. In order to collect intelligence from the launchpad user, the attacker accesses one or more attachments—whether in the inbox folder, sent folder, or another folder of the launchpad user. Depending on the manner in which the attacker has gained access to the launchpad user's account, the profile matching generates different results. If we assume, for example, that the attacker has stolen the launchpad user's password (e.g., the attacker is a phisher), then the attacker will not access the email account from the launchpad user's computer, but from the attacker's computer. Therefore, the device match will be poor. Moreover, the attacker is also likely to be associated with a different environment, making that match poor as well. If the attacker uses a script to request and render attachments, this will show up as an anomaly related to automation. The same kinds of mismatches will also be observed—without any interaction between the attacker and the cloud server—when the attacker uses the launchpad user's email account to send email to intended targets. Namely, indicators similar to those that can be observed when a user makes artifact requests will also be automatically encoded in the headers of the emails this user sends.

Step 3: Reacting to Attack. For each artifact request, the system computes a risk score that depends on the three types of identifiers and on the profile of the legitimate user. The score also depends on the number of artifacts requested from this party, the pattern of requests (such as the inter-arrival times of the requests, and whether they appear to correspond to a particular search term); and the historical request patterns associated with the profile. If the risk score is low, the access is permitted, and the requested artifact is transmitted to the requester. If the risk score is intermediate, the system may request additional authentication, such as 2FA, before transmitting the requested artifact to the requester. Finally, if the risk score is high, the system may respond with a synthetic artifact—i.e., a modification of the original artifact or an automatically generated replacement. Moreover, the system may notify affected users. Any email sent by an identified attacker from the launchpad account to contacts of the launchpad user may be blocked or augmented with a warning.

The approach we have described in the foregoing example, like all security controls, is not a silver bullet. For example, the protection is not instantaneous, but requires that the system builds user profiles before it can provide protection. Moreover, the degree of protection it provides depends on the type of attack used to compromise the launchpad accounts, as well as the sophistication of the attacker. While the system will do very well detecting attacks that start with a credential compromise and attacks involving automatic forwarding rules, it may not detect a sophisticated Remote Access Trojan attack without additional detection methods.

In the following, we will assume that some senders and recipients are protected, meaning that the disclosed security system is protecting their accounts. An example of such users are employees of an organization, where the organization pays for the security system described herein, and has all its email processed by the service. The security service accesses the email, for example, by having access to a cloud storage environment where the employee emails are stored; by running an appliance on a mail gateway, or similar. Another example are individual users who have added the security system to their personal accounts, e.g., by giving the security system service access to their email accounts, whether using OAuth or similar technology, or by running software on their machines.

We also consider a collection of users who are not protected, but which are referred to as "observed." An observed user has interacted with a protected user, and the security system associated with the protected user has built a profile relating to the observed user as a result. This profile comprises information about the observed user hardware, software, configurations, network access, and various forms of identity trackers. This type of information is also preferably maintained, by the security system, on all protected users. One difference between an observed user and a protected user is that the security system typically cannot filter traffic to and from the observed user, except when this traffic is sent to or from a protected user.

One important aspect of the disclosed technology is what we refer to as an artifact. An example artifact comprises a URL, including dynamic links which are very much like URLs that carry information that can be consumed by general apps, as opposed to only by browsers. Another example artifact is an attachment, such as a word document, a pdf, or other similar data object. Yet another type of artifact is an image, such as a JPG. An artifact may also be an executable file, including a document with a macro. Artifacts also comprise objects such as phone numbers, which can be identified by the security system as being of a format typical of phone numbers. An artifact, in other words, is a data object associated with a message, which can be an email, a Slack message, an SMS, or similar. For purposes of denotational simplicity, we describe the details of the disclosure using the context of emails, but point out that almost all of the aspects of the disclosed technology apply directly to other forms of messages, and otherwise, with minor and straightforward modifications of processing method or the names of the associated network components.

One goal of the disclosure is to address the problem of detection and remediation of compromised accounts. Attackers may compromise email accounts in a variety of ways, including but not limited to phishing the users for their passwords, obtaining OAuth access to accounts by tricking users, planting keyloggers on hardware or software used by the user to access accounts, infecting user computers or other computational devices with viruses or other malware aimed at accessing the accounts, running scripts on the computers or other computational devices of the users, obtaining access credentials from breaches or using brute force attacks, and more. It is well understood that there is a wide variety of ways in which criminals compromise computers, services, accounts and data belonging to users and organizations. Once a compromise has taken place, the criminal may change configurations associated with the compromised accounts and computers; initiate actions performed from such accounts or using such computers; filter incoming and outgoing traffic from and to such accounts and computers, where filtering comprises scanning the traffic and making selective modifications to it. The criminal may send messages on behalf of the user whose account or computer he has compromised, access incoming messages, selectively remove or modify incoming messages, selectively remove or modify outgoing messages, forward incoming or outgoing messages to another location, and more. There are many other actions that can be performed by criminals, and these are only a few examples.

The actions taken by the criminals can be initiated in a manual manner from a remote location, commonly referred to as a command and control (C&C); performed locally on the compromised computer using a local script; performed in a cloud environment associated with the compromised account, using a script accessing the cloud environment; and performed by a criminal on a separate computer system controlled by the criminal. An example of the latter is access to a compromised email account from a criminal's computer, similar to remote access performed by a legitimate user.

In the following, we will refer to computers and accounts of users by names, such as Alice and Bob. By computers, any computational device is intended, including cell phones, laptops, iPads, tablets, phablets, smart watches, infotainment systems in vehicles, TVs, DVRs, a control system, a sensor with associated computational capabilities, smart home appliances, and more. By message, we mean data communicated from a person or a computer to a person or a computer. Example messages include but are not limited to email, SMSs, notifications, data obtained from a sensor, voicemails, data associated with phone calls, alerts sent to users or organizations, and any other form of data or control signal transported over a network.

A first use case relates to an observed user Alice sending a message to a protected user Bob, where the security system wishes to determine whether Alice is compromised or not, preferably before delivering the message in full to Bob.

A second use case relates to a user Cindy sending a message to a protected user Dave. Cindy could either be observed or not, and either protected or not. The system wishes to determine whether the protected user Dave has been compromised, preferably before delivering the message in full to Dave.

A third use case relates to a protected user Eve sending a message to a user Fabian, where Fabian is either observed or protected. The system wishes to determine whether Fabian is compromised or not, preferably before delivering the message in full to Fabian.

A fourth use case relates to a protected user Gary sending a message to a user Hillary. Hillary may be observed or not, and protected or not. The security system wishes to determine whether data is being exfiltrated from a compromised account (Gary) to a collaborator account (Hillary).

A fifth use case relates to the automated building of a profile associated with a user, by the security system. The user may be a sender of a message, such as Alice, Cindy, Eve or Gary; or may be a recipient of a message, such as Bob, Dave, Fabian or Hillary. The user may also not send or receive any message, but simply access a network resource that the security system has access to, whether this access relates to direct access to the network resource or indirect access, by which we mean access to at least some of the traffic going to or from the network resource, or preferably both.

The above use cases are only examples, and a wide variety of other use cases arise in other embodiments.

To determine a security posture of an entity, such as the above senders or recipients of messages, the security system performs one or more of several tasks:

1. The security system creates a profile for each entity, where an entity corresponds to one or more senders or recipients of messages, and where each entity corresponds to at least one user identifier, which we refer to as an account. Example user identifiers include but are not limited to email addresses, phone numbers, dedicated IP addresses. Sometimes, one sending account is used by an organization to send messages from several different and unique users; for example, this is what LinkedIn does. However, in the headers associated with messages originating from unique LinkedIn members, there is data that can be used to determine whether the message emanated from a first or a second user; such data is part of the user identifier. Moreover, sometimes, one user may send messages from multiple email addresses. For example, one user may have one corporate email address and one private email address. The system either associates this with one account or two accounts; in the former case, both email addresses are listed as potential sources of messages. In the latter, two profiles are created, and preferably, linked to each other. By linking the profiles to each other, the system can associate data from one of the email addresses with not just the profile of that email address, but also one or more other profiles. In contexts where multiple end users share one piece of equipment, the system may either generate one or multiple profiles. In the latter case, these profiles are preferably associated with each other. Profiles can either be created by the security system or obtained from another system that has created the profiles.

2. The security system configures profiles. As data associated with a profile is observed by the security system, this data or associated data is included in the profile associated with the actor emanating the data. We will provide several methods of obtaining such profile data below, based on observing transmitted messages and the interaction of users with such messages. Profile data can also be generated at a time when a user is first enrolled in the system, e.g., if a new user is created by a protected entity, making this a protected user associated with the protected entity. This can be done by determining or generating a configuration of data associated with the computer of the protected user, and either reading this configuration from the computer of the protected user or writing this configuration to the computer of the protected user, or both. Examples of identifiers that are used in such configurations include HTML cookies, cache cookies, flash cookies, user agent strings, and other similar identifiers, which are well understood by a person skilled in the art. Other identifiers include unique or uncommon strings associated with software agents or with the hardware associated with the user's computer. The profiles comprise such identifiers, hashes of these, or other values that can be mapped to or from the identifiers at least in part by the security system.

3. The accounts used in one or more profiles are commonly related to the use of one or more computational devices. For example, Alice may have an iPhone 5s and a Windows NT computer that she uses to send and receive email, and to browse the web. She may read and send email from multiple email accounts and other types of messaging accounts, such as her personal webmail account, her work email account and her Slack account; and may do so on one or more of her computational devices. Therefore, the one or more profiles associated with Alice will correspond to multiple computational devices and multiple devices. Any of the recorded computational devices may send messages from, or receive email to, one or more of these accounts, and Alice may click on hyperlinks, access attachments, and otherwise browse the web, in response to contents in messages sent to her. This is not anomalous. However, if Alice were to perform such actions from another computational device, such as a PC running Linux and having Cyrillic fonts installed, then that is an anomaly. If she reads and sends work related email from her Windows NT computer, and sometimes reads personal email from her Windows NT computer, but mostly reads and send email from her personal account using her iPhone 5s, then it is not anomalous for her to send an email from her work account from her iPhone 5s. However, it is anomalous for her to send it from *another* iPhone 5s. Anomalous does not mean that it will not ever happen, but it is a sign of increased risk. Thus, when Alice replaces her iPhone 5s with an Android phone, this will be identified as an anomaly, even though the change may be legitimate, as opposed to being a sign of corruption. The security system identifies what messaging accounts correspond to one user, and what computational devices correspond to this user, and then determines whether an access is anomalous based on this, as described above, taking into consideration that accidental aberrations, such as using the wrong account for sending an email, or the wrong computational device, is not indicative of elevated risk for having been compromised, whereas sending, reading or processing a message from a new device is indicative of increased risk. Here, processing includes actions such as downloading web content linked from a message, or otherwise access artifacts associated with the message.

4. The security system observes traffic, identifies artifacts and optionally modifies these, their names, their representations, or otherwise combines them with modifiers. This preferably happens whether an anomaly associated with the sender has been detected or not. The nature of the modifications is that the resulting modified artifacts cause a call-back to the security system when processed, opened, or requested. Example modifications will be provided below. The observation of traffic is preferably done to incoming traffic originating from outside a protected entity comprising one or more protected users; originating from inside a protected entity comprising one or more protected users; from an originator of a message, where the originator is not a protected user; from the recipient of a message, where the recipient is not a protected user; from one user of a protected entity to another user of the same or a different protected entity; and from another user, that is not necessarily associated with the origination or receipt of a message, or the association is not known by the security system. In one embodiment, artifacts are not modified, but an identifying string associated with them is instead generated and stored, later to be compared to other traffic to determine that there is a relationship between the artifact and the later traffic. In this case, the identifying string is either stored in an associated profile, or generated at least in part from a data element stored in the profile. A person skilled in the art understands that this allows the security system to identify how an artifact is requested, opened, used or otherwise interacted with without modifying it.

5. The security system receives call-backs in response to the processing, opening or requesting of modified artifacts, allowing it to query the system associated with the origination of the call-back for information, and to observe responses to such queries, as well as observing data associated with the call-backs. A call-back corresponds to a data request associated with a modified artifact. The security system processes such data, associated with the call-backs and the responses to queries resulting from the call-backs. The processing of the data results in several types of output: (a) the system obtains non-anomalous descriptors associated with the call-backs and uses these descriptors to augment the associated profiles, e.g., by adding identifiers associated with the data to selected profiles, where the profiles are selected to correspond to the accounts or computers with which the call-back was expected, and (b) the system obtains anomalous descriptors and takes security actions. Other ways of obtaining data associated with users and their systems are also possible, and will be described below. Alternatively, instead of observing call-backs, the security system observes network traffic and identifies traffic associated with identifying strings associated with artifacts. In cases where such identifying strings are not unique, the system preferably computes an estimate of how likely it is that an observation corresponds to one particular instance of a previously seen artifact, versus another possible instance. This probability assessment can be made heuristically, based on the estimated commonality of the artifact, as well as how many users observed or protected by the system are believed to have received the artifact. In one embodiment, this type of assessment is made in addition to the processing of artifacts and their associated but optional call-backs.

6. An identification of anomalies associated with the processing, opening or requesting of modified artifacts, or of artifacts that have not been modified but which the system stores some associated identifying strings, is performed. If an anomaly is observed, this results in an optional classification of the type of anomaly and an optional alert or log entry being generated, where the optional alert or log entry preferably comprises information relating to the classification. It may also result in other security actions. Example classifications comprise that the sender of the message is believed to have been compromised; that the recipient of the message is believed to have been compromised; a probability assessment associated with a believed compromise; and an indication of one or more likely threat actors associated with the believed compromise. Example classifications also describe the most likely type of compromise, based on the observed requests associated with artifacts or modified artifacts; these include, for example, risk of phishing-based compromise in which a credential has been stolen; risk of malware-based compromise; risk of compromise based on a stolen device, and more. Sub-classifications can also be performed, e.g., identifying a corruption as corresponding to one type of malware as opposed to another type of malware, based on the characteristics of one or more observations associated with the account determined to be likely to be compromised.

7. As a result of the presence or absence of an anomaly, and optionally based on one or more associated classifications, an action is taken. Example actions comprise withholding at least part of a requested artifact; modifying a requested artifact before transmitting it; unlocking at least a portion of an artifact; triggering an optional action to be performed by the artifact or a software agent interacting with the artifact, thereby causing information about a believed criminal actor to be collected, transmitted or computed. Other actions comprise blocking access to at least one artifact; generating an alert or notification; creating a log event; and creating a profile associated with a new actor, such as a believed criminal entity. The system may also log statistics about the access to artifacts, e.g., inter-arrival time of requests from one account, computer, IP address or device type. This may help classify risks based on the patterns of requests. The system may also perform additional security scans of emails and/or artifacts based on one or more classifications. These scans may involve manual review, malware detection, detection of file types of risk, scanning for text or image patterns in the message or its headers, or scanning for text or image patterns on a webpage associated with an artifact. The system may also scrutinize headers of files, e.g., to determine what software is indicated in the headers of a pdf file as having been used to generate the file. A person skilled in the art will recognize that many other actions are possible, and these are merely examples intended to convey the general functionality of the disclosed technology.

8. If the security system detects an anomaly, such as associating a new computational device to an account, and accessing one or more messages from this device, then the security system preferably proceeds by attempting to determine whether to enroll this new device for the user, i.e., associate it with the user's profile. This can be determined using a collection of heuristics such as whether the IP address of the anomalous access corresponds to a previously observed IP address of the same user or account, but with a non-anomalous computational device. It can also be determined using user-facing tests. One example of such as test is that the security system causes a challenge message to be sent to the user, but not necessarily to the account that is being accessed in an anomalous manner, but potentially to another messaging account associated with the user. The challenge may simply ask the user to confirm the use of the new computational device, or may ask the user to input a dynamic code such as the code from Google Authenticator™ or an RSA SecurID® token, to prove that he has access to hardware associated with the owner of the messaging account. The system may send a hyperlink by SMS to a phone number associated with the user, and request that the user clicks on the hyperlink to confirm the use of the new device. If the new device is a phone, and this same new device is detected to be the one that the user clicks on the hyperlink, the system may perform an additional action in response to determining this correspondence, such as sending a challenge of another type to another messaging account. Yet another example approach is to ask the user life questions, such as what is commonly done for purposes of password reset. Life questions include questions such as "What is the name of the street you grew up on?" and "What are the four last digits of your credit card number that starts with 4047?", and other questions of this nature, as will be appreciated by a person skilled in the art. If a user passes the test, the new computational device is observed and recorded in the profile associated with the user, unless there is reason to believe that the computational device is public, such as a library computer. If a user does not pass the test, then an alert may be generated, access to information be limited, or another security action taken.

In one embodiment, a tracker corresponds to an element in an email, on a website or in an attachment, that corresponds to a URL and which requires that the corresponding website is contacted before the element can be rendered. A person skilled in the art will recognize that there are many ways to do this. An attachment can request web data, for example, by using a macro. However, there are other ways, such as embedding an iframe where the iframe requests a web element in order to render. For example, a word document can embed an iframe, e.g., using the approach described in the Microsoft Office Forums document entitled "Embedding an iFrame into a Word document." Similarly, iframes can be embedded in excel documents. When a webpage or iframe is rendered on a client machine, and the element has a URL, then the corresponding website is contacted. The contacted website, which in the context of the disclosure and the use of a tracker, will be associated with the security system, will detect and record identifying information associated with the requester. This includes HTML cookies. If there are no HTML cookies transmitted with a request, the site receiving the request can set HTML cookies. That way, the next request that the device makes will contain the corresponding HTML cookies. This can be combined with cache cookies. For example, the approach described in the 2006 publication "Cache cookies for browser authentication" by Juels, Jakobsson and Jagatic, can be used. Flash cookies are also well understood, and can be used for tracking purposes. Similarly, it is well understood that cookies based on eTags can be used for tracking. It is furthermore understood that user agent can be used for tracking. This is a technology that was developed, among others, by the company 41st Parameter. A person skilled in the art will recognize that these and similar methods can be used for tracking. It is also well understood that many methods like these are already in use for purposes of determining user activity, e.g., for advertisement. This technology is commonly referred to as web bugs, or beacons. With the development of new ways that enable storing or requesting of data, there are constantly new methods developed for performing tracking. A person skilled in the art will recognize that such methods can be used in the context of the disclosed technology.

A tracker is a technology that allows state associated with a user device and/or its network neighborhood to be inferred by a remote server, which in the context of some embodiments of this disclosure is the security system. Some embodiments of trackers additionally permit the state associated with the device to be modified by the remote server, thereby allowing the storing of state that preferably comprises a unique identifier. In some embodiments, the stored state is not unique, for reasons associated with end-user privacy, or enables the querying of the state, by the remote server, in a manner that gradually reveals identifying information. This permits the sufficient extraction of information for purposes of security analysis, without extracting a unique identifier. An example of this approach was provided in the 2006 publication "Cache cookies for browser authentication" by Juels, Jakobsson and Jagatic. Another example publication describing methods like this is Verleg's 2014 Bachelor's thesis, titled "Cache Cookies: searching for hidden browser storage." A person skilled in the art will recognize that there are many related methods to identify devices.

In some embodiments, the security system processes a message, whether one that comes from a protected user or not; and whether it comes from an observed user or not. The security system identifies one or more artifacts, as described above, by parsing the message body and/or its headers. An example observed artifact is a URL, such as the URL "http://www.nytimes.com/storyoftheday." Another example observed artifact is a Microsoft word attachment. A third example observed artifact is a JPG that is displayed as the message is rendered. The security system then replaces each one of the observed artifacts with a corresponding modified artifact. The example URL artifact may be replaced with the URL "https://securityserver.com/URL12737" where the number 12737 is stored in a database along with the associated observed URL "http://www.nytimes.com/storyoftheday." The database also stores an indicator of the identity of the recipient, or another identifier associated with the profile corresponding with the recipient. Alternatively, an example modified URL artifact may be the URL "https ://securityserver.com/HDGBDGUDNBDHYEEI4994dhhd9_9" where "HDGBDGUDNBDHYEEI4994dhhd9_9" encodes the string "http://www.nytimes.com/storyoftheday" in a manner that allows the security system or an associated entity to decode it. Additionally, the encoded string also preferably encodes an indicator of the identity of the recipient, or another identifier associated with the profile corresponding with the recipient. The encoded string may also indicate the sender of the associated message. After the original URL is obtained, the security system can set an HTML redirect (such as an HTTP 401 redirect message), allowing the requesting device to automatically access the document from the "real" source; or by proxying the content; or in other related ways, as understood by a person skilled in the art. This may be done conditionally on the evaluation of whether the access is anomalous, as described above. If there are multiple recipients of the message, each preferably receives a unique modified URL artifact, although in one embodiment, they receive the same, which is then associated with the collection of all the recipient profiles.

Turning to the attachment artifact, this may be replaced with a URL artifact, as for the URL artifact example above, allowing the recipient to download the word file after clicking on the URL. To convey to the recipient that it is an attachment, a visual indicator such as a JPG corresponding to a word document icon is preferably associated with the hyperlink, causing the user to believe it is a word document and click on it to open it. This, however, would prevent the user from saving the attached document as he or she normally would, as the received and modified message does not have a real attachment document, but only an image and an associated hyperlink. This can be avoided by instead of replacing the word document with a hyperlink replacing it with an equivalent word document that in addition to the data of the incoming word document contains a tracker that initiates contact with the security system when the document is opened, thereby allowing the security system to collect data associated with the access. This can be done using traditional web bugs, which are commonly used as trackers, or using macros. It can also be done by cloud-hosting the document, as is common, and associating the retrieval of the document with the engagement of a tracker, similar to how the modified URL was used to convey a signal. Similarly, the reference to the example JPG artifact is replaced with a reference to a proxied JPG, similarly to the URL artifact example, forcing a load from the proxy to render the image. In situations where the mail reader will not display such proxied messages, the security system may opt not to proxy the image.

The determination of whether an access related to an artifact is anomalous or not is made based on identifying with what profile(s) an artifact is associated, by extracting tracking data and identifying data such as various cookies, trackers, and user agents associated with the requester, and then comparing the tracking data associated with the artifact request with data stored in the identified profile(s). If there is a close match, then the access request is granted; however, if the access is anomalous, a security action is taken. A person skilled in the art understands that a variety of methods can be used to identify anomalies, including machine learning (ML) methods; rule-based methods such as whitelists and blacklists; as well as fuzzy logic and other artificial intelligence methods. The closeness of a match is determined and preferably converted to a risk score, which in turn is compared to one or more thresholds, and security actions associated with these one or more thresholds are initiated.

The security system replaces artifacts of incoming messages with modified artifacts before the messages are delivered. In addition, the security system also preferably processes internally originated messages, i.e., messages sent from protected users, to replace artifacts associated with these messages with modified artifacts, as described above. To the extent that these messages are sent to users for which there is no pre-established profile, the system optionally generates a profile for the intended recipients, where such profiles may either be permanent or temporary. Upon creation, these profiles typically have no associated tracking data, as the security system commonly does not know anything about these accounts and users. The processing of internally originated messages and the associated replacement of artifacts with modified artifacts is preferably also performed for recipients that are protected, such as colleagues of the protected user that is sending the message.

As messages are delivered and opened, the security system receives data associated with the recipients, as these access the modified artifacts. This information is added to the associated profiles. For purposes of efficiency, the information is periodically processed to compress it or otherwise reduce the amount of storage required. As the system obtains more and more information about a previously unobserved user, the user becomes observed, and a score corresponding to the accuracy of a prediction is generated and stored in the profile. This accuracy score is an indicator of how likely a deviation from the observed data is an anomaly, and will increase as the amount of data observed increases. However, different users with the same amount of observed data may still be associated with different accuracy scores, depending on how predictable their behavior is assessed, based on past observations, to be. Standard statistical methods and ML methods can be used to compute this accuracy score.

Depending on the score, a detected anomaly may result in different security actions. For example, if the accuracy score is low, a non-invasive action such as a simple alert may be taken, whereas in the accuracy score is high, a more invasive action such as blocking access to an artifact or blocking transmission of messages to/from the affected account, may be performed. The security action may also depend on the nature of the artifact. For example, if the artifact corresponds to an organization-internal document or a document that has data matching sensitive data such as social security numbers, then an invasive action may be taken even if the anomaly score is low or the accuracy score is low.

As a modified artifact is requested, it is determined whether it is likely that it is being requested by the recipient, i.e., by a computer matching the profile of the recipient, or by an attacker having compromised an account or a computer of the recipient. If the modified artifact has been forwarded to another party, it has preferably been modified again if the recipient is a protected user, meaning a forwarded message containing artifacts will be different from a non-forwarded message containing artifacts, since the artifacts of the latter were modified as the message arrived, whereas the artifacts of the former message are modifications of the modified artifacts, where the twice-modified artifacts have unique encodings from the modified artifacts, and are therefore distinguishable from the latter.

Coming back to our previously described use cases, we will analyze these one by one. The disclosed technology addresses all of these use cases, and can do so at the same time. Thus, breaking the use down into use cases is done to simplify the description, and does not mean that the use cases are mutually exclusive.

In the first use case, an observed user Alice is sending a message to a protected user Bob, and the security system wishes to determine whether Alice is compromised or not, preferably before delivering the message in full to Bob. As the message reaches the perimeter of the protected area associated with Bob, where this perimeter corresponds to a corporate firewall, mail server, etc., the message is processed by the security system. In one embodiment, it is modified by the security system and then conditionally delivered to the inbox of Bob; and in another, it is delivered to Bob's inbox, after which it is removed by the security system and a replacement is conditionally placed in Bob's inbox.

The security system is either made aware of the message as it is scanning Bob's inbox (and preferably also spam folder) for new messages; or because the security system is sent a copy of the message as it arrives at the perimeter, or on the path to be delivered to Bob's inbox; or the security system operates as an appliance on the path, scanning incoming messages. In yet another embodiment, corresponding to a cloud mailbox, the message is delivered into Bob's cloud inbox; the security system discovers or is notified of the message; and then removes the message and conditionally replaces it with a modified message.

The modified message is equivalent to the message sent by Alice, but for a number of modifications comprising the replacement of artifacts with modified artifacts. In addition, trackers may be incorporated in the message, allowing the security system to determine whether the message has been rendered by Bob, and if so, on what type of device, since the tracker provides information related to the accessing device as the message is being rendered. As the message is rendered by a person with access to Bob's mailbox, and artifacts are accessed, it is determined whether this corresponds to an anomaly. The security system determines whether to deliver the message or not based on indicators related to the security of Alice's system.

Recall that Alice is an observed user. That means that the profile associated with Alice comprises information relating to the mail user agent (MUA) of Alice, which is compared to the MUA of the incoming message. If the MUA's match or are significantly the same, and there is no security exception relating to the content on the message, then the message is processed and the resulting modified message placed in Bob's inbox, where the processing corresponds to the replacement of artifacts with modified artifacts. If the comparison between the stored MUA and the MUA associated with the message results in a difference that exceeds a threshold, then the message is preferably held in quarantine and a challenge message is sent to Alice—whether to her email account or to another account recorded in the profile associated with Alice, such as to a phone number in the form of an SMS.

The challenge requires Alice to click on a first hyperlink if she agrees that she sent the message and on another if she denies that she sent the message. Independently of what hyperlink Alice clicks on, it is determined whether the computational device that is being used to perform the click has identifiers that match at least one of the identifiers recorded in the profile associated with Alice. If there is a mismatch, it is considered an anomaly, and a security action is taken. If Alice clicks that she did not send the message, a security action is also taken, based on a policy being set to do so. This policy is either set by Bob or Bob's organization, or is an aspect of the security system.

If Alice does not click on either for a period associated with a policy, such as 24 h, then the policy is evaluated and it is determined whether to deliver the message. In one embodiment, it is delivered only if Alice is a known party, which means a party with a profile with an accuracy score exceeding a first threshold. In another embodiment, it is delivered in a spam folder associated with the recipient, Bob, or is delivered in the inbox after having had a warning added to it. In yet another embodiment, the security action is determined based on the types of artifacts the message contains, or based on the result of an evaluation of these. As mentioned above, the message is also preferably modified if it contains any artifact. If it is found that Alice's account is likely to be controlled by a criminal, then traffic emanating from Alice's account may be blocked, quarantined, marked up, or otherwise filtered, no matter who the recipient is, as long as the recipient is a protected user. In addition, an admin associated with Alice may conditionally be notified, and a log entry made to record that Alice is likely to be corrupted. Alternatively, additional fact-finding security actions may be taken, aiming at determining with greater precision whether the observed anomaly is the result of a compromise or not. For example, Alice may be automatically contacted on a channel other that used to send the message, i.e., by SMS or Slack if the message was on email, and asked to take a corrective action before email can be delivered from her to protected users. Preferably, the notification sent to Alice contains instructions of how to rectify the problem, and what to do next.

The instructions may be selected based on what the problem is believed to be, e.g., if it is believed based on the identifiers found not to match the stored identifiers of the profile indicate that Alice has been phished, another notification is sent than if it is believed that she has been compromised by malware. To provide a detailed example, if the identifiers indicate that the user sending the email has a computer very different from Alice's normal computers, and is using another carrier or is on another IP range, then it is likely that Alice was phished, and a criminal with knowledge of her password is accessing her email account remotely. In contrast, if the message sent from Alice to Bob indicated that the message was submitted to the mail server using an API, whereas normally it is not, then that is an indication that the message was sent by a malware agent running on Alice's system. Similarly, if the response to the challenge indicates that the cookies did not match and the user agents did not match, then that is indicative of phishing, whereas if the response indicates that the cookies were correct but an API was used, then this is indicative of malware. These are simply examples of ways to identify the source of the problem, and a person skilled in the art will recognize that there are many other such ways.

In the second use case, a user Cindy sends a message to a protected user Dave. The system wishes to determine whether the protected user Dave has been compromised, preferably before delivering the message in full to Dave. The processing is performed similar to the example with Alice and Bob, resulting in Dave receiving a modified message comprising modified artifacts. Some of these may cause tracking of Dave automatically, as the message is rendered, whereas others will not cause tracking of Dave until Dave interacts with the associated artifact, where example interactions are clicking on a hyperlink, opening a document, running a macro, etc. As tracking is performed, identifiers are extracted by the security system and then compared with stored identifiers, where the stored identifiers are part of the profile associated with Dave. The security system determines whether there is a match between the stored and the observed identifiers, and determines whether to take one or more security actions based on one or more of one or more policies, the matching score, an accuracy score, the message contents, the artifact types, and additional elements as will be understood by a person skilled in the art.

The security actions comprise blocking access to Dave's account; blocking remote access to Dave's account; notifying Dave on a separate channel such as by a text; notifying an admin; requiring Google Authenticator™ or SecurID® for access to Dave's account; blocking the use of macros on Dave's computer by remote command; automatically accessing Dave's computer using a system such as GoToMyPC or other remote administration system in order to attempt to remedy the problem; automatically updating the password to a backup password; forcing Dave to authenticate himself to gain access, and then changing the password.

The selected security action preferably depends on the assessed level of risk and the type of threat that is deemed likely to be associated with Dave. For example, and as described for Alice above, if the security system determines that it is likely that Dave's password has been phished, then a good course of action is to lock down Dave's account until he proves his identity, and then require him to reset his password. Proving his identity can be done in a variety of ways, as known by a person skilled in the art, including using a hardware token, using a tool such as Google Authenticator™, receiving a code using SMS, answering security questions, or combinations of these. Similarly, if it is determined that the likely source of the problem is malware, then another action is taken.

Example actions associated with malware include attempting to remote in to Dave's computer, assuming it is an enterprise-owned computer or one that Dave has otherwise granted remote access to the security system; or the screening of and blocking of potential C&C traffic, and more. If the identifiers indicate that the source of the problem is a local script running on Dave's computer, such as a VBA script, then another set of actions are applicable than if it is determined that it is a remote script, such as a script with OAuth access, as will be appreciated by a person skilled in the art. The difference will also in most cases be evident from the exact headers and contents of the traffic associated with rendering and otherwise interacting with the modified artifacts. If there are indications that messages to Dave are automatically forwarded to a third party, e.g., by commonly being opened both by Dave's regular computer and another computer, then a third action may be taken; this may include blocking outgoing messages from Dave, or to block outgoing messages that are identical in contents to incoming messages to Dave. A person skilled in the art will recognize that there are many other meaningful security actions, and that these security actions are only illustrative.

In one alternative embodiment, the modified message is modified again after Dave has engaged with an artifact, causing a validation of his identifiers based on the identifiers stored in his profile. The second-time modified message may be modified to replace at least one of the modified artifacts with the original artifact; by adding or removing a warning or an explanation, or other such actions. If it is determined that Dave is likely to have been compromised, the requested artifact may be replaced with an artifact that intends to confuse the attacker; deceive the attacker; attempt to run a macro or a script on the attacker's computer, or similar. The selection of what type of action to take preferably is based on the classification of the threat, e.g., whether it is phishing or malware; a detailed classification of the threat, e.g., whether it is a local VBA script or an OAuth access-based script; the assurance level; whether the attacker matches a profile associated with a previously known attacker, and if so, what actions are associated with this previously observed threat. A person skilled in the art will recognize that similar actions can also be taken in the contexts of the other described use cases, and that the explanations in the use cases are only illustrative.

In the third use case, a protected user Eve sends a message to a user Fabian, where Fabian is either observed or protected. The system wishes to determine whether Fabian is compromised or not, preferably before delivering the message in full to Fabian. As Eve initiates the transmission of the message, the message is routed over a network and intercepted and modified by the security system. Alternatively, these modifications can take place on the mail client that Eve uses, using a software agent controlled by or coordinating with the security system, and thus, be made prior to the message is transmitted. The security system scans the message, identifies artifacts, and replaces at least some of the artifacts with modified artifacts, where the modifications are of the same type as described above. In addition, as for the other use cases, the security system optionally incorporates additional trackers into the message, where these trackers cause a notification to the security system as the message is being rendered, and this notification conveys data related to the computer that is being used to render the message. Similarly, interaction with modified artifacts causes the transmission of data to the security system, including tracking information. Such transmission may correspond to PUT or GET requests, or other types of data transmissions. As the security system receives data comprising identifiers, as described for the other use cases, it determines whether the identifiers match the selected profile, where a profile is selected based on the expected recipient. Alternatively, the security system uses the identifiers to look up what profile(s) are associated with these identifiers. The security system then determines whether the identifiers are anomalous, as described above.

Another type of processing that the security system performs in this and other use cases, is to determine whether the profile(s) associated with the identifier(s) are known to be malicious or have a high corruption risk score, indicating that they are believed to have been corrupted. If this is determined, then the security system determines that the artifact access is made by a criminal. The security system then takes an optional security action, which can include one or more of transmitting content that does not correspond to the original artifact; transmitting content that allows further collection of data by the security system from the computer system of the criminal; blocking the content transmission; sending an alert; automatically initiating an investigation into whether the sender is likely also to be corrupted; automatically initiating a review of the communication history between Eve and Fabian, and potential other users associated with Eve and/or Fabian.

As described for the other use cases, a profile may also be generated to describe a believed criminal use of a computer or associated accounts, and a comparison can be made to other profiles to determine whether there is an overlap or likely correlation between these and the profile generated to describe the believed criminal use of a computer or associated accounts. If no anomaly is detected and the identifiers do not match a known criminal profile, then the access is determined to be likely to be legitimate, and content associated with the requested artifacts is transmitted to the requesting party. If the identifier(s) obtained from the request are not verbatim identical to the previously recorded identifiers associated with the profile, but sufficiently similar that it does not result in a conclusion that it is an anomaly, then the profile is conditionally augmented with at least some of the new identifiers, thereby causing the profile to be adjusted over time. Such augmentations may also be performed in response to successful challenges of the user suspected of being compromised, as described above. In addition, outdated identifiers associated with the profile may be flagged or removed from the profile after some time of inactivity, where inactivity corresponds to the identifiers not being present in requests that are considered legitimate. As for the other use cases, a change of a set of identifiers may also result in a challenge to be generated and sent to a user associated with the associated profile, thereby initiating a collection of additional identifiers and a verification of the connection to a user.

In the fourth use case, a protected user Gary sends a message to a user Hillary. The security system wishes to determine whether data is being exfiltrated from a compromised account (Gary) to a collaborator account (Hillary). Similar to how artifacts were modified in the above use cases, the artifacts in the messages in this embodiment are also modified. In addition, they are classified, e.g., based on file type, keyword content, and matching to security and DLP profiles, and the classified artifacts are counted as a function of time. The counts are compared with historic counts for the associated sender, both on a global level, i.e., to any recipient, and to the current recipient, Hillary. It is determined whether this is an anomaly. If it is, the modified artifacts are flagged. This is preferably done by saving information relating to them, or to the recipient, in the profile associated with the sender, Gary.

If the associated modified artifacts are later requested by Hillary or another party, then the anomaly determination described for the previous use cases is performed; but in addition, the security system determines from the identities of the requested modified artifacts and the record associated with these, which are part of or associated with Gary's profile, that there is an expected high risk of exfiltration. This is likely due to Gary's account having been compromised, but could also be due to Gary being untrustworthy. At least one security action is taken in response, where example security actions comprise modifying the content to be sent to the requester; responding with data that helps in the collection of information about the requester and her system; logging the requests; attempting to determine whether the requester is a known attacker, based in the identifiers associated with the requests, and taking optional actions in response to this determination; blocking access to the data associated with at least some of the modified artifacts; notifying an admin; initiating a challenge sent to an account associated with Gary; blocking external access to Gary's account; forcing the owner of Gary's account to reset the password; and other security actions as described for the other use cases, and as will be understood by a person skilled in the art.

In the fifth use case, the security system wishes to build the profile associated with a user. This is done in a variety of ways, some of which have already been described. One method is to observe one or more requests of modified artifacts made in response to the transmission of the modified artifacts to a message recipient or modified and replacing the originals in the sent box of the originator, cluster these requests to determine one or more clusters, e.g., based on cookies, IP address, user agent, and more; record information relating to the one or more clusters, where this information is referred to as identifying information or identifiers. Similarly, such tracking information is also collected in response to messages sent to recipients being rendered, using traditional trackers, such as trackers used by email marketers. A third approach is to collect and save tracking information obtained in response to automated challenges being sent to users. The security system stores unique identifiers, descriptors that describe one or more identifiers, including data items that are used to generate identifiers such as HTML, cookies, cache cookies, flash cookies, and other active trackers. The system also stores user agent information, both relating to mail readers associated with senders of emails, and to browsers used to request modified artifacts.

Since the modified artifacts are associated with identifiers that will also be stored in the profiles, along with at least some of the above-mentioned identifiers, the modified artifacts can be associated with profiles. This way, it is determined, based on at least some of mail user agents, browser user agents, active trackers such as cookies, identifiers associated with modified artifacts, and email addresses and other account identifiers associated with users associated with the system, how data is shared, accessed, transmitted, and accordingly, what accounts, browsers, mail readers, and more are associated with each other. This type of data is stored in the profiles, and in log data that describes the use of the system, and which allows the auditing of sending activity. As soon as new information, such as a new identifier, is observed or associated with a profile, it is determined whether to store it in the profile or associated storage.

Replacing artifacts with modified artifacts have many other benefits. For one thing, if the data associated with the modified artifact can be changed a posteriori, i.e., after the transmission of the message to the recipient, then that has security benefits. One already known benefit with this is that artifacts that are not known to be insecure at the time of receipt of the message, but which are determined to be insecure before or at the time of the requested access of the associated data—these artifacts allows security systems to retroactively limit access to dangerous data. Some aspects of that can also be achieved for protected users, by the security system replacing messages with modified messages as more insights are obtained. However, the replacement of artifacts with modified artifacts expands this protection to users who are not protected users, and the disclosed technology further extends the benefits from the mere protection of recipients from dangerous content to data leak prevention, in that the security system can retroactively modify what data is being transmitted.

One particular modification of data is the replacement of the original data with data that is deceptive or incorrect, and the replacement of original data with data and controls that facilitate an extraction of identifying data from the computer systems of the recipients; this is beneficial in scenarios where the security system determines that it is highly likely that a recipient of a message or requester of data is a malicious party, such as an attacker having corrupted an otherwise legitimate account that has received the message; that an attacker has forwarded data from a corrupted account to an account that is legitimate but which is controlled by the attacker or a party in collusion with the attacker; or where a breach renders data accessible to parties who should not access the data. The latter is so since breached messages will not contain data that can be accessed by a party without the collaboration of the security system. This can happen by the security system sending the data in response to a request; by the security system sending a key used to unlock encrypted data in response to a request; and similar approaches, as will be appreciated by a person skilled in the art.

In one embodiment, as a user sends an email, the security system will modify the email, before it is sent on towards is intended recipient(s) with one unique modified message per intended recipient, where each unique modified message comprises modified artifacts, and modified artifacts for different recipients are unique. In another embodiment, the security system will replace messages with modified messages before they are transmitted towards their destinations, but will also access the sent folder of the sender, assuming the security system has access to this, and modify the messages shown in the sent folder with modified messages, where these messages are modified in yet another unique manner, causing trackers are identifiers in the message in the sent folder to be different from those received by the recipient(s) of the corresponding message. A modified artifact in a message in the sent folder of the sender of the message will still correspond to the matching modified artifact of the message received by the recipient, and will map to the same artifact data, but will have different identifiers and/or trackers. Based on whose mailbox the modified message appears in, the associated identifiers of the modified artifacts will, when interacted with, cause the association of the trackers of the party of the associated identifiers and the tracking information associated with her profile. Thereby, if an attacker compromises the account of the sender and views messages in the sent folder, this will be distinguishable from if an attacker corrupts the recipient of a message and views the corresponding message; the same holds for the associated artifacts, when applicable. Thus, in this embodiment, messages in the sent folder will be modified, including having trackers added, preferably.

In one embodiment, if there is a detection of increased risk of compromise, a special action is taken to screen the message and the data that corresponds to its artifacts or modified artifacts. If the system determines that the risk that Alice is compromised is above a threshold of acceptable risk then there is also a risk that, should Alice's computer or account be controlled by an attacker, that the same attacker wishes to cause Bob's computer or account to be compromised. For example, a message from Alice to Bob may contain an artifact that has an executable component (e.g., a website with malicious JavaScript code, a word document with a malicious macro, or another executable file). Whereas this is also possible even if Alice is not compromised (e.g., by Alice accidentally sharing a dangerous document), the risk for it is higher when Alice is compromised. The message may also contain phishing HTML links, as described in the 2007 ACM publication "Social Phishing" by Tom Jagatic, Nathaniel Johnson, Markus Jakobsson, and Filippo Menczer. Therefore, when the risk exceeds a first threshold, the system takes additional actions to screen the message and any associated elements associated to its artifacts. If the risk exceeds a second threshold that is higher than the first threshold, the system has identified an even higher risk, and may take another action, such as removing or replacing portions of a message, removing or replacing elements corresponding to one or more artifacts. For example, it may remove any file or aspect thereof that could be a risk, even if it is not determined that the file does pose a risk. For example, it may replace any word document with a macro, even if it does not detect that the macro is dangerous, where the word document with the macro may be replaced by a word document without a macro, or the word document with a version of the macro that cannot access certain functionality of the computer it is executing on.

In one embodiment, a message intercepted by the proxy is sent to a mailing list. The security system expands the mailing list by generating one copy of the message for each member of the mailing list, followed by the processing described above to create modified messages comprising trackers and modified artifacts. In an alternative embodiment, however, the security system does not expand the mailing list, but generates the modified message as previously described, and transmits this for delivery to the mailing list. In that second case, more than one recipient will receive the same message, except for potential differences in headers, comprising the same trackers and the same modified artifacts. In this situation, the security system determines whether artifact data is requested from a first recipient associated with the mailing list or a second recipient associated with the mailing list based on trackers comprising identifiers that the security system recognizes from previous messages having been delivered and rendered, or associated modified artifacts interacted with, both resulting in tracking the associated requesting device. This allows the security system to associate the rendering or the request with one particular computer, and optionally, when a tracker has been associated with one unique recipient, with that email account. A person skilled in the art will recognize that these techniques also apply to other types of messaging, such as SMSs and MMSs sent to groups, and other similar constructions.

If the security system cannot determine the identity of the requestor, it may generate a challenge and send this in place of the artifact data. One example challenge would request that the user enter his or her email address in a field, after which this is transmitted to the interaction unit or the proxy of the security system, whether related to a PUT or GET request, or in the form of a message. The security system optionally responds to this response by sending a code or other validating data, by email to the computer that made the artifact data request, requesting that this is input in the user interface where the user previously entered his or her email address, or another user interface associated with the user. This code or other validating data is then transmitted back to the security system, allowing the security system to uniquely associate trackers with the email address. The security system then serves the requested artifact data, which is then rendered on the computer of the user. A person skilled in the art will recognize that there are many alternative methods of generating challenges to achieve the same or similar goals, and that this method is also applicable to other contexts where no identifier data is received, or where the identifier data is incomplete, untrustworthy or otherwise necessitates a validation.

An example of such a situation is when a recipient first uses a new device to access email. This new device may share some identifiers with previous devices associated with the same user, such as IP address, carrier, mail server, and similar, but may be sufficiently generic that no firm identity determination can be made. Similarly, if a recipient that is not a protected user forwards an email to a third party and this third party accesses the email by rendering it and/or attempting to access a modified artifact, then the security system is not likely to have tracking data related to this third party, and a validation is beneficial.

Consider a user that is being sent a message comprising an artifact such as a first word document. The security system, in one embodiment, replaces this artifact with a modified artifact, where the modified artifact is a second word document comprising a VBA macro that preferably is digitally signed by the security system or another trusted entity, and where the VBA macro requests data from the security system as the modified artifact is opened by the user. The request preferably comprises an identifier that the security system associates with the requesting user, the modified artifact, the message associated with the artifact, the message associated with the modified artifact, or some of these. The macro also preferably causes identifying information associated with the user device, user, network environment of the user, or other such tracking information, to be transmitted to the security system.

The request causes information to be loaded from a repository associated with the security system, where the loaded information enables the viewing of the document text, the document imagery, and other document features such as additional macros, where at least some of these were not initially provided in the second word document, or only provided in a form that did not enable viewing. Viewing includes accessing audio information, to the extent that this is present, in this context. The macro is preferably signed to improve the end user experience of the recipient. The same approach can also be used for excel documents.

If the message comprises an artifact that is not of a format that allows macros, such as a TIFF file, then it can be replaced by an image that allows macros, such as a word file, and a request for the TIFF file made by the macro, as described above. Alternatively, a URL can be provided instead of the artifact, where the provided URL is the modified artifact, and clicking on it causes a request for the associated document, such as the TIFF, in addition to the collection and transmission of tracking data, as described in other examples. In one embodiment, the TIFF file is represented in the delivered message by an icon that is an image specifying the file name, the file type, a thumbprint of the TIFF file image, or similar, and where a hyperlink is associated with the image. Thus, the recipient of the message perceives that a TIFF file is attached, and when he or she clicks on the icon corresponding to the file, a request is generated, and the security system collects tracking information, information relating to the modified artifact, etc., and responds with data after making a security determination.

The data received by the requesting party may comprise an executable file, such as a macro, that is used by the security system to collect additional data relating to the security posture of the user device and his or her network environment, or it may simply comprise the original data associated with the artifact that was transmitted by the sender to be delivered to the recipient who is requesting data. A person skilled in the art will recognize that this applies to any form of file, and not just TIFF files.

In one embodiment, the security system performs periodic system health checks of sender computers and/or recipient computers by placing code performing security evaluations in the modified artifacts of messages sent to recipients, and in challenges sent to senders. One approach for this involves a digitally signed VBA script, which can probe the user system to determine whether it has any vulnerabilities, similarly to how malware code might probe a system with the goal of finding and using a vulnerability.

Alternatively, the security system may request that users install a software component, such as an app, an application, a plugin, etc., that verifies the security posture of the device and which, preferably, the security system can interact with using an API, thereby verifying both the status of a device and collecting identifiers used for tracking purposes. In one embodiment, the security system requires that senders have such software installed in order to permit for them to perform security sensitive tasks, such as sending executable files to protected users; sending invoices to a CFO; to comply with an insurance policy; for all employees of a protected organization; or other policies that can be controlled by organizations protected by the security system. The security system can also require that devices are protected by such software in order to transmit data associated with modified artifacts to such devices. The software may also include protection mechanisms, such as anti-virus protection, software that protects users browsing the web, authentication methods for the end user to use to prove his or her identity, e.g., in order to pass a challenge.

The security system connects to such an agent in a variety of manners. In one embodiment, the agent is constantly monitoring email received by the user on the associated device, in addition to other events of security relevance. If a challenge email from the security system is observed by the agent, then the agent removes this email from the inbox of the user and generates a response, such as a report related to the security posture of the device, a response that proves to the security system that the registered user is operating the device, where this can be based on biometrics such as fingerprinting or use of the on-device camera.

The disclosed technology can detect lateral attacks, which is one of the most difficult attacks to identify. In an example lateral attack, Alice and Bob both work for the same organization, and Alice has been corrupted by an adversary, Eve. Eve may have phished Alice or planted malware on her machine. While the disclosed system detects a large array of such attacks, it is possible for such attacks still to succeed in unusual situations, and using methods that circumvent communication channels monitored by the security system. For example, Alice may have been tricked to install malware on her home computer, which may not be within the security perimeter of the security system but from which she occasionally accesses her work email. In a lateral attack, Eve uses Alice's account, and potentially computer as well, to launch an attack on a colleague of Alice's, or more generally, to somebody within the same security perimeter. One common adversarial behavior is for the attacker, Eve, to contact a user Bob using Alice's account, where Bob has greater network privileges within the company than Alice does. This is done in an attempt to gain greater access to sensitive resources, with Eve attempting to corrupt Bob's account as well as Alice's.

Another common adversarial behavior is for Eve to use Alice's account to make internal requests, say to Bob, where Bob may have access to financial resources, whereas Alice does not. The goal of that second attack may either be to corrupt Bob's account or computer in order to allow Eve to make money transfers using Bob's credentials, or to convince Bob to perform an action, such as paying an invoice, based on the request Eve sends from Alice's account. Eve may request that Bob updates Alice's bank account in the employee database, for Alice's automated payments to go in to a new account, which is controlled by Eve. Traditional security systems typically consider senders within the security perimeter trusted, and therefore do not block or flag messages from such senders. This enables Eve to send instructions from Alice's account to Bob's account, such as money transfer instructions, and avoids for these to be blocked. It also commonly means that the messages will be trusted by the recipients, as they come from an internal source. The messages may also contain malware, or references to locations with malware, where many systems do not scan for internally propagated malware, with the result that the message with the dangerous attachment gets delivered. The request from Alice's account, sent by Eve, may be for Bob, who may be an admin, logs in remotely to her computer to resolve an issue that requires support. As Bob logs in to Alice's infected computer, which is controlled by Eve, he now exposes himself and his computers to the same threat. These are common types of lateral attacks, and are not detected by typical security controls. However, the disclosed security system enables the detection of this type of abuse by associating an artifact sent from Alice's account to Bob's account with a risk level associated with Alice's account.

The risk level of Alice's account is determined based on the recent detected incoming message traffic to Alice's account, and its associated risk assessments; from the detection of communication from or to Alice's computer from external resources, such as C&C servers; from the detection of communication from yet other internal accounts associated with risk (as multi-step lateral moves are not uncommon); and from the identifiers associated with access requests to modified artifacts, both by Alice and Bob, where these are compared with historical access requests and their associated identifiers. As a concrete example, assume Alice's account is used to send a message to Bob, where there are indications that the message was sent using a script. This can be detected from the MUA as well as from the responses to challenges sent to Alice by the security system. It can also be detected based on anomaly detection of messaging traffic, such as inter-arrival times of requests and transmissions; historical records associated with Alice's account, and more. These indicators indicate risk. Similarly, ongoing communication with an external IP address that is anomalous or associated with risk is another indication of risk, where this suggests that Alice's account may be controlled by an external adversary.

If the risk is high enough to warrant the blocking of traffic, that is preferably done; however, if it is slightly anomalous, the system preferably just labels associated action as being associated with higher risk. Consider such a case, wherein the context of the message from Alice's account to Bob's account is not determined to be certain to be associated with an attack, but where the risk is determined to be higher than usual. As Bob reacts to the request, e.g., by requesting data associated with modified artifacts in the message, the security system identifies Bob's context, such as the computer he uses, the IP address he is associated with, and more. The security system scans the data associated with the modified artifact, and does not deliver this if it can be determined that it is an attack. However, in this example, we assume that this scan does not lead to the detection of a risk. This is possible, as the attacker may use a never-yet seen piece of malware, or a new social engineering method. Assume that as a result of these actions, Bob's account or computer is compromised, and a message is sent from Bob's account to Cindy, who may be another insider, or to Dave, who is an external party. Alternatively, assume that one or more requests are made from Bob's account; these may correspond to requests for modified artifacts of the past, for example, whether associated with messages Bob sent or received.

These events are now associated, by the security system, with the risk that it had previously associated with Alice. If any of these requests or actions are anomalous or otherwise trigger a risk sensor, then this is taken to confirm the risk associated first with Alice and now with Bob. Therefore, whereas the Alice-only risk assessment may indicate a relatively low risk, and the Bob-only risk assessment may also indicate a relatively low risk, the combination of the risk observations lead to a much greater risk. This risk is computed across events associated with multiple users associated with the security system, and compared to a threshold. If this combined risk exceeds a threshold, a security action is taken. Once such an action is taken and an attack is confirmed, the chain of related corruptions is unraveled by the security system and corrective action is taken to all potentially affected accounts and computers. Preferably, the security actions comprise the containment of high-risk traffic, whether web traffic, messages, or data requests, both for Alice and for Bob.

In one embodiment, one or more of the affected accounts, such as Bob's account is entirely quarantined, disabling all activity associated with the account, the computer, or both. In another embodiment, only traffic that is not identified as most certainly benevolent is blocked, which allows the real Bob to continue using his computer and account, at least to a limited extent. Bob may, in this scenario, be able to send internal emails, and forward safe artifacts, but not communicate with the outside world or send artifacts not known to be safe. In this context, a safe artifact may be one that cannot contain an executable component; one that was generated by a user who is not deemed to be at risk of having been affected by the detected attack, or similar. Notifications are preferably sent to both Alice and Bob, using other communication channels that are determined not to be affected by the attack. For example, if the attack is determined to be likely to be a phishing attack, using methods described in this disclosure, then an alert may be sent by SMS.

If the attack is determined to be malware, but the malware is determined to have affected Bob's laptop, then it is also safe to send an SMS. However, if the risk of corruption indicates that Bob's phone may have been corrupted by malware, based on the detected events and the requests made using Bob's accounts and/or devices, then it is better not to send an SMS alert, as that may inform the attacker. It is commonly better for the attacker not to know that they have been detected. For this reason, it is also beneficial to automatically generate a false instance of Bob's account and/or computer, which is a form of honeypot, populate this with synthetic data generated to deceive Eve, and observe the attack proceed in the honeypot. All of these aspects are preferably automated, and performed by the security system. In addition, the system also automatically generates and outputs a list of users that appear to have been affected by the attack, thereby facilitating manual follow-up and clean-up.

In a related attack, the security system detects an attack by Eve, mounted on Alice and Bob, based on both Alice and Bob exhibiting similar and anomalous behavior. For example, assume that requests for modified artifact data from both Alice and Bob, including responses to challenges, result in slightly anomalous measurements being observed by the security system, but wherein the measurements correspond to the same type of anomaly; while each of the anomalies might be relatively minor, the combination of the two makes for a greater anomaly. This type of amplified anomaly, which can also be expressed as a threshold whose level is adjusted based on the number of observations, also applies to greater number of observations. For example, observing three slightly anomalous requests from different parties in a system will cause for a stronger resulting anomaly signal than observing just two of them. Furthermore, the amplification of the anomaly is also strengthened if there is an apparent causal relationship between different observations, such as if Alice sent an email to Bob prior to the anomaly being detected for Bob, or both Alice and Bob receiving an email from a third party, who may be Eve.

Thus, an important aspect of the disclosed technology is the power to consider sets of potentially related events, and determine when such a set of events correspond to a risk associated with an anomaly, based on multiple measurements, each one having an anomaly. For example, if both Alice and Bob are associated with a heightened risk of having been phished, e.g., the use of a non-recognized computer from a new IP address, then that is cause for concern; however, if both accounts seem to be accessed from the same previously non-recognized computer, e.g., based on placing a cookie on the computer during the first access and recognizing the same cookie during a second access, where the first and second access are for the two different accounts of Alice and Bob's, then this is an even stronger indication of risk than if there is no match.

Similarly, if both Alice and Bob's accesses, such as of data associated with modified artifacts, are both exhibiting signs of scripted access, then that is also a greater risk than if they both suffer different anomalies, such as Alice being associated with a slightly higher risk of having been phished whereas Bob's account is associated with a slightly higher risk than normal of corresponding to use from a stolen device. The risk is even greater, as explained above, if Alice and Bob share some recent history, such as having exchanged messages with each other, with one and the same third party, both having opened a file of a particular type (such as an unknown excel file with a macro), or both having visited the same website or a website in the same somewhat risky domain.

This method of identifying consistent anomalies across a range of different events and users is very useful to amplify anomalies and thereby obtain better sensitivity to risky events that, one by one, may not be distinguishable from slightly unusual but benevolent situations. The approach of using amplifications of anomalies by comparing anomalies to each other for different users, and to historically observed anomalies associated with known attacks, is useful not just in the context of detecting lateral attacks, as described above, but more generally, to detect any form of attack targeting multiple intended victims.

A further benefit with the disclosed technology is a method to attribute the access attempts to data to a user making the request, thereby enabling a fine-grained audit ability relating to the access of data. This has benefits in many contexts, such as where a breach is feared, where it is desired to determine whether an employee was exposed to some data; where it is of interest to determine what type of data, including individual messages and their artifacts, travel through a network. The latter can be done to improve work flows, improve security, and to audit access. It can also be done to identify leaks, preferably in combination with some form of document fingerprinting or similar technologies to help verify the nature and location of leaks. It can be used to track anomalous volumes of document sharing, and to graph the propagation of data through a network.

The disclosed technology addresses the need to determine whether a sender of messages is likely to be corrupted; to determine whether a recipient of messages is likely to be corrupted; to determine whether a mailbox comprising one or more messages with modified artifacts is accessed, and if so, in what manner. For example, the security system can distinguish between forwarding of messages; remote access to the mailbox; and the remote access of modified artifacts contained in messages, where an attacker can perform the latter by copying an artifact hyperlink using a channel other than forwarding the message, e.g., by copy and paste of a hyperlink from one window to another of a system operated by the attacker.

There are multiple ways to modify artifacts. One way is to replace the artifact or a portion of the artifact with a reference that, when evaluated by the security system allows the security system to determine the artifact data needed to respond to the request, and indicate what user profile comprising device identifiers that correspond to the user expected to access the artifact. Here, the reference may, for example, be in the form of a URL in a hyperlink, or a dynamic link, or a parameter passed in a web request, such as a PUT or GET request. The reference data may either encode the artifact itself, e.g., be an encrypted version of the original artifact, where the data can be decrypted using a key known to the security system but not to the end user receiving the artifact. Alternatively, the reference data may be an index into a database that identifies the location of or contents of the artifact. This reference may, for example, point to a database record used to store the original artifact, where this database is accessible by the security system and may be hosted in a cloud storage. It may also be an encrypted or encoded version of a location.

The security system can respond to a request for an artifact by determining the storage position of the artifact content, retrieving the artifact content, and sending this to the requester. Alternatively, the security server may determine the storage position and respond with this location to the requester, which then can request access by the storage facility to the corresponding document. In one embodiment, the reference data comprises an index that points to the profile associated with at least one of the sender of the artifact or the recipient of the artifact (in the form of a modified artifact, as described in various places.)

In one embodiment, the reference data comprises an encrypted copy of the artifact or portions thereof, which is decrypted by the security server and provided in response to the requester. In situations where the security wishes to provide alternative content to the requester, then this content is retrieved or generated and sent to the requester; or generated and stored, and then a storage location associated with the generated artifact content is transmitted to the requester. The security system creates fake artifacts in one of a variety of manners, mimicking a real document of the same type. The type can, for example, be a fake wire transfer receipt, a list of fictional W-2 records, a list of fictional spreadsheets with financial data, and more. These can be created a priori or on the fly, as needed. It is well-known how to produce realistic-looking files of these types in an automated manner, or using online services, as will be appreciated by a person skilled in the art.

The security server determines what type of file to generate based on performing a scan of the artifact to be replaced with a fake artifact and classifying the contents according to one or more heuristics. In addition, recent messages may be considered for the determination of type, where these messages are messages between the two parties considered, i.e., the sender and the recipient of a message with the artifact that has been replaced with a modified artifact. For example, if a recent message from the suspected party to have been compromised includes a reference to a wire transfer (e.g., has the words "wire", "transfer", "payment", or "bank") then a fake wire transfer receipt is generated, preferably with additional information such as account numbers or amounts from the message containing the reference to the wire transfer or associated messages in the same thread. Conversation topics can be determined using the methods of U.S. Pat. No. 10,129,195, entitled "Tertiary Classifications of Communications" to Jakobsson, which is incorporated by reference.

If the replaced artifact contains apparent names and social security numbers then the security system provider generates a similar-sized file comprising names and numbers looking like social security numbers, where these are preferably randomly selected according to a realistic probability distribution.

By comparing identifiers associated with various artifact access requests to one or more models, which can be created using a machine learning component that identifies normal and abnormal behavior associated with one or more user accounts, the security system provider scores and classifies each artifact access request. The classification may be one of several categories, such as "regular user on office computer", "regular user using a laptop in the neighborhood of the office", "regular user using a personal phone that is recognized", "likely corruption due to credential theft", "likely corruption using a malicious script running on the computer of the regular user", "likely theft of a personal phone belonging to the regular user", and more. One or more such classifications can be assigned to each artifact access request, which is a request corresponding to one of the modified artifacts. The score corresponds to a certainty score, as assessed by the model, based on the one or more accesses.

For example, a "regular user on office computer" may correspond to a set of previously seen trackers for the user; the user agent of the same browser the user normally uses; an IP address in the typical IP address range; and a non-anomalous number of artifact accesses. In contrast, a phishing attack, which corresponds to "likely corruption due to credential theft" typically does not have the previously seen trackers, or not a large number of these; it typically has an anomalous IP address; and may commonly result in a larger number of artifact access requests than the user would typically make in a given time period. The "likely corruption using a malicious script running on the computer of the regular user" may in one example correspond to the correct trackers, but inclusion of some previously not seen indicators of automation, such as headers in the requests being submitted by an apparent script. It typically corresponds to a non-anomalous IP address, but the inter-arrival time of the artifact access requests may be very short, such as ten requests every second, being indicative of origination from a script as opposed to a human user. The event "likely theft of a personal phone belonging to the regular user" would, in one example, correspond to the expected set of trackers; an IP address that is not previously observed but with a geolocation within ten miles of the normal geolocation; and an unusual number of artifact access requests within a given time period, such as one hundred requests over the course of 20 minutes. The detection of undesirable events and the generation of one or more classifications and scores is preferably made using a machine learning element of the security system.

After one or more classifications and associated scores are generated, a comparison is made with one or more thresholds, and one or more security actions are taken according to a policy associated with the account. Based on the classification, different security actions may be taken. For example, if the highest-scoring classification is "likely corruption using a malicious script running on the computer of the regular user" then the security system will preferably block any outgoing communication associated with the account, such as sending of messages, making GET or PUT requests, or communicating with a suspected command and control (C&C). The security system may also automatically replace all data being transmitted with "honeypot" data, i.e., fake data of the right types, meaning types corresponding to the accessed artifacts.

At least some of the artifact data elements that are transmitted may be weaponized, contain trackers to identify what the attacker system looks like; or be part of a strategy to slow down the progress of the attacker, e.g., by containing data that looks salient but which wastes the time of the attacker. In addition, the security system preferably will initiate the cleaning of the infected computer, e.g., by automatically downloading or engaging specialized tools on the computer to locate and contain the malicious script. Any communication with other accounts is quarantined if there is any risk at all that they contain infected material, e.g., has an attachment or other artifact associated with risk. As a person skilled in the art will recognize, there are many meaningful actions.

If, on the other hand, the highest-scoring classification is "likely corruption due to credential theft", which corresponds to a typical phishing attack, for example, then it is not necessary to limit all access to the account, but only to accesses associated with the attacker. This can be determined by the IP address and trackers, for example. In addition, the security system may automatically initiate a password update in which the legitimate user sets a new password after having performed a KBA or proven access to some resource, or otherwise proven that he is the right party. Many methods to do this are known, as will be appreciated by a person skilled in the art.

As one more example, consider the actions taken if the security system determines that the highest-scoring classification is "likely theft of a personal phone belonging to the regular user." The security system may preferably remotely engage an encryption of the entire contents of the stolen device; initiate the localization of the device using methods relating to IP address, triangulation of signals, remote querying of GPS, remote querying of visible WiFi networks, and more. This is preferably combined with an automated reporting of the loss. In one embodiment, the localization action is preceded by the placement of an automated call to the user, allowing the user to prove his or her identity, e.g., using KBA. If the theft detection was found to be a false positive, the physical tracking down of the device is not initiated.

As a recipient interacts with modified artifacts, downloading the associated artifact data, this artifact data is preferably not cached on the recipient computer. That can be achieved in a variety of ways by the security system, including to set a do-not-cache indicator. Cache control is well understood by a person skilled in the art. However, some aspects of the artifacts, namely associated trackers can be cached, as these do not carry sensitive information. In one embodiment, some trackers are set not to be cached and others are set to be cached eternally or a very long period of time. At least some eternal trackers are not unique to a given artifact, but rather, to the computer on which they are planted. Some eternal trackers are unique to the associated artifacts or associated emails. Example trackers comprise HTML cookies, cache cookies, flash cookies, and user agent strings. Trackers are also placed on computers associated with malicious behavior, if possible. When an artifact request is later performed by a user, the security system receives zero or more trackers.

If the system receives or observes an eternal tracker, this helps identify the computer. The security system performs tracking corresponding to what trackers are present on the user computer. If the user computer transmits information associated with a tracker that should have been expired, that is an anomaly, which may have been caused by a malicious capturing and replaying of tracker information. If the user computer does not transmit information associated with a tracker that should have been present, that is an anomaly, which may have been caused by an access from a new computer, whether by the legitimate user or an attacker.

Since sometimes, trackers, such as HTML cookies, are erased, the security system preferably determines whether some of the multiple expected trackers are present, and performs a determination whether it is likely that it is the expected computer or not.

In one embodiment, all downloaded artifacts such as word documents, pdfs and PowerPoint files are automatically stored in the cloud, as opposed to on the computer of the associated user, and when the user attempts to open a file of this kind, then the corresponding document is retrieved from the cloud storage. This is already commonplace today, for other reasons, but is preferably integrated with the disclosed technology so that requests for cloud-hosted files result in a notification being sent to the security system by the cloud storage entity, which may be part of the security system or associated with it.

As described in this disclosure, anomalous access to cloud stored files is detected by the security system in the same manner as anomalous access requests to modified artifacts; this includes the detection of anomalies, the notifications and logging of associated security events, and the optional replacement or blocking of the data requested. This way, an attacker that has gained access to a computer is detected by the security system as the attacker accesses files "on" the computer, e.g., by clicking on icons automatically requesting some or all of the files in the file directory of the corrupted computer. This extends the security of the protected user from email and other forms of messaging to access to documents reachable from the corrupted computer. Since attackers commonly access documents as part of a strategy to extract information used for further targeting of messaging-based attacks, this protection adds additional security to the messaging-based protection described elsewhere in this disclosure.

One common attack that the security system detects but existing security technologies do not detect relates to an auto-forwarding attack. This is an attack where an adversary, call her Eve, corrupts a device or account of a user Larry, who receives email from a user Victor. Eve's corruption of Larry's device or email account causes the email from Victor to Larry to be automatically forwarded to Eve. For example, Larry may be a realtor, and Victor may be a home buyer. When Eve learns that Larry has made an offer to a home seller, and that this has been accepted, then Eve wants Victor to pay Eve, in the guise of an escrow company, the funds for the closing. Eve knows the details of the home purchase, e.g., address, purchase amount, down payment, closing date, buyer and seller name, etc., since she obtains copies of all emails sent to Larry. Eve then creates a fake escrow agency webpage and email address and contacts Victor, sending him information about where to send the funds prior to closing. This will take place some week before Victor were to receive the real email about the closing, or the real email about the closing is somehow blocked by Eve, having access to Larry's email. Larry is the launchpad victim in this scheme, and Victor is the intended victim. This type of fraud, sometimes referred to as the "homeless home buyer" scam, is not detected by traditional security controls. However, the disclosed security system detects and protects against this type of attack. Consider two cases: a first case in which Larry is a protected user, and a second case in which Victor is a protected user.

In the first case, all emails received by Larry will be inspected by the security system, and artifacts replaced with modified artifacts. The security system will therefore know when the associated data is requested from anomalous locations, by anomalous devices, at anomalous times of the day (in the context of Larry's historical behavior), and so on. This detection is described in great detail in various examples in this disclosure, along with various security actions that are taken in response to the detection. The security system also determines that all, or much, incoming email is also automatically forwarded. It knows this since all incoming email is identified by fingerprints computed on them by the security system, such as MD5 digests of the content, the headers, or portions of the content and headers; and these fingerprints are compared to fingerprints computed on outgoing traffic associated with all protected accounts, including Larry's account. This makes it evident that portions or all incoming email traffic to Larry is being forwarded to another account. This does not have to be a malicious event, but is noteworthy, and in combination with this detection, the security system determines that the forwarded material is accessed by anomalous accounts from anomalous locations at anomalous times, or portions of such observations. In response to a discovery of a likely forwarding attack as the one described above, by Eve on Larry, the security system may block outgoing emails determined to be automatically forwarded; replace them with synthetic emails that are generated by the security system with an aim of deceiving the recipient, Eve; the security system also preferably notifies Larry or a party associated with Larry, such as an admin.

Additional methods of detecting a likely forwarding attacks comprise the detection, by the security system, that modified artifacts are interacted with by an unknown (and therefore anomalous) user (Eve) from anomalous locations at anomalous times, or portions of such discoveries, where this anomalous interaction may take place before the interaction with the content by the intended recipient Larry; this is not always a sign of malice, but commonly so. Other access pattern anomalies can be used, as will be understood by a person skilled in the art, to determine that a protected user Larry is likely to be the victim of a launchpad attack in which all or some of Larry's incoming email is forwarded to an attacker Eve. Similarly, the security system can detect if Eve reconfigures Larry's email account to always bcc Eve on outgoing emails; this is detectable as it is an anomaly compared to historical behavior of Larry. Moreover, it is detected as matching an adversarial strategy, so even if the action turns out to be benevolent, it warrants verification by the security system, Larry, or a party associated with Larry, such as an admin. The security system may send an automated message to Larry when a likely attack like this is detected, explaining what was observed, and how to address this if it is a problem. The security system preferably blocks its warning emails sent to Larry from being forwarded; this is done by screening outgoing emails from Larry's account and determining which ones not to deliver.

In the second case, the security system protects Victor. It detects that Victor's emails to Larry are rendered and interacted with from a location that is anomalous. In one version that matches the examples provided previously in this disclosure, this is detected based on an anomaly identified based on the historical behavior of Larry's system. However, it is also possible that Larry was corrupted by Eve before Victor's first interaction with Larry, and therefore, the security system does not have any baseline truth behavior to associate with Larry, and cannot identify anomalies for that reason. However, the security system still can determine that emails sent to Larry are commonly rendered in two locations, by two different devices, and sometimes, in two different time zones. Whereas this is not necessarily indicative of fraud, it is correlated with high risk, and therefore, if such observations are made, they will be flagged.

The security system also preferably determines, based on public records associated with the domain of Larry's where Larry is expected to be located. For example, an Alabama real estate firm is likely to be in Alabama, somewhat unlikely to be in Maine, and rather unlikely to be in Romania. The security system preferably compares observed access patterns to historical access patterns associated with known attack behaviors, and determines when it is likely that there is a match to one of these. The security system then classifies the associated known attack as being a likely source of the observed behavior, and takes remedial action, which may include sending warnings; sending challenges; modifying traffic; withholding requested data, potentially selectively, e.g., only withhold it from the likely malicious location; automatically modifying requested data before it is transmitted, potentially also selectively; and more.

If the security system determines that an email sent by Victor has likely been forwarded to a malicious party Eve, and that Eve may have obtained actionable intelligence from the email, then incoming emails to Victor are more carefully scrutinized. Any requests for sensitive data or funds are detected by the system, using one or more heuristic searches on incoming traffic, and when such a message is detected, it is flagged. Flagged messages are, for example, modified to include warnings before being delivered, or are forwarded to an admin for review, or are blocked. The decision of what action to take is preferably guided by a policy associated with the protected user, Victor, or based on a risk assessment performed by the security system. Such risk assessments may be based on matching high-risk emails to profiles of known abuse types or known attack instances; by identifying mention of large amounts of money; by identifying senders with anomalous locations in the context of the recipient, Victor, and more. A person skilled in the art will recognize that there is a large number of meaningful security actions to be taken on a flagged email.

In one common attack, the attacker corrupts a first party (the launchpad victim) and determines that a second party is a good target. The attacker may have corrupted the first party in a variety of ways, including by stealing a mail account credential of the first party, by guessing the mail account credential of the first party, by placing malware of a device used by the first party, or by otherwise gaining access to an account or device associated with the first party. The attacker generates an email, to be sent from an account of the first party to the second party, where the attacker adds a reply-to address different from the first party's email address, but commonly, similar to this. For example, if the first party's email address is first.party@company.com or first.party@gmail.com, the attacker may register an account first.party@hotmail.com, an account first.middlename.party@gmail.com; or may register a domain company-email-server.com and use as reply-to address the email address first.party@company-email-server.com. The goal is typically to make the second party believe she communicates with the first party (from which the attacker's first email to the second party will come) while moving all the communication to an address that looks like it is associated with the first party, but which is not. That way, the attacker avoids the detection of the first party.

The system detects that the attack email from the attacker to the second party from the account of the first party is associated with a high risk. This is done in one of the ways described in this disclosure, e.g., by determining that the attack email was sent from a device not previously associated with the first party; that the attack email was sent using automation, whereas the first party typically does not use automation; or that the attack email was sent using other software than the first party normally uses (e.g., a browser instead of an on-device mail client); that the attack email was sent from another environment than typical emails from the first party (e.g., using another carrier, Internet provider, from a different time zone) or a combination of such indicators. The use of a reply-to address other than the sending address is also a risk indicator, especially when this reply-to address has not been used by the first party in the past. Using risk indicators such as these, a risk score is computed and compared to a threshold; if the risk exceeds the threshold, the attack email is considered to be high risk by the security system, and an action is taken.

As described elsewhere in this disclosure, such action may include generating a challenge, including a warning, delaying delivery, etc.; as well as combinations of such actions. Additionally, the system may remove the reply-to address, or replace it with an email address associated with the security system, allowing the security system to continuously monitoring emails sent to this address and determine whether to forward these to the address the attacker added as the reply-to address; whether to block the monitored email; etc. Thus, the reply-to address is both part of the risk assessment and the action in this example.

A person of skill in the art will recognize that the methods in this example can be combined with the other methods described in this disclosure, and that variations of the methods can be used to address the same or similar problems.

Another aspect of the disclosed technology is a pattern detection unit, which is preferably part of the security system. This detects series of access requests relating to artifacts, and determines if the access pattern associated with this is anomalous. This is preferably determined relative to the normal use of the account or accounts for which the artifact access requests are made. Consider as an example a given user normally renders a received email within 18 hours of receiving it, and then, for a particular sender identity or class of sender, requests the associated artifact within 5 minutes. The user then responds to the email with a certain probability, places it in another email folder including the trash folder with a certain other probability. If the email was placed in the trash folder, this example user only requests the artifact again with a probability of, say, 0.01%, whereas if it is placed in a folder called "to do", he or she requests it again with a probability of 3%; and if it remains in the inbox the user requests the artifact again with a probability of 8.2%.

Note that the system can be configured to determine the location of messages, to determine what actions a user takes on these. This particular user has a particular distribution of "second" access requests, e.g., makes a second access request for more than four different artifacts within a period of less than ten minutes with a probability smaller than 0.004%. Each user has different usage patterns, and these are learnt by the security system simply by recording the pattern of access requests, preferably combined with knowledge of how messages are moved between folders, which is accessible to protected users for which the security system has read access to mailboxes. This is common for users with cloud hosting of emails. Typical malware may request all artifacts sent to a CFO that has been compromised, or all artifacts from a particular vendor, or all artifacts of one of these types sent within a one-month period. That would not be a typical user behavior for most users, and is therefore indicative of a corrupted user.

Returning to the detection of anomalies, this is preferably done by the security system comparing a series of artifact access requests to a model, as described above, where the model is preferably created and accessed using traditional machine learning methods or related techniques. If the access requests associated with a user account are anomalous, or if the trackers are anomalous or incorrect, or a combination of these, then the security system takes a security action. The security system also determines whether multiple accounts are being accessed in an anomalous manner, as that may be due to an infection or compromise that all of these accounts suffered. This can permit detection with lower thresholds, i.e., higher accuracy, given the greater number of accounts being observed.

If an anomaly is detected for one of these accounts, such as a tracker anomaly, and the access pattern is slightly anomalous and also similar for several accounts including the one with the tracker anomaly, then the security system determines that it is likely that all accounts are affected. Similarly, it a similar set of events, such as an email from one particular sender, have been observed for all of the suspected accounts, and these exhibit a slightly anomalous behavior, then this is another indication of compromise risk. Therefore, the detection uses access request patterns for artifacts, the tracker data, message communication history, and normal access patterns to determine that one or more accounts are likely accessed by a malicious actor. Similar analysis is performed for forwarding of messages or transmission of artifacts from an observed or protected account, and the patterns and frequencies of these related to historical patterns and frequencies. If an anomaly is detected, a security action is taken.

One example security action is to contact the user of the anomalously behaving account and verify whether the message was sent; this can be done using a second channel (e.g., an SMS if the anomalous accesses related to email, and vice versa) but it can also be done using the same channel, in which case it may preferably involve some form of proof to be performed by the challenged user, such as providing an answer to a knowledge-based authentication (KBA) question; using biometrics; or proving access to some resource. Another type of secondary channel that can be used involves notifications to an app, which may request the user to prove her identity using biometrics or other authentication method. Other security actions include alerting an admin, blocking or delaying traffic, including the responses to artifact access requests; and changing the data to be transmitted in response to the artifact access requests. Yet other example security actions are described in other embodiments in this disclosure.

The security system, in one instance, receives a series of requests for artifact data associated with a user clicking on or otherwise interacting with the associated modified artifacts. If all the requests correspond to artifacts that are named "invoice" or otherwise associated with an invoice, then the security system determines that series of requests is the result of somebody searching for an invoice. If this is assessed to be the legitimate user, based on trackers and usage patterns, then no action is taken, or an optional action aimed at facilitating the search is taken. If it is determined that the accesses are likely to be associated with an attack, the security system classifies the attack as being associated with invoices.

Similarly, if all or most requests are associated with emails transmitted from a small set of users, such as vendors and the CFO, or from HR, or from admins, then the corresponding classification is that the search, if determined to be malicious, relates to one of these three groups of associated targets. If, on the other hand, most or all of the accesses relate to the term "patent," or associated documents, then the security system classifies the potential malicious accesses as being associated with such patterns. If all artifacts are requested, and this series of requests is determined to be malicious, then the request series is determined to be associated with a brute force attack in which all data is attempted to be stolen.

This type of attacker's-goal based classification is performed in addition to other classifications, such as whether the potentially compromised user has been phished, exposed to malware, had a device stolen, etc. If multiple attacks are taking place at the same time or during a short time period, and these attacks exhibit similar patterns or are associated with the same likely attacker, based on tracker information, then multiple series of requests can be considered in combination by the security system. The security system can determine the likely sophistication of an attack based on the types of requests, the stealthiness of these (e.g., vast numbers that are easy to spot or small numbers from systems that are similar to the legitimate system), and on the persistence and number of attacks of a given type or associated with a given threat actor, based on tracker information. This is another form of classification. All the classifications are of interest to report and log, to determine prioritizations for counteractions; chances in threat landscape; differences and similarities of attacks between organizations; trends in attack patterns and sophistication, and more. The security system automatically produces such reports for each protected organization, in addition to logs and alerts associated with the detection of attacks and likely attacks.

In the above, the determination and the associated precision of the classifications depend on the number of items in the series, and become more accurate with an increasing number of requests. However, the security system preferably does not want to leak any real data to an attacker, and therefore preferably does not respond with correct artifact data once a determination has been made that the access has a risk that exceeds a threshold.

One type of attack involves an attacker that places malware on a launchpad computer, and uses the malware to access information associated with the email account(s) of the user(s) of the launchpad computed, in addition to requesting access to other resources associated with the corrupted computer, such as files, other types of service accounts, etc. These requests will appear to come from the right device (i.e., the launchpad computer, which is associated with the accounts or resources) and from the right IP address. These requests correspond to requests for modified artifacts, and therefore will be observed by the security system. The security system is configured to detect anomalous accesses, which comprise: accesses in larger quantities than is common for the associated user, device or account; accesses associated with anomalous distributions, e.g., a very large number of access requests associated with documents that are invoices, or which list W-2 data; accesses made at an unusual time of the day, or at an unusual time of the day given the IP address associated with the requests; and more.

Thus, the security system builds and maintains a model associated with normal behavior, where this is preferably granular on the user and device level, and contains information about typical volumes, query distributions, inter-arrival times for queries, and more. A person skilled in the art will recognize that a model like this is preferably built and maintained using a machine learning system or related techniques that are well-suited to consume large amounts of data and identify common patterns. As an example of an instance, assume that a cellular phone has been corrupted by the attacker, but not a laptop associated with the same victim user. While the victim user may commonly request a large number of resources, of similar types and distribution as those requested by the attacker, the victim has never made such requests from his or her phone. Therefore, when the attacker makes a large number of requests using the corrupted phone, this is detected as anomalous by the security system.

The security system is configured to detect the theft of cookies by an attacker, where the attacker steals cookies from a victim in order to pose as the victim to a resource associated with the victim, or trying to extract data associated with the victim, such as modified artifacts. The system detects this type of behavior by obtaining at least some types of cookies, such as HTML cookies, but not necessarily other types of cookies, such as flash cookies; and by an unusual IP address, anomalous requests, as described above, and more. It is beneficial for the security system to automatically distinguish between different likely sources of a problem, such as the likely infection of a device by malware vs. the likely theft of cookies from a device. By being able to assess what type of problem is the most likely, the security system is able to select the right remedial security action. For example, if a user device is believed to be infected with malware, it is beneficial to isolate this device on the network by suppressing communications to and from the device, while not suppressing communications to or from other devices associated with the same user.

The system achieves this by having device-specific policies that can be enabled and disabled on short notice. For example, any request coming from a device believed to be infected with malware can be ignored, delayed, or responded to using a honeypot system, while the system sends notifications of the problem to the user, on other devices associated with the user, but blocked from being accessed from the device believed to be infected. In contrast, if the security system classifies a problem as being likely to correspond to stolen cookies, it can immediately expire the affected cookies, but not other cookies not known to be affected. In addition, the security system can automatically initiate a more detailed scrutiny of the likely source of the problem, in which it is determined whether it is likely that the user device has been stolen, or whether the observed behavior is simply a false positive. This can be achieved by sending an authentication request to the affected user, such as a 2FA request; if this is correctly responded to, the system determines that the observation was a false positive.

It is beneficial for the security system to detect ransomware attacks and related abuse. Ransomware attacks commonly involve an intended victim receiving an email from a stranger, containing either a malicious attachment or a malicious URL. Sometimes, the stranger has a display name that matches the display name of a party the intended victim has a trust relationship with—this can be done by attackers who identify relationships using social networking data; it can also be done using "commonly trusted" display names, such as display names matching well recognized brands. In some ransomware attacks, the email comes from a party that is trusted, i.e., a contact of the intended victim. That is commonly carried out by attackers who compromise one account or computer and then identify contacts of the associated user, automatically or sometimes manually, sending them an email from the corrupted account. This can, for example, be performed automatically right before the payload of the malicious artifact is encrypting the contents of the launchpad user's system, after which the ransom note is presented to the launchpad user, who is also a victim, of course.

To address this, the security system rewrites artifacts, as described in this disclosure, by replacing them by modified artifacts. The security system identifies anomalies, such as multiple self-similar email messages being sent almost immediately after a modified artifact is requested by a protected user. The security system can automatically request the data associated with such artifacts, and detonate these using known techniques, to determine whether the artifacts were malicious. If so, then any request for these artifacts would be blocked, and the event preferably reported. This detonation analysis can also be performed for incoming messages, before the security system agrees to serve the recipient the data associated with the modified artifact associated with the message.

Artifacts are preferably detonated if any aspect of the message is higher risk than tolerable, which is determined by the security system computing a risk score and a confidence score based on the sender MUA and comparing at least one of these to a threshold; or on the response to a challenge sent by the security system to the sender. It can also be triggered by the security system detecting that the sender is not trusted by the recipient, i.e., has not exchanged more than a threshold number of messages within a time period exceeding a threshold time, or other alternative measures of trust; but has a display name that matches the display name of a trusted party relative to the recipient or to a general public, where the latter case corresponds to a match with a well-known brand name. A person skilled in the art will recognize that there are other ways of identifying trust, some of which are given examples of in this disclosure. When the risk exceeds a first threshold or the confidence is below a second threshold, then additional scrutiny or security actions are performed. Examples of these comprise evaluating the artifact data in a virtual machine and identifying whether any unwanted action results from this; performing an anti-virus scan on data associated with the artifact; determining whether the artifact comprises or is associated with executable instructions; and more.

An example tracker in the system is a simple web bug or beacon, integrated in an email. This is well understood by a person skilled in the art. Another example tracker is a unique hyperlink, associated with a modified artifact, that when requested, identifies the artifact data being requested, and with that, the recipient of the associated email or other message. Another type of tracker is a cookie, such as an HTML cookie, flash cookie, cache cookie; or user agent data, that is made available to the security system as a result of a user interacting with the modified artifact comprising the tracker. Cookies, as is well understood by a person skilled in the art, can be set to expire at a chosen time, including a time in the very distant future.

Artifact data may be webpages, word documents, pdf documents, images and more. Such data may by itself contain trackers. The artifact data may be set to not be cacheable, i.e., not be possible to store on the user system (forcing it to be requested anew when needed); and may require authentication to access, where the authentication may use a password known only to the legitimate user. In one embodiment, a freshly downloaded artifact data item does not need password access to view, but if the item is locally saved, then a policy associated with the item causes a password to be required to access it again. However, a user may also request the data item anew by clicking on the modified artifact. Some modified artifacts can be saved on the local system, whether with or without first being interacted with by clicking on them, but configured so that they cause an interaction with the security system when opened. A person skilled in the art will recognize that there are many other variations of this, and that these examples are just for illustrative purposes. One tracker method based on caches is described in U.S. Pat. No. 8,930,549, entitled "Method and apparatus for storing information in a browser storage area of a client device", which is incorporated by reference.

In many cases, trackers that require a user click, such as trackers associated with modified artifacts, give more identifying information than trackers that identify a user based on rendering of the email in which the trackers are placed. Therefore, rendering will give one precision of identification and the requests for modified artifacts will give another precision, which is higher. The response to challenges is similar to the requests for modified artifacts in this regard. Similarly, the MUAs of email messages give less identifying information than the trackers associated with modified artifacts, and in many cases also less than the trackers that convey identity information as emails are rendered. However, these three types of trackers have overlapping and/or corroborating information, making it meaningful to compare the result of one tracker of one type to the saved profile associated with an account, and with another type of tracker.

For example, all three types of trackers typically identify the operating system and version thereof of the party that is being tracked; MUAs and associated headers commonly comprise IP data, and the requests associated with modified artifacts always do. However, these do not need to match, as is understood by a person skilled in the art, but commonly do. It is therefore beneficial to build extensive profiles of users and their associated devices; locations; service providers such as carriers and Internet service providers; mail server names; operating systems and versions; language support; presence of various types of cookies; and other data useful for distinguishing one computational device from another. Moreover, headers indicating automatization, such as indicators of APIs used or scripting applications used, are also useful as these portray the typical usage context of an account, in the context of a given user. We provide several examples of all of these aspects herein, but a person skilled in the art will recognize that the examples are merely for the purposes of illustration, and the disclosure is not limited to these examples.

One example tracker uses an executable script to locate identifiers and generate a key, a digest or a checksum based on these, where this value is communicated to the security system, potentially over an encrypted channel such as an SSL connection, or potentially using no encryption but instead a rotating code so that two different tracker communications are distinct and preferably not possible to forge. An example rotating code is that produced by SecurID®. The script can be a JavaScript element or an executable such as an app or a certified code segment allowed by the user or his admin to execute on the computer. When the tracker is first placed on the device, it either performs one or more measurements from which a key, digest or checksum is computed; it stores a state obtained from the security system or an associated party; or a combination of these. One example script is in the form of a browser plugin. Some scripts automatically access incoming and outgoing messages and generate a checksum that depends on the messages, where this checksum is integrated in the message; conveyed to the security system along with a data request; or transmitted to the security system in response to a query. In one variant, the script simply responds to a challenge by transmitting a response, where the response is a function of the challenge and the local state, such as the key.

In one embodiment, HTTP (or HTTPS) access headers are observed when a user or a user agent makes a request for artifact data corresponding to a modified artifact. An example of such headers is as follows:

GET /www.security-system.com/artifact/GFF16E827BBA HTTP/1.1
Host: net.tutsplus.com
User-Agent: Mozilla/5.0 (Windows; U; Windows NT 6.1; en-US; rv:1.9.1.5) Gecko/20091102 Firefox/3.5.5 (.NET CLR 3.5.30729)
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 300
Connection: keep-alive
Cookie: PHPSESSID=r2t5uvjq435r4q7ib3vtdjq120
Pragma: no-cache
Cache-Control: no-cache Here, the name of the object is /www.security-system.com/artifact/GFF16E827BBA, where the string GFF16E827BBA uniquely identifies a record associated with the modified artifact, its data (unless when contained in the request, which is not the case in this example) and information regarding the sender and the recipient. The latter comprises the email address of the recipient. In comparison, a portion of the headers for an email is shown below:

X-Google-Dkim-Signature: ⊏v=1; a=rsa-sha256; c=relaxed/relaxed; d=1e100.net; s=20161025; h=x-gm-message-state:mime-version:subject:from:in-reply-to:date:cc :content-transfer-encoding:message-id:references:to; bh=rEOUDQoI5Wwd6FIFqq7ylwyGrtpgKXgoNUJVAAA-bcM8=; b=qzo0Tf2jIwvyPo+zqt3Y47sJkP5DsNbUA-XZh2BOWAG7PxRvhNKNBMVPJkpfrONelvt Ytd/040YsROz5acwoSMog5u5WB0ZFg16nrDbgtU0aqH9Hs/h11CLknaJj8nJaVTtmOG0T1MsprG/vAhWf+clyRUTYReQwTXwSA1ewBxKZbu+VhWGGiywE5m5OqveIyrG6H536YJ B q7ShXo66GptUK8aFTwdgmAC1r3AivaJuz2fPCj czJ2W2sNebUcv1+YNoPc1zcWj TF4dl Ob63vR4pf7j98WUQ18uRQGJauLrFGq+qqgbY/9wBd/tMnU+Z029s1IMbCVosb08YP9UT 8hDA==∛
X-Mailer: ∛Apple Mail (2.3445.6.18)⊐Content-Type: ∛text/plain; charset=utf-∛

Assume that this corresponds to an email sent by the same user as the user that initiated the click that resulted in the HTTP headers above. In one example, the security system has already built a model relating to the devices, accounts, networks, trackers, and more, associated with this user, as it preferably has with every other user that it is aware of. This hypothetical user uses a Mac laptop and an Android phone. The MUA shown above is consistent with this, as can be seen from the X-Mailer header at the second to last row shown—X-Mailer: ☐Apple Mail (2.3445.6.18) ☐. However, the click resulting in the HTTP logs shown above corresponds to a Windows computer, as indicated by the line "User-Agent: Mozilla/5.0 (Windows; U; Windows NT 6.1; en-US; rv: 1.9.1.5)." This is the type of discrepancy that would cause the security system to determine that an access request, or an email being transmitted, is anomalous. The comparison here is between headers associated with an email, and its sender, and the headers associated with a web request, and its originator.

The system also compares two types of headers of the same type, such as two sets of headers from an email or two sets of headers from a web request. More generally, the security system builds a model of a user comprising both data from email headers and data from web request headers, and uses this model to score observed web requests supposedly associated with a given user and device, such as requests for artifact data, and observed emails being transmitted from the user and device. This is used to perform classifications of events, to determine scores associated with the certainty of the classifications, and to select and initiate security actions taken in response to the classifications and certainty scores. Headers, whether for emails or web requests, are well understood. These include HTTP and HTTPS headers. Similarly, RFC 5321, which is incorporated by reference, describes the Simple Mail Transfer Protocol, i.e., describes mail headers. These are just examples. A person skilled in the art will appreciate that both type of headers are well understood, and that other types of messaging protocols are associated with other types of headers, which also can be read by a security system and used to infer a security posture.

An example of how different events can be observed and classified based on observation of contextual data is shown in the table below. These show typical values, and is not meant to limit the scope of the disclosed technology. Preferably, a security system would use machine learning or similar technology to combine inputs of these types, assigning different aspects different weights, in order to perform one or more classifications, determine the associated certainty, and to select one or more actions based on the classifications and the certainty. The events and the inputs are described in greater detail below the table. This table relates to web accesses, although similar tables can be made for other types of headers, and their relationships to events such as those listed in this example:

recipient, including IP addresses, carrier information, and more. An unusual IP address or geolocation can still be considered normal if previous traffic, which has been determined not to be anomalous or associated with high risk, was associated with the unusual IP address or geolocation; for example, the recipient may be traveling. The access type corresponds to whether the recipient clicked on the hyperlink associated with the artifact (resulting in no REFERRER value, but potentially mouse-over movement data if this can be collected from the mail client), or whether there is an indication of automation, including use of an API, a script; and whether there is use of a software agent such as a browser that has not previously been used on the device associated with the tracker.

A normal access type, of course, is seen as an indication that the true recipient is accessing the modified artifact and using the account and computer of the recipient's—in contrast to the account or device having been compromised by an attacker. The access pattern is also relevant for the classification. A typical recipient may access data associated with a modified artifact within 10 minutes of receiving the email, if during work hours, with a 90% probability, and within 24 hours with an 8% probability, for a particular sender. If the modified artifact is accessed along with 25 other modified artifacts, and within 5 minutes, then this is a sign of a potential problem. If the arrival time between two such requests in anomalously short, or there is an anomalously large number of requests within a window time frame, or if the access requests are somewhat unusual, and from a somewhat unusual location, etc., then this is a sign of potential risk. The classification in this example is that it is an active recipient, i.e., the proper user corresponding with the account.

Event B corresponds to an imagined phishing attack. The access in this example comes from an IP address and associated geolocation that is different from what is expected from the recipient. There are no trackers associated with the recipient in this example. In some related examples, there may be slight overlap with previously observed track-

| Event | IP + geolocation | Trackers | Access type | Access pattern | Network | Classification |
|---|---|---|---|---|---|---|
| A (user) | Normal | Normal | Normal | Normal | Normal | Active recipient |
| B (phishing) | Unusual | Absent | Normal | Unusual | Unusual | Phishing |
| C (malware) | Normal | Normal | Unusual | Unusual | Normal | Malware |
| D (stolen) | Normal | Normal | Normal | Unusual | Normal | Stolen device |

Event A corresponds to an email that was just received by the recipient, e.g., it was delivered within a time period in which the recipient commonly reacts to messages, based on the recipient, other traffic quantity, observed user activity (such as other interactions and originations of messages), and the time of the day for the recipient. For event A, the IP address of the artifact request was deemed to be normal, i.e., correspond to the IP range of recent or typical accesses associated with the recipient.

This determination is preferably made in the context of the trackers. Typical trackers include cookies, such as HTML, cookies, cache cookies, and also User Agents, and more. The determination also is made relative to the network that is observed, which may be the recipient's work network neighborhood, including IP addresses associated with this, server names associated with this, and more. The network could also be the typical home network neighborhood of the ers, e.g., a matching user agent only. The access type in this example is normal, and not scripted. The access pattern may be unusual, with multiple requests, all related to invoices, being made. The security system knows what the requests relate to since it automatically classifies all artifacts according to keywords, size, sender, recipient, type, history and more. The network in this example is also unusual. Note that the IP address and geolocation is distinct from the network, as some attackers may set up proxies in the neighborhood of a victim (thereby getting a passable geolocation), but may still use another type of network. A Tor exit node instead of a familiar carrier indication is an example of such a detectable difference. In some phishing attacks, the attacker may successfully manage to match several of the aspects, whether by luck or skill. However, it is unlikely that all will be matched. The certainty of the classification is determined based on the degree of match with case A, the typical difference with case A for a given attack type, the historical patterns of the recipient, including observed lacks of consistency and recent observations such as the recipient being likely to travel, and more.

Event C corresponds to a typical malware agent. The malware agent, which can be a Trojan, a malicious VBA script or other type of script, as appreciated by a person skilled in the art, will typically have the normal IP address and geolocation, since the malware agent accesses the modified artifact using the (infected) device of the user, whether the user is the sender or recipient of the associated message. For this reason, the trackers are also correct, and are observed as normal. However, the access type is likely to be unusual, with indications of scripted access. Examples of this are header data associated with scripting software, headers indicating API access, and more. The access patterns are likely to be unusual. Unsophisticated malware may access too many documents in too short time, or may cause shorter request interarrival times than typical human access corresponds to.

Whereas sophisticated malware may address this by spreading out the requests over time, there will still be access pattern differences relative to the typical access of the recipient, whose access patterns are preferably observed, recorded and compared to the access patterns seen for example C. Moreover, in cases where the security system knows that some of the emails for which access requests of associated modified artifacts are made were already moved to the trash folder or another folder with infrequent access, there will be a detectable anomaly in terms of the location of the document. The network data is likely to be the normal in this example case, however the roundtrip time for acknowledgements may be longer for some form of malware, such as RATs, as the received data is typically forwarded to a remote location from the corrupted device, thereby increasing the roundtrip time. This can be seen as a network aspect, and detected by the security system.

Event D corresponds to a stolen device. Here, most indicators are likely to be normal, except the access patterns, which typically would be indicative of a search for data, resulting in larger number of requests than the normal user would make. However, some users may sometimes request large number of documents legitimately. The security system can associate a verification action with the classification of an event of this type. One example verification action may require the use of an on-device application that requires biometric authentication to open or complete its task; another verification action may be the sending of a message to a device that is not the affected device. For example, if a user's phone is potentially stolen, then a verification request can be sent to the laptop of the user, e.g., using a specialized app, using a communication app that is not present on the phone, or similar. Alternatively, the security system may automatically lock the potentially stolen device and require user re-authentication. If the user passes this, then the security system uses the series of events to learn what legitimate user behavior looks like for the user in question. Here, locking the device can be performed remotely using technology specialized for this task, some of which is typically built in to many devices, or which can be added to devices in the form of apps or downloadable software; wherein the security system has been given a priori access to APIs associated with such software.

The security actions selected in response to the classifications may differ from each other. For example, event B (phishing), if determined to have occurred with a high certainty, should preferably result in at least one of the automatic change of the user credentials and the automatic movement of the criminal's access to a honeypot system mimicking the contents of the user's account. In contrast, detection of event C (malware) would preferably result in a lock-down of the affected device or the isolation of the attacker to a honeypot mimicking the computer and its data; the latter is very different from a honeypot account for messaging only, as will be appreciated by a person skilled in the art. A meaningful response to the detection of event D (theft) is to limit access to sensitive files and the tracing of the location of the device using an automated beacon, which may include the capture and transmission of location data, sound, camera images, the activation of face recognition for the camera, and the engagement of an alert beacon that allows law enforcement and enterprise representatives to triangulate the location of the stolen device.

A person skilled in the art will recognize that the above example events and their classification is just for the purposes of making the use of the disclosed technology and its benefits concrete, and will recognize that there are other types of events that can be detected using the same approach, as well as many variations of the described example events. A person skilled in the art will also appreciate that the same type of determination can be made for a sender of an email, who in response to sending an email is automatically sent a challenge email, where the challenge email comprises an item corresponding to a modified artifact, such as a hyperlink with a unique identifier. Moreover, a person skilled in the art will also recognize that this approach can be used in response to receiving a request for a modified artifact from a user, or in response to a protected user forwarding or otherwise transmitting an email or other message to a third party, where the security system detects the outbound email and initiates the generation of the challenge. In general, this method can be used in any context where the security system wishes to make a security determination, in response to an observed event.

In one embodiment, a challenge, as described above, is sent by SMS from an entity associated with the security system to a phone number associated with the intended recipient; causing this user to receive an SMS on his or her phone. The SMS comprises a hyperlink that, when clicked, causes a browser instance on the phone to be opened. The browser instance may cause one or more tracker objects to be saved in the browser of the phone. For example, consider a 2 by n matrix of tracker values, where the matrix has two columns and n rows, and for each row, exactly one of the two cells is called, causing a tracker to be associated with the cell of the matrix. This leads to exactly n trackers being embedded.

In this example, these are trackers related to browser history. Browser history is commonly shared between different associated devices, such as a user's laptop and the same user's phone. Therefore, by the user responding to the challenge, which is sent to his phone but not his laptop, the browser history of the laptop is affected once the browser state is synchronized. This can be read by a JavaScript element running on the browser of the user's laptop, thereby causing the transferring of a state to the laptop, but only if the user is engaging with the challenge sent to her phone. The JavaScript element can then signal back the information, or information derived from the set of trackers, to the security system. If the request to the user is to click on a first hyperlink if she has access to her computer, and on a second hyperlink if she does not, then this can be used to prove, by the user, that she has access to the hardware. The same goal can be achieved by the user manually copying a code sent by SMS to her phone to a browser window on her computer; however, the disclosed version is simpler from a user perspective.

A person skilled in the art will recognize that there are other ways to synchronize a state across devices, and that those can also be used to implement this challenge-response system. One such system comprises communicating, by the security system, to an app on a first device associated with a user, a value or a key, and then for the app to synchronize, with a second app on another device, a state value corresponding to the value or the key, and the second app then communicating the data to the security service. The second app may comprise a downloadable app with a webview interface, or with access to a browser buffer. The communication may comprise Bluetooth, Bluetooth Low Energy (BLE), WiFi or other similar radio technology. The communication may also alternatively utilize speakers/microphones, LEDs/light detectors, or other communication nodes able to convey messages from one device or portion of a device to another.

The security system will preferably have organization-specific and user-specific rules describing what access patterns are allowable, or may use a machine learning system to identify circumstances when access patterns are not allowable, when they are allowable after some verification (such as a challenge) is performed, and when they are allowable. For example, a protected enterprise may have a rule associated with it stating that if more than 10 old artifacts are accessed within 20 minutes, an alert is generated. Here, an artifact is considered old if it was received by the system more than two hours ago, or if it belongs to an email that has already been moved to another folder in the mailbox of the recipient. One user who makes frequent accesses to artifacts at high volume may have a second rule associated with his account, where the second rule overrides the rule associated with the enterprise, and where the second rule states that an alert is generated if more than 100 artifacts are requested within 15 minutes, or if any two artifacts from two different emails are requested within 5 seconds, except where the system verifies that the requests are associated from a user with an account for which all inputs (as described for event A above) are verbatim what they were expected to be, in which case the limit is 500 artifacts in 10 minutes. Arbitrarily complex rules can be generated, such as using a user interface to which end users and admins have access to.

The security system can also automatically learn what behavior is normal for a user and an organization, and what type of behavior is associated with various types of known threats, such as specific malware threats and observed phishing-related attacks known to the system, and select thresholds that minimize error rates, keep false positives below a maximum specified number, keep false negatives below a maximum specified number, minimizes a weighted error function that is associated with perceived costs associated with various misclassifications; and more. A person skilled in the art will recognize that machine learning methods, artificial intelligence methods, and statistical methods are well suited to perform these tasks, and will recognize the wealth of available approaches to do this. The system may use different rules for different detected event types, with one or more rules for each event, each one with potentially different parameters, including certainty thresholds, and associated actions for when a security classification has been made, as will be appreciated by a person skilled in the art.

As data requests for modified artifacts are made from a client device, such as a computer or a phone, it is beneficial for these to be served in a manner that they are ephemeral, i.e., not stored long-term on the client device. Then, if after a request is made a device or account is compromised, the data is preferably not present, or not present in full, but need to be requested again in order to be accessed, used, rendered, etc. For webpages, that can be achieved by setting a policy, by the security system, that the item or a portion thereof is not cached. This can be done even if the original content does not have this policy. The content can be cached with the security system, but blocked from being cached on the client device, by forcing the page to be non-cacheable.

Similarly, other artifacts can be configured to not be stored locally, on the client device. This is automatically achieved if the end users use cloud hosting services to extend the storage capabilities of their computers, e.g., by using services that automatically back up items and remove them from the client devices, replacing them with a "thin" version of the artifact that, when interacted with, causes the item to be downloaded. Each such item is preferably made unique in a manner that the requests identify not just the artifact, but the device or account it is associated with, thereby providing the same capabilities as the modified artifacts contained in messages, as the security system will observe the contexts of the requests and identify anomalies.

In one embodiment, an attachment such as a word file will be replaced with a modified artifact that is a link that leads to a cloud-hosted document with the same contents as the word file. This way, the data lives off of the device of the recipient, even if it is being modified by the recipient. The cloud-hosted document can be of a different format, such as a Google doc, as long as the user experience is similar enough—in this case being able to read and modify text, and potentially print the document. The same can be done for document of other types, as will be understood by a person skilled in the art.

Some documents, that are not expected to be modified by the recipient, can simply be hosted on a website, whether managed by the security system or simply with the security system as a proxy to the website; this can also be done to document that the requesting party may wish to edit, requiring an additional action by that party to go from a view-only environment to an environment wherein the document can be edited. It is also possible for at least portions of documents to be automatically encrypted, e.g., using a macro that is part of the document. The key it uses to decrypt the document must be requested from an external source in order to make the document available to the user. Thus, this requires an access. The macro may use either symmetric key cryptography, asymmetric key cryptography, or a combination of these. Apps and other software may also protect information or functionality in this manner. Thus, an artifact may also be associated with software or general software functionality.

In one embodiment, the security system does not host at least some data associated with artifacts and modified artifacts, but instead, simply acts as a proxy between the recipient and the data, collecting identifying information associated with the request, and conditionally permitting access to the data as described in other embodiments. If permission is granted for one particular request, then the security system requests the associated data and acts as a proxy, thereby forwarding it to the requesting client device; both the connection between the security system and the requesting client and between the security system and the data source are preferably protected by SSL/TLS or similar authenticated and encrypted channel methods.

In an alternative embodiment, the security system does not act as a proxy, but instead responds with a rerouting HTML message, such as responding to the request with an HTML 307 message and the URL of the source of the data. This automatically, but only temporarily, redirects the browser of the requesting party to the URL indicated by the security system, and the browser automatically downloads the content, which is the content associated with the requested modified artifact. This HTML 307 response is only issued if the request is permitted by the security system. If the access is not permitted, the security system may block the request or respond with an HTML 307 response associated with an alternative webpage, causing the requesting browser to access data that could be deceptive, or simply notifying the user of an action that he or she needs to take. For example, the user may be notified that he or she needs to verify his or her identity before the resource can be accessed, and be provided with information of how to do so, potentially allowing the user to reissue the request after the information has been provided. A person skilled in the art will recognize that there are other HTML redirect codes that could be used as well as HTML 307, and that this example is just for illustrative purposes.

In one embodiment, URL artifacts are not modified, but instead, a gateway associated with a recipient traps website requests and acts as a proxy, causing the requestor's browser to optionally forward to a site controlled by the security system after a first round of identifying data has been collected and observed by the gateway proxy; and wherein the security system collects additional identifying data. The benefit of this is that URLs still appear in their unadulterated form to end user recipients, and that users cannot circumvent the proxying to evade the security system. This can also be achieved by rewriting URLs, as described in other embodiments, and in addition, require gateways to identify web requests and determine identifying data. This has a benefit of also trapping URLs that are typed by a protected end user who has been tricked to enter a dangerous URL in her browser.

One benefit of the disclosed technology is a pattern matching unit of the security system, to detect recurring patterns. The security system determines when emails are sent, received and rendered, and when associated modified artifacts are requested, as applicable. Consider a situation in which an account receives an email with unknown content that is not known to be malicious, and then, at a later point, the email is rendered, and at a yet later point, the modified artifact is accessed from the user account. The security system serves the data of the requested modified artifact. Within a very short period of time, such as half a second, fifty emails are sent from the account.

If the associated user account is a protected account, the security service will detect this transmission; however, if the user account is not a protected account, the security system may see some small number of emails sent from the user account within the very short period of time, where these emails are sent to protected users. As one of these users requests the data associated with the modified artifact, the story repeats itself. This particular example describes the Melissa Virus, which was a macro malware, and which transmitted itself to fifty contacts from the infected account's contact list. However, it also generally describes the Google OAUTH Worm of 2017, wherein emails comprising URLs leading to an OAUTH enabled macro would cause the transmission of further emails from "infected" user systems, where the infection was in the form of the macro (or application) running on the cloud server associated with the user's email account. This type of attack is a recurring problem. A similar type of abuse is ransomware. The security system, in these related examples, would detect the pattern comprising a transmission of emails essentially immediately after the request of the artifact, and will cause other associated requests to not receive the payload. It will also automatically forward the believed-to-be-malicious artifact data for analysis, and preferably, automatically initiate the generation of a patch.

The system can determine what other emails are associated, and what other requests are associated by a similar pattern matching, based on the content and length of the email and its subject line, and the content, type and length of its associated artifact. Additional data associated with artifacts are also used to identify the threat; these may be unusual series of bytes, comprising a signature; data associated with the origin and/or generation of the artifact; and more. A person skilled in the art will recognize that this is a very powerful tool for detection of unknown malice, and that it is beneficial to detect a wide array of unwanted events, many of which relate to malware, and commonly, to ransomware. One example of a signal associated with ransomware is the request for a contact to an external site, which is the control and command, within a short time after opening the document corresponding to the data requested by the user, associated with the modified artifact of the message delivered to the user.

To the extent that the security system cannot immediately correlate an undesirable event with the email or the modified artifact causing the undesirable event, the pattern detection unit will very quickly identify this from storing all observed associated combinations of believed undesirable events (such as the automated transmission of emails or the request for a contact at an external site) and other associated signals, along with identifiers associated with the emails and artifacts. A person skilled in the art will recognize that this leads to a very rapid determination of the most likely correlation. A centralized detection system such as the disclosed security system will be vastly more sensitive to detecting such correlations than a traditional distributed system with sensors, such as what is comprised by a typical collection of user devices with anti-virus software from one vendor, for example.

The detection of malicious code is not limited to emails that exhibit immediate transmissions of messages, like Melissa, the Google OAUTH Worm and similar. More generally, it is applicable to any anomalous behavior in terms of observed patterns, in apparent relation to an incoming email satisfying some criteria, such as referring to an artifact of a particular type of a particular approximate length, and an associated email having a particular format, content, or other identifying characteristics.

Examples of observed patterns include but are not limited to transmissions of messages; requests for artifact data; GET and PUT requests made to particular IP ranges or domains; cessation of activities that are observed by the security system; the filing of IT help tickets by users associated with the email; access attempts to sensitive data resources; and more. A person skilled in the art will recognize that the use of the disclosed structure will greatly help identify abuse of these types very early on in a viral or otherwise ongoing attack, and that as soon as the security system has identified a threat of this type, it can block the threat from having further impact, both relating to emails that have already been received but not acted on, and in terms of emails that are not yet transmitted and will be avoided by the early containment of the threat.

A person skilled in the art will recognize that this relates generally to any type of messaging, both here and elsewhere in the disclosure, and that the techniques are not limited to emails only. A person of skill in the art will further appreciate that the collection of information from a large collection of users will permit early detection of abuses, facilitate automatic classification, and more. Related techniques are described in U.S. Pat. No. 8,549,641, entitled "Pattern-Based Application Classification," which does not address detection using artifact access requests, but the principles of which can be used to classify threats in the disclosed technology, and which is incorporated by reference.

Another benefit of the disclosed technology is that by combining the security system with a DLP module, the system will provide superior DLP capabilities to traditional DLP systems that simply filter inbound and outbound messages. That is because the screened messages, whether inbound or outbound with respect to a given account, will be scrutinized by the security system, tokenized, and processed. Here, the tokenization identifies distinct artifacts, such as text segments and artifacts. In the processing phase, these tokens are replaced with modified artifacts. Thus, an attachment is replaced with a hyperlink that is associated with data, or alternatively, with an attachment that is protecting its content, e.g., using encryption, wherein the decryption key is requested as the document is opened, say using a macro, and where the decryption key preferably is held by the security system.

A person skilled in the art will recognize that there are many variants; for example, an attached document such as a word file can be replaced with a document or application that automatically, as it is opened, initiates a request for data and then displays this data. Similarly, URLs can be replaced, as described previously in this disclosure. In addition, segments of text, referred to here as text tokens, can be replaced with image references, where these references cause requests for the corresponding images once the document is rendered.

As another alternative, the text tokens can be replaced by active scripts that contain the text in an encrypted format, but which need to request the key used for decryption to generate the renderable text. Such scripts can use JavaScript, CSS, and other scripting languages, where these are preferably supported by the mail reader used by the corresponding user. Text tokens can also be replaced with modified artifacts, which are downloaded and rendered as the user interacts with them, or alternatively, triggered by another user action. Here, the benefit over traditional DLP methods is that a first security determination can be made as the message is first reviewed by the system, i.e., during the tokenization and processing phases; and then, this is followed by a second security determination that is made as the message is rendered, requested or otherwise interacted with.

In the meantime, the security system may have identified a problem or risk that was not initially known as the message was first scanned. For example, the determination may require several minutes of processing, which can be initiated during the first security determination and which would then proceed as the message is routed, delivered, and finally, rendered and interacted with. If the security processing has not completed by then, then a tentative response can be provided, such as "this message is not yet available; please come back in a few minutes." As a second example of the benefits of a staggered security determination, the security system will observe and record series of events, both associated with a single sender and associated with multiple senders; determine anomalies such as unusual transmission volumes; and then, based on detecting such anomalies, make the second security determination. A third example is that the security system may require a verification, whether of the sender or recipient, prior to completing the second security determination. Examples of such verifications have been described in this disclosure, and may involve the transmission of a challenge; the verification of biometrics, as will be detailed below; the request of a code from Google™ Authenticator or similar; and other methods understood by a person skilled in the art to help verify a user, an account, or a combination. Analogously, the security system disclosed herein also strengthens traditional attachment-based malware scanning by the phased approach.

The security system creates a profile for each newly observed user, and maintains this over time. In one embodiment, a user corresponds to a unique user email account, and in another it corresponds to one or more user email accounts determined, by the security system, to correspond to one and the same end user with high certainty. This certainty is computed based on traffic patterns (e.g., a work account forwarding calendar invites to a personal account with the same name on a frequent basis); on device identifiers (the same device(s) being used to access the two or more email accounts and their associated emails and modified artifacts); or/and based on configurations (an enterprise user specifying his or her personal accounts in a configuration window, or provides it to be uploaded in an LDAP database). A user can also receive a challenge to one email account and respond to it from another account, e.g., by replying to an email from a different account that that which received it. A person skilled in the art will recognize that there are many related methods of associating one account with another, and that these are only examples.

The maintenance of the profile comprises determining, as users send messages, interaction with modified artifacts, and interaction with received challenges, and/or as users browse the web or perform other actions that are observable by a gateway or mail server associated with the security system, such as rendering emails, forwarding emails, and more. Each time the security system receives information relating to the user, whether to an already observed account or a new account associated with the same device or end user, according to a determination made by the security system, then that information is compared to already stored information associated with the profile of the user, and optionally stored.

Each profile preferably has several sub-profiles. One sub-profile of a user relates to his or her work environment, including infrastructure (such as names of mail servers, type of computers), location (IP addresses); connection aspects (carriers used, network service providers used). Another sub-profile relates to the user's home environment, including names of service providers, IP address or range, device(s) used, and more. Sub-profiles also are created when it is inferred by the system that the user is traveling, e.g., on vacation but still accessing emails or artifacts; at a conference, etc. The system also maintains sub-profiles relating to device information, such as cookies, user agents, and more, associated with a user device related to the account(s) of the profile. The system optionally has sub-profiles associated with different email accounts, e.g., enterprise email accounts, personal email accounts. These profiles may comprise data such as signatures used by the user, configurations used, such as different character sets enabled, and so on. A person skilled in the art will recognize that there are many more types of data that can be associated with profiles and sub-profiles.

When an action associated with a profile is observed by the security system, the security system determines the extent to which it matches the different profiles. If an example event matches a device profile but not one of the location-based profiles, this may, for example, mean that the same user is traveling or that the user's device has been stolen or cloned. The security system attempts to determine which one of these events is the reason using a range of methods. For example, if the user's calendar indicates that the user will be at an address that is consistent with the observed location, and the calendar entry is older than one day, then the system determines that the user is traveling.

If the user device is recognized but is determined to be located in a location that is absolutely inconsistent with past locations, i.e., too far from these for it to be plausible that the user got there, then this is an indication, on the other hand, that the user's device has been cloned. If the location corresponds to a VPN, then this is an exception, and the user may be sent a challenge, unless it is a VPN commonly used by the user or her colleagues. If the events associated with a user are anomalous, i.e., inconsistent with the user's past behavior, then this is a sign of likely abuse, independently of the matches with sub-profiles. If the security system determines that a match is sufficiently good, but not perfect, it may generate a new sub-profile to describe the new aspect of the observation. Any future match with a newly generated sub-profile would not be associated with the same high assurance as a match with a commonly observed sub-profile associated with the user, but a higher assurance than a mismatch with the subprofiles would have. The security system preferably records the frequency of various sub-components being observed for the user, and the time associated with the most recent such matches.

The most recent accesses are particularly important when determining whether an event is anomalous. This is because a user who just seconds ago was active on a PC at headquarters is very unlikely now to be using a cell phone in another country. However, if the time difference between the two observed events is a full day, this is not as anomalous. However, unless the user is commonly associated with this other country, it is more anomalous than being associated with an IP address whose geolocation is just an hour from the user's home. The location of the home can be determined based on the location of accesses for a series of events at a time when the user is not at work, or can be obtained from a database of home addresses maintained by the employer of the user. The security system computes a risk associated with each event, based on the degree of discrepancy between identifiers associated with the event and identifiers associated with past observations, as recorded in sub-profiles. Here, the historical frequencies and the most recent accesses are of relevance.

The security system also preferably generates a value indicating the confidence of the risk assessment. If the most recent access was 10 seconds ago, and deemed to have a risk of 0.05 on a scale from 0 to 1, and a current access or event is from a location that is 20 miles from the most recent access, and neither access corresponds to a known VPN node or other anonymizing node, then the risk score may be computed to 0.9 and the confidence of the risk score 0.95 of a scale from 0 to 1. However, if the same thing happens but the time between the most recent access and the current access is 2 h, then this is no longer anomalous, and the risk score may be 0.16 (where this is higher than the 0.05 due to an unknown location) but the confidence is just 0.3.

When a risk score is high and the confidence is high, the security system preferably takes a security action, such as blocking access, replacing what data is served, notifying a user, etc. For example, one enterprise may have thresholds associating with a risk score of 0.6 and a confidence of 0.75, meaning that if the risk score exceeds 0.6 and the confidence exceeds 0.75, then the security action is taken. At the same time, the same enterprise may associate another security action, such as generating a challenge to the user, based on a risk threshold of 0.3 and a confidence of 0.5, meaning if the risk is greater than 0.3 and the confidence exceeds 0.5 then a challenge is generated.

The system may also take some actions independently of risk score, e.g., if the confidence is below 0.25 then a log entry is always generated, and if this persists over a time period of at least 4 days, then an admin is automatically notified. A person skilled in the art will recognize that these are simply examples of rules and thresholds associated with the security evaluation performed by the security system, and that it is also practical to use a machine learning system that is not based on human-expressed rules of this type, but which generates one or more scores that indicate a risk, and use these one or more scores to determine what actions to take. The scores can be expressed in a variety of formats, including probabilities, classifications, rankings, and more. Different types of anomalies are preferably associated with different weights in the computation of the risk score and the confidence. The confidence is preferably computed based on statistical methods that assess the likelihood that an observed event corresponds to a series of previous events, whether expressed in the form of sub-profiles, events or another format.

In this disclosure, it has been detailed how the use of trackers are beneficial for security determinations. In addition, however, they are beneficial for the purpose of conveying security indicators. For example, consider a message that triggered a challenge to be sent by the security system to the apparent sender of the message, requesting a verification. One aspect of this verification is to determine whether the challenged party has one or more trackers associated with this party, as described above. An additional potential purpose is to verify that the associated user agrees that he or she intended to send the message associated with the challenge. For example, a spoofed message was not intended to be sent by the apparent sender; neither was a message that was sent by a malware agent associated with the challenged party. Preferably, if the message is associated with both a sender address and a reply-to address, then the sender address is challenged. Similarly, if the identifiers associated with the sent message do not match existing profiles of the sender account/devices, then a challenge may be issued.

In some embodiments, it is determined whether there is a risk that the sender was spoofed, and if not, then the reply-to address can be challenged. If it is determined that the risk is predominantly associated with malware, then either or both can be challenged, although a third address, such as a phone number, is better for the generation of an SMS challenge to be sent to the same user but a different account than the account from which the suspected email appeared to come. The risk determination is preferably made based on headers, historical headers, content including attachments and their types and origin, and historical data of the same type, as described above.

As a challenged user responds to the challenge, tracker information is collected. The security system may send multiple challenges, such as one email-based challenge and one SMS based challenge, and require one or more of these to be responded to. Based on which one(s) was responded to, and what tracker information was collected, as well as whether the challenged party agreed that he/she sent the message or not, an action is taken. This action comprises at least one of filtering the message, marking the message up, conveying a warning to the recipient, conveying an assurance to the recipient, conveying identity information to the recipient.

Where a message has multiple recipients, this may be done for one or more of these, as determined by the security system(s) of these recipients. If the security system determines that an apparent sender agrees she sent the message, and the tracker(s) agree with historical tracker(s) of that sender, then an assurance or identifying information is conveyed, e.g., by adding this to the message, by conveying it in response to a modified artifact being requested, e.g., as part of the artifact data, while the artifact data is being loaded, integrated or overlaid onto the artifact data, or conveyed as a sound, a coloration, etc., when the artifact is rendered. For example, the screen of the displaying device may turn green while the artifact is displayed. Similarly, warnings can be conveyed as part of the message, while an artifact is loaded or rendered, etc. The warnings may require the recipient to perform an action to get to see the artifact or message, such as accepting the risk, answering questions relating to who sent the message, performing a task showing that the recipient is paying attention, etc.

A sender that wishes to trigger a verification may indicate in the message or the message headers that she wishes to be verified, e.g., by including the word "verify" in the recipient email address, subject line, etc.; or by clicking on a button in the mail agent indicating the wish to initiate a verification. Similarly, a recipient can request, using a policy, that all messages are verified, all messages that meet a minimum risk criterion, all messages that are from a sender from an external organization or one that is not governed by a known-strong security system. Either one of these actions would trigger the verification, as described above. This can be done prior to the message being delivered, or immediately after it is delivered, where a non-verified message can be indicated using a warning, a medium-risk indication (such as a yellow background), or other risk indicators and alerts. Some messages may be held in a quarantine until they are verified, and some messages may be delivered but only allow modified artifacts to be accessed after the message has been verified, and passed a minimum trust level such as having at least one tracker matching to a degree exceeding a threshold value.

Some verifications may require the use of biometrics to be displayed or to have a certification indication being displayed with the message or its artifacts, whereas others simply require the verification of an HTML cookie. This corresponds to different levels of assurance, or conversely, different levels of risk. A particular level of assurance may be required by the security system based on a policy, such as when the message is to a particular recipient and is of a particular type (such as executable, including a macro), or have a particular content or origin. The use of the security indicators, as described, can also be implemented by having a "safe" folder, a "certified" folder, and a "yet-unverified" folder in the recipient's mailbox, or as part of the recipient's prioritization of messages. One folder may have encrypted content which will only be made available after proper authentication, such as a biometric authentication, PIN authentication, 2FA authentication, etc. Security indicators are preferably displayed in the chrome of the messages, or in portions that cannot be modified by senders. The security system can use the sender display name as a field to convey assurance or warnings, e.g., to add an assurance to a sender display name or replace the sender display name with a warning.

In one embodiment, a sender installs an application or plugin on his or her sending device that comprises a policy relating to what messages need user authentication, such as all messages to one or more users, all messages containing an attachment that is identified by the system as an invoice, and all messages containing executable components such as macros. As the user initiates the sending of a message that matches the policy, the app requests authentication, e.g., using biometrics; the use of a dongle such as a Trusona®, Yubikey®; the use of a hardware token such as a SecurID® token or software versions of this type of technology; the app or the associated hardware or software makes a determination of identity and allows the message to be sent if the determination is that it is an authorized user.

The app or associated hardware or software preferably generates authentication data such as a Message Authentication Code (MAC) or digital signature, which is sent as an attachment, X-header, or other message component, to the recipient of the message composed by the user. The recipient device preferably displays or otherwise conveys a security indication to the recipient, as described above. If the security system, which preferably stores copies of policies as those described above, or infers them from observations, detects the absence of authentication data where this was expected, then a warning is instead displayed or otherwise conveyed. Some warnings may, for example, use audio alerts.

Consider an organization ORG1 that is not protected by the security system. Assume that ORG1 has a vendor VEN1 that is also not protected by the security system, and assume further that VEN1 requests a payment, asking ORG1 how to submit invoices. ORG1 sends a document describing this to VEN1. However, an attacker at some point compromises VEN1's email accounts, and opens the document describing how to invoice VEN1. The attacker also finds another message from ORG1 to VEN1 in which a payment receipt is sent to VEN1. The attacker now generates a new invoice, with bank account information different from VEN1's bank account and instead matching an account the attacker has opened in the same bank as VEN1's bank account. An employee of ORG1 reviews the malicious invoice and sends it for payment, causing the attacker to profit. Consider now another organization ORG2 that is protected by the security system. ORG2 has a vendor VEN2 that is also compromised by the attacker, who finds a message ORG2 has sent to VEN2. The attacker renders this message leading to the tracking by the security system. The attacker then opens an attachment in that message, where this attachment has a tracker similar to what marketing companies use to determine whether documents are opened; several possible implementations of this is described in this disclosure. The attacker further accesses a modified artifact that corresponds to a cloud-hosted attachment, causing yet another tracking to be performed.

The security system has identified that this is anomalous activity, based on the series of accesses; based on the absence of recognizable tracking information such as cookies; based on user agent information different from what the security system has associated with accesses from VEN2, which is a company where all employees use Toshiba laptops running Linux. However, the attacker uses a Chrome book, running its associated proprietary operating system. Furthermore, the attacker accesses the compromised accounts of VEN2 from a proxy in Canada, whereas VEN2 is located in Alabama, leading to a geolocation discrepancy associated with the IP addresses of the location from which access requests are sent.

The security system identifies that VEN2 is likely to have been compromised, and in response to that, blocks access to some requested data that the attacker requested by clicking on modified artifacts, or alternatively, serves the attacker synthetic data that is not valid, in response to the requests, where the synthetic data allows for further tracking of the criminal, e.g., containing honeytokens or false information that wastes the time of the attacker. In addition, the security system automatically notifies an admin associated with VEN2, identifying the nature of the problem and offering to help VEN2 with its security. Furthermore, the security system notifies a user associated with ORG2, such as a user who is interacting with VEN2. In addition, security rules may be updated to automatically quarantine messages from VEN2, whether sent to ORG2 or to other protected organizations. The quarantining is performed until the security system has identified that the security risk associated with VEN2 is likely to have been resolved.

Consider now a third vendor VEN3 that is, like VEN1, working with ORG1. Recall that ORG1 is not protected by the security system; however, in this example, VEN3 is. When the attacker compromises an email account associated with VEN3 and is starting to access emails sent by this corresponding user, and emails sent to this corresponding user, then this leads to the security system automatically identifying the abuse based on the anomalous access requests, and the anomalous tracking associated with the rendering of emails in the mailbox of VEN3. The security system automatically classifies the nature of the attack, which was also done for the attack associated with VEN2. Whereas the VEN2 attack was classified as a likely phishing attack, the attack on VEN3 is identified as being likely to be due to a malware compromise of the VEN3 email account mentioned above.

Based on this classification of the nature of the attack, the security system automatically blocks all connections made to or from the computer associated with the attacker, which in this case is determined to be associated with the laptop of an employee whose name is Mike. Mike is notified using an SMS that he must bring his computer to the IT staff, who will help remove the malware. In the meantime, Mike can still access his email using his phone, since it is determined that the attacker is unlikely to have stolen his password. Instead, based on identified traffic to and from Mike's laptop, determined using network logs, it is determined that the malware is likely to be a type that infects the mail reader and which eavesdrops on traffic and allows the attacker to insert traffic. Mike may alternatively be notified by email, using an email that is only delivered to Mike's phone. Thus, the security system may cooperate with the mail server VEN3 uses so that some emails, such as the notification to Mike, is selectively delivered only to some device(s) but not to others.

SecureWorks published an article titled "GOLD GALLEON: How a Nigerian Cyber Crew Plunders the Shipping Industry," wherein SecureWorks described the mode of operation of one prominent criminal organization. They described the steps as follows:

1. Seller's email is compromised by phishing or malware.
2. Attacker scans the seller's email account(s) for high-value transactions in the preorder phase (i.e., a buyer has asked for a quote).
3. Attacker sets up a redirect rule in the seller's email to hijack future emails from the buyer.
4. Buyer sends a purchase order (PO) to the seller, and the PO is redirected to the attacker.
5. Attacker "clones" the buyer's email (using a similar but misspelled domain) and forwards the PO to seller, establishing a man-in-the-middle (MITM) compromise.
6. Seller replies to "buyer" (the cloned email address controlled by the attacker) with an invoice containing payment instructions.
7. Attacker modifies the bank payment destination in the invoice and forwards the modified invoice to the buyer.
8. Buyer wires money to the attacker-controlled bank account.

Let us now consider the same attack attempt, step by step, if the seller's email is protected by the security system:

1. Seller's email is compromised by phishing or malware.
2. Attacker scans the seller's email account(s) for high-value transactions in the preorder phase (i.e., a buyer has asked for a quote).

Each email that the attacker renders is likely to cause the embedded tracker, placed there by the security system, to send a signal to the security system. As a result, the security system detects the number of requests, which may be anomalous; the IP addresses from which the requests are made, which may be anomalous; the potential absence of cookies (e.g., in the phishing example) associated with the requests; the likely anomalous user agent data (in the case of the phishing example); the likely anomalous use of scripts and APIs to submit the email (in the malware example); the likely inter-arrival times of the requests; the number of requests; the number of requests of old messages; and more. As a result, the security system is likely to detect the attack, and to notify the seller using a side channel that is not the same as the compromised email account. The security system may additionally have generated a classification of the likely nature of the threat, based on the requests, their numbers, timing and more; and may tailor the security action based on this classification.

3. Attacker sets up a redirect rule in the seller's email to hijack future emails from the buyer.
4. Buyer sends a purchase order (PO) to the seller, and the PO is redirected to the attacker.

In most cases, the security system traps the outgoing email, having detected the likely anomaly, and therefore, scrutinizing all outgoing emails. Since this email is sent to a party that the seller has no pre-existing trust relationship with, it is flagged. Moreover, since this email is an obvious forwarded email, which can be determined by the security system by comparing it to incoming emails, then this is determined to be a forwarded email to a likely untrusted party; hence, the email is blocked or replaced with an email whose content is generated by the security server with the intention to mislead the attacker.

To the extent that the anomaly was not already detected, the redirected PO, which is an artifact, is replaced by the security system with a modified artifact and associated with at least one tracker.

5. Attacker "clones" the buyer's email (using a similar but misspelled domain) and forwards the PO to seller, establishing a man-in-the-middle (MITM) compromise.

In most cases, this will not happen, as the attacker has not received the real email from the buyer, as this was blocked or replaced. In the case where it was replaced, the replacement may cause the attacker to interact with a dummy account, set up to perform infiltration of the attacker and his organization. This form of response is sometimes referred to as "active defense."

To the extent that the security system did not catch the anomaly yet, the email is forwarded, but contains modified artifacts and associated trackers. The trackers are likely to identify the attacker as the same party that accessed the email of the seller in step 2, based on similar IP addresses; the same cookies; the same user agent; and more. Not all of these are guaranteed to be the same, although it is likely. As the attacker requests the data associated with the modified artifacts, this tracking is attempted again, and if it is determined that the access is the same as that in step 2, a security decision is made that this is a likely attack. This is because both the access in step 2 and this access in step 5 were likely to be anomalous, and the account to which the email is forwarded is not trusted, and tracking information in step 5 is likely to match the tracking information in step 2. It may also simply identify the accessor of the data as not being the owner of the account, based on previous accesses to artifacts that are believed to be legitimate.

If an anomaly is detected, then the wrong data is transmitted to the attacker in response to the request, or no data at all; in addition, the compromised user is notified, as described above, and outgoing traffic scrutinized. Just like profiles are built for legitimate parties, the system also builds profiles for attackers. This enables the system to automatically identify two different attacks as being likely to be perpetrated by one and the same attacker, e.g., by matching the trackers associated with the two different attacks to the same attacker profile. This is beneficial as it enables the system to identify more active attackers and prioritize the law enforcement responses accordingly. It also helps inform the selection of deceptive responses to types that are more likely to be successful, based on previous successes and failures associated with attempting to deceive the same attacker.

6. Seller replies to "buyer" (the cloned email address controlled by the attacker) with an invoice containing payment instructions.

The security system, again, automatically adds trackers and replaces artifacts (such as an attacked invoice and attached payment instructions) with a modified artifact with trackers. As the attacker renders the email and requests the modified artifact data, the same process as in step 5 is performed, likely resulting in detection and the replacement of data with deceptive data.

The security system preferably notifies the buyer as well as the seller of the danger, or takes another appropriate security action.

7. Attacker modifies the bank payment destination in the invoice and forwards the modified invoice to the buyer.

According to the description above, the security system prevents this taking place by blocking messages, notifying users and their admins, and by sending deceptive data to the attacker.

8. Buyer wires money to the attacker-controlled bank account.

According to the description above, the security system prevents this taking place by blocking messages, notifying users and their admins, and by sending deceptive data to the attacker.

Let us now consider the same attack attempt one more time, step by step, under the changed assumption that the buyer's email is protected by the security system:

1. Seller's email is compromised by phishing or malware.
2. Attacker scans the seller's email account(s) for high-value transactions in the preorder phase (i.e., a buyer has asked for a quote).

Since all outgoing email from the buyer is protected by the security system, these emails have been modified so that they contain trackers and modified artifacts. As the attacker renders the emails and requests the data of the modified trackers, the security system detects the anomalous behavior, as described above, and takes a security action. This security action can comprise notifying the seller, on a separate channel such as SMS or phone, or via an admin, that there is a likely corruption of the seller's account. Additional security actions are taken to protect the buyer, similar to what is described above.

3. Attacker sets up a redirect rule in the seller's email to hijack future emails from the buyer.
4. Buyer sends a purchase order (PO) to the seller, and the PO is redirected to the attacker.

As the buyer is protected by the security system, this email will have at least one tracker, and the PO will be replaced by a modified artifact that has to be requested by the attacker for the attacker to see the data. The system tracks the attacker, and replaces the data with fake data, so that the attacker is deceived. The selection of deception method can depend on whether the attacker is recognized, as described above. For attackers that are already known of, the response may be to block them, attempt to corrupt their systems, or other methods; on the other hand, for attackers that are not recognized, the response may be to cause the attacker to interact with a honeypot system in order to let the system build a behavioral profile of the attacker. For example, the system may send the attacker a document that cannot be opened by the attacker, but which performs tracking. If the attacker, failing to open the document, passes the document around to different team members, this allows the system to automatically build a profile of the attacker and his team of collaborators, as each time a team member attempts to open the document, the embedded tracker is activated and collects information. This information may later be handed over to law enforcement.

5. Attacker "clones" the buyer's email (using a similar but misspelled domain) and forwards the PO to seller, establishing a man-in-the-middle (MITM) compromise.

This forwarded PO will in some instances correspond to the modified artifact, which will allow the security system to detect, using the trackers, that the PO was forwarded to a trusted party. This is because the identifiers match those of the profile of the seller, which the buyer is likely to have interacted with in the past. If so, the security system automatically notifies the seller of the likely corruption, since this case is common and it means the attempt to a MITM attack.

6. Seller replies to "buyer" (the cloned email address controlled by the attacker) with an invoice containing payment instructions.
7. Attacker modifies the bank payment destination in the invoice and forwards the modified invoice to the buyer.

The security system is very likely to have detected that this is an email that corresponds to an attack, and therefore take a security action, such as blocking the email, notifying the parties of the corruption, including the likely type; etc. To the extent that the security system is not certain of this, it may issue a challenge to the sender, which requires the attacker to render and make a request, and therefore get tracked. The more times the security system tracks an attacker, the easier does it become to match the observed tracking data to that of known good parties, known bad parties, and unknown parties, and to make a determination of the type of attack that is being mounted.

8. Buyer wires money to the attacker-controlled bank account.

This will not happen, as the security system will have taken security actions to avoid it. However, the system may automatically notify the bank of the attacker's account number and other associated information in order for the bank to put a freeze on the account. This frustrates the efforts of the attacker and helps other victims that did not have the same protection.

These examples demonstrate the use of the disclosed security technology from two perspectives, based on a common type of real-world attack that existing security technologies do not detect. A person of skill in the art will recognize that these examples are non-limiting and only illustrative, and that the methods described can be combined with other methods in this disclosure.

It is further beneficial for the security system to integrate with gateways or firewalls, given that this allows it to combine anomaly detection as described above with traffic analysis. This enables the security system, among other things, to identify a likely malware attack, and then address the command-and-control communication to block the exfiltration of data, the initiation of adversarial actions, and the internal spreading of the infection. Therefore, in one embodiment of the disclosed system, the security system comprises nodes on the perimeter, such as gateways and firewalls, and obtains and correlates traffic in and out of the protected area with the detection of other security events, including anomalies, as described above, and use this combined data feeds to make more rapid and better precision determinations of risk, and to then to more effectively perform security actions, whether the blocking of traffic or events, the replacement of data with deceptive data, and more. The security system's use of deception integrates well with previously described active defense measures, which are systems that automatically, semi-automatically or manually enable the deception of attackers, with the goal of extracting knowledge about the attackers and their organizations.

In one embodiment, the security system replaces emails and artifacts by inserting trackers, but does not otherwise make content inaccessible. One benefit with this approach is that it is less noticeable to a potential attacker than a system where artifacts are hosted in the cloud. In this embodiment, the main goal of the security system is to identify likely corruptions, as described above, and then take corresponding security actions. One example security action is to block or quarantine all emails coming from a corrupted account. Another security action is to mark up emails from corrupted accounts with warnings, or to modify or remove attachments and other artifacts to protect the recipient of emails from corrupted accounts. Yet another security action is to challenge the sender. This way, the security system can determine if an email from a corrupted account or device was likely sent by the attacker, or by the true owner of the account or device. This is done analogously to how the classification of potential attacks has been described in this disclosure, preferably but not necessarily on the level of individual emails. Such challenges are also beneficial in the context of other embodiments in which the security system hosts at least some of the content associated with artifacts.

Computing trends appear likely to increasingly use cloud storage for most objects, such as artifacts and associated data, and including messages. It is likely that different message types, such as emails, instant messages, slack messages, social network messages, and more, will be stored in a similar manner, and commonly all in cloud storage facilities, and that users will want software agents to scan these different type of messages, incoming and outgoing, and create a big picture integrated view of the messaging as it relates to reporting to the user, access of data and messages by the user, and processing of messages. Such processing preferably includes security processing, which the disclosed security system is suitable for.

The security system will access one or more cloud storage facilities, access messages, replace messages as described in this disclosure, access artifacts and modified artifacts, and process them as described in this disclosure. There may be multiple accounts of one type associated with one user profile, such as one work email account, one personal email account, one work messaging account, and one personal messaging account, where messaging may be instant messaging, SMS, MMS, slack, etc. There are great benefits associated with the security system coordinating actions between the different types of accounts. The system can determine that one device is likely under attack and automatically and rapidly reroute messages intended for that account to another account by deleting the incoming message as it is delivered or soon after it has been delivered, and then inserting a corresponding message in another account. The same can be done with artifacts and modified artifacts.

Moreover, the security system determines user engagement by reviewing activity across multiple accounts associated with one profile, e.g., determining that a user is awake and in the network neighborhood of her home based on observing the actions initiated from one account; then determine that actions associated with another account are indicative of the user being 300 miles away; this is indicative of account compromise. If the security system determines that an alert needs to be sent to the user, it will preferably direct the message to the account that the user is most likely to become aware of rapidly, based on historical observations associated with the user, and on recent user activity observed by the security system. The security system thereby both has additional insights into the user and her behavior, and additional opportunities to influence the user in an appropriate manner. This is not limited to security alerts, but can also be done to other types of messaging, e.g., notifying a user of an upcoming work-related meeting on a personal device and account when the user appears to be active on that device and account, but not on the work device or account.

Users can have multiple virtual addresses, such as two email addresses or two phone numbers, where these are mapped by the security system to a smaller number of accounts, such as only one email address or only one phone number, and where policies stored by the security system or associated units control the activity on these accounts. For example, phone calls from non-critical work sources may be sent to voice mail after work hours, while non-critical personal calls are sent there during work hours. The determination of what constitutes a critical vs. non-critical call is addressed by another policy that can be influenced by the user, the org structure of her employer, the time of the day at the user's location, the history and recent activity level of the user, and more.

The disclosed technology integrates well with cloud storage technologies, making every access to each document measurable by the security system, thereby making anomalies immediately detectable. This relates to receiving email and associated artifacts, as well as other types of messages and artifacts; it also relates to sending emails; storing emails; storing and accessing artifacts; performing actions on artifacts, such as accessing an excel spreadsheet with a macro in it, or displaying a PowerPoint file containing a diagram computed from data in the excel spreadsheet with the macro in it. Future display applications and associated document formats are likely to support the increased use of cloud storage and processing, and will also likely enable capabilities enabling better tracking and identification; the disclosed security system will extend its capabilities to such applications and formats, and their associated use cases, and will thereby enable yet other features associated with representing data as modified artifacts; where the access is made using requests associated with unique identifiers; the use of trackers; and the associated centralized capabilities relating to usage, prioritization, detection of user patterns and associated personalization of the user experience; improved prioritization for prefetching, lowering storage costs and communication delays; and improved anomaly detection capabilities, enabling rapid detection and classification of unwanted events and access attempts. To the extent that people increasingly host both data and applications in the cloud in the future, and access these from various computational devices, this is also a setting that is well addressed by the disclosed technology.

A further benefit of the disclosed technology is that it enables very lightweight and rapid identification and classification of threats based on access patterns. Consider any malware strain, for example, that accessed emails or contacts associated with an infected account or device, or which transmitted emails on behalf of a user of such an account or device. For concreteness, consider first the recent Google OAUTH Worm that requested OAUTH access to the email accounts of attacked users, and if given, ran a script that sent messages to users who had interacted with the corrupted user in the past. These emails contained artifacts—namely, URLs—that the security system would replace with modified artifacts. Then, a very short time after the request was made by a user, assuming the user granted the script access, the security system would see a series of outgoing emails that were both self-similar and similar to the email that the security system modified. This is an anomaly, and the pattern of the access followed by the emails would be identified as unusual after having observed just a small number of infections. A system that does not modify artifacts would not have as much contextual information, and therefore, the identification of the anomaly would be slower.

Consider further a corruption of a user account in which the attacker runs a script to identify valuable contacts, based on previous conversations. This involves accessing a fairly large number of modified artifacts. It is likely that the access of these is going to take place within a relatively short period of time, and that the inter-arrival time of the requests will be fairly static. The large number of accesses would be anomalous for almost all users, as would the short inter-arrival times of requests, as would the likely very uniform inter-arrival times. Finally, the manner in which these accesses are made would be anomalous: phishing attacks would result in the wrong user agents most of the time, and the absence of cookies; traditional malware attacks and typical VBA scripts would be very likely to provide signs of access using APIs, scripts or for the user anomalous applications; the access using a cloud-hosted script as in the case of the Google OAUTH Worm would have an absence of cookies, most likely the wrong user agents, and the presence of indicators related to API access.

The combination of these indicators would allow rapid detection of the anomaly; the use of security actions, as described above; the classification of the likely type of attack, as described above; as well as a prediction of what strain of malware is used, as applicable, based on clustering with other previous accesses whose source is known. This allows a determination, with a very high precision, of whether a series of accesses corresponds to a first known VBA script or a second known VBA script or a first known Trojan or a second known Trojan, etc. Being able to automatically cluster attacks helps contain the problem as guidance of how to best remedy the situation can be automatically provided by the security system to affected parties, whether admins or end users. It also allows a prioritization of what threats to address first, if multiple attacks are observed within one period of time.

Another benefit of the disclosed technology is that it can be combined with the detection of deceptive sender identities, such as the methods disclosed in U.S. Pat. No. 10,277,628 to ZapFraud, entitled "Detecting Phishing Attempts" and pending U.S. patent application Ser. No. 15/414,489 to ZapFraud, entitled "Detection of Business Email Compromise," both of which are incorporated by reference. As a deceptive email is detected using one of the methods disclosed therein, the system automatically generates responses to the sender of the deceptive emails, the responses containing trackers. The system may further add artifacts with misleading information, as described in this disclosure, and take additional security actions, such as preventing messages from the attacker from being displayed to the intended recipient; adding warnings in the messages from the attacker, and more. A person of skill in the art will recognize that yet other conditions associated with increased risk of attack can be used to trigger responses of the type disclosed herein, i.e., not limited to detection of corruption, or detection of deceptive sender information, but also, for example, the detection of dangerous content, such as malware, or references to dangerous content, or undesirable content such as spam.

Here, the system responses are preferably selected based on the nature of the abuse; it would in most cases, for example, be inappropriate to respond in the same way to an attacker sending malware as to a spammer attempting to sell fake Viagra. Thus, the system preferably characterizes the attack in addition to characterizing the attacker, as described before, and use both of these types of characterization to select the appropriate response, which can be any of the strategies described herein as well as variations of these and combinations of these.

The disclosure, so far, has focused on associating accesses with devices and contexts, where example contexts include network neighborhood information, end user access patterns, and more. The connection to the expected end user is made indirectly, by determining whether the device and contextual information are anomalous, and if so, classifying the situation and determining a degree of certainty; where a security action is preferably selected based on the classification of the anomaly, the certainty, and one or more runner-up classifications and associated certainties. However, the security system will also, where the end user hardware supports it, preferably collect biometric data associated to the user, and use this for the determinations. For example, a local software agent associated with the security system can access a user-facing camera constantly, but preferably not export the video over a network but only use it for an on-device determination of whether the expected user is likely to be using the computer. Similarly, a mouse with built-in fingerprint sensor can determine—periodically, triggered by automated verifications, as the mouse is used, or essentially all the time—whether the active user is matching the expected user, and with what confidence.

Alternatively, the software agent with access to such sensors determines which one of a collection of plausible users is using the device at a given point in time, conveying this fact to the security system. This allows user-specific security decisions to be centrally made, based on profiles that are specific to the relevant user and his or her usage patterns and preferences. This is particularly beneficial for shared devices, such as notepads used by nurses and doctors in hospitals. The detection of the likely user is beneficial to determine what information to present; how to configure user interfaces; how to configure access capabilities; how to identify what constitutes anomalous behavior with a greater accuracy than if different users are represented by one usage model and not one model per person.

In one embodiment, the system identifies new devices used by a trusted party. These new devices need to be distinguished from devices of attackers who have gained access to the accounts of a trusted party. The system identifies a request for a modified artifact corresponding to a user with identity ID 1, but does not detect the device making the request as belonging to ID 1, based on cookies and other device identifiers. The system preferably performs a heuristic analysis of the risks associated with the access request. If the request comes from a server or IP range normally associated with the trusted party, where the server or IP range is assessed to be private (a home or enterprise, as opposed to, for example, an airport or a cafe), then this is an indication of much lower risk. If it matches a server or IP range with which the user is associated, but this is associated with a server or IP range that is not private, then it is still an indication of lower risk, although not as much as if it is private.

The reduction of risk score is determined by computing an estimate of how common the server or IP range is for users not known to be in the same organization as the trusted party. This can be done using simple heuristics that take into consideration how many observations of the server or IP range have been made, and how many of these have been associated with the same trusted entity as the trusted user, where a trusted entity may for example be the company the trusted party works for, as determined by the domain in his or her email address, or based on inferences from associated email addresses used by the same party. If, on the other hand, the location is very different from the normal location, such as many hundred miles from locations the user has previously been observed, then the new device is associated with a higher risk level. If this location is one that is known to be associated with fraud, but not with the trusted user, then the risk score is assessed to be even higher.

Using heuristic techniques like these, a risk score is computed. This also depends on how predictable the user behavior of the past has been, which can be expressed by an entropy measure of change. A user that is very predictable is less likely to correspond to new behavior, and therefore, the new device is a higher risk, statistically speaking, than it would be for a user who is commonly changing devices, locations and contexts. In addition, the system preferably takes into consideration how likely it is that the new device of the trusted party is to correspond to an attack, based on the history of attacks (whether of this type, or other types) associated with the trusted party and his/her associates. A party that is commonly targeted, or whose contacts or organization is commonly targeted is at higher risk than one who is not.

The computed risk score is compared with one or more thresholds that can be set either by the system or by an admin associated with the trusted party. If the risk score exceeds a very high threshold, then the request from the trusted party is considered malicious, and a defensive action is taken. Examples of such actions include serving incorrect data, which may be deceptive, and to alert the trusted party or an admin associated with him or her. If the score exceeds a lower threshold then a verification action may be taken, such as requesting that the trusted user verifies his or her identity; this can be done using 2FA, voice-based verification, or by other means. If the user succeeds with proving his identity, or otherwise proves that he is a legitimate owner of the account used, then the action is considered secure. If the score falls below a low threshold then the action is also considered secure. If the action is considered secure, then the requested material is served and the new device is recorded as being associated with the trusted user.

Preferably, a correlation score is recorded. The correlation score is high if the system has a high certainty of the trusted user being the rightful owner of the account; for example, as a result of having successfully authenticated with a biometric method to prove his or her identity; while the correlation score is lower if the certainty is lower, e.g., having proved that he or she has access to some infrastructure commonly associated with the user, or another email account known to be associated with the user. The correlation score is cumulative in that if the same verification takes place again with the same user and device, the risk score associated with this transaction is reduced, and if the action is considered secure, and the correlation score increased.

When the correlation score reaches a correlation score threshold, or a sufficient number of observations (such as four) have been made of the trusted user in conjunction with the new device, then the new device is considered enrolled, and not new. All new devices, whether considered secure or not, are sent cookies and associated with other machine identifiers, to make re-identification of the device easier for future observations. If the system determines that the machine identifiers have been tampered with, e.g., mostly removed, then this affects the risk score, making the access request having a higher risk score. This is because attempting to remove identifiers is associated with undesirable activity and higher risk.

One type of ATO attacks, such as the Google OAUTH Worm of 2017, is viral, resulting in large numbers of self-similar requests. The system is preferably configured to identify anomalous patterns in the form of transmitted emails, requests for modified artifacts, and responses to challenges, especially where these anomalous patterns are seen for an unusually large number of instances during a limited period of time. It is sufficient that a small number of these actions are identified as anomalous, as long as the other are identified as having the same pattern as those that were identified as anomalous. This way, the system extrapolates beyond the known anomalous events by identifying similarities to high-risk events and associating events with such similarities as also being high-risk. One example of an anomalous event in this context is the request for content for a large number of stored emails, rendering of a large number of emails, sending of a large number of emails, or any combination of these; where 'large' is seen relative to the normal number of actions under similar circumstances, such as during a similar time of the day, or after a certain amount of time of inactivity. Access to a hundred documents corresponding to invoices may be considered anomalous, whereas access to only five of them during the middle of the night, after hours of inactivity by an otherwise very predictable user, may at the same time be considered anomalous.

The system determines that many accounts exhibit a similar behavior, such as accessing more than ten invoices sent as email attachments, for a large number of users, where this is considered anomalous for at least a portion of these, but by the similarity of the events is considered risky for all users. The system thereby identifies risk not only based on anomalous behavior, but also based on similarity to behavior that has been identified as being risky, as a person skilled in the art will recognize also applies to other types of events of the types considered in this disclosure, and not only to access of emails with attached invoices.

Since many attacks involve some form of automation, e.g., a scripted request of documents or an automated response to a challenge, the pattern of observed events in terms of the timing is also a relevant indicator of risk. A pattern that is associated with high risk, such as apparently scripted access to a resource, is determined by the system to be high-risk, and whenever that pattern is identified it is associated with risk. For example, a pattern may be the request of ten resources, where each consecutive pair of requests are spaced 2500 ms apart, is considered anomalous, and therefore, associated with risk since it is obviously scripted based on the very predictable inter-arrival time. Similarly, if the inter-arrival time is too short to correspond to a human activity, then this is considered risky.

In another embodiment, a new account associated with a request for a modified artifact is determined to be associated with a device of a trusted user, e.g., based on machine identifiers that are recognized. This is indicative of lower risk. An email from a party with a display name that might be considered high risk, e.g., by matching the name of a CEO in a protected company, but if the email is determined to have come from a device that is associated with the CEO, then the email is considered secure, and the new email account is considered being associated with the CEO. That would correspond to, for example, the CEO using the regular device but his or her personal email account instead of his or her work email account. For example, an email appearing to come from the CEO may be sent to the CFO of the same company.

Consider a situation where the system does not recognize the email address of the sender as belonging to the protected user with the same display name, which in our example here is the CEO. The system sends a challenge containing a clickable link, which functionally corresponds to a modified artifact in that the challenged party will be assessed. The sender clicks on the link and it is determined by the system that the device used is the same as that which is commonly used by the CEO, although using his or her official enterprise email address instead; thus, the newly observed email is determined to have been sent by a trustworthy party, and not be a case of display name deception. The newly observed email address is added to the profile of the CEO. However, if the challenged user does not click, or the click does not result in a recognized device, location, infrastructure, etc., then the system determines that the email is high risk, and likely to be a display name deception email.

In such an instance, the system may add a warning to the message, delay the delivery of the message, modify the appearance of the message to the recipient, require that the recipient clicks on an embedded hyperlink to review a warning before the message is made accessible, quarantine the message, or other actions that are relevant in the context. The system may decide not to challenge users of emails that have MUAs matching previously recorded MUAs or user agents, or descriptions of location, infrastructure, etc., based on these being lower risk. The system may also not challenge the user of highly suspicious emails with highly suspicious MUAs, but instead block such emails. The system may also forward such emails to an interactive honeypot system that automatically interacts with a party determined to be an attacker. The automated honeypot system preferably uses the tracking techniques described in this disclosure to identify and distinguish attackers, and to help track and identify them.

A further benefit of the disclosed technology is that it replaces traditional artifacts with modified artifacts even as a user accesses and stores an object, such as a pdf. For example, consider an email E sent to a person Bob from a person Alice, where either Alice or Bob, but potentially both, are protected by the disclosed technology. The email E, as sent by Alice, contains an attachment A or another artifact, which the security system replaces with a modified artifact A2 before the email E is delivered to Bob. Assume that Bob accesses the modified artifact A2 as described before, causing it to be requested from the security system; assume further that the security system determines that the request is legitimate, and transmits data to Bob in response to the request, causing data corresponding to attachment A to be displayed on Bob's computer or other access device. In this example, Bob indicates that he wishes to save the document on his computer. As this command is received by Bob's computer, a third item, A3, is stored on Bob's computer. A3 is a document that preferably does not contain any of the data contained in A, but which has the same name as A does, and potentially also the same visual representation as A does, e.g., a thumbprint image. For example, A3 may be stored on Bob's desktop, or in any other location on his computer or network, including Dropbox and similar, as indicated by Bob. A3 also contains a request for data, similar to A2. Thus, if Bob (or somebody else, with access to Bob's device) later attempts to open A3, this will result in a request for data similar to that made when Bob requested to open A2, causing the security system to determine the risk associated with the request and determine whether to respond, and what to respond. Alternatively, A3 may contain all the data of A, but encrypted, and accessing A3 causes a request for a decryption key to be transmitted. As the system receives this request, it profiles the requester, as described above.

The use of one of these methods is of great benefit as it protects against attackers that attempt to access sensitive data appearing to have been stored on the device, network or associated cloud storage instead of accessing data in emails, after having compromised a device or account of the user, i.e., Bob in this example. For example, if access to Bob's Dropbox account is compromised, or Bob's computer is compromised, the attacker will not be able to extricate data without being observed by the system, as the data is not accessible without making a request for it. One way in which an accessed document, corresponding to A2, containing data related to A, can be caused to be saved as A3 is by modifying the application that is used to read the data, e.g., Adobe Acrobat™ for pdf documents, Microsoft Word™ for word documents, etc.; an alternative is for middleware on Bob's computer, instrumented by the security system, is used to detect the storing of a document, causing the storage of the document in a protected environment associated with the security system (if not already stored), and saving of a "receptacle" document A3 that visually mimics A/A2 but which contains no data, and which contains a hyperlink to the data stored in the protected environment, or which alternatively contains an encrypted version of the data of A. If no changes were made to the data of A2 before the saving operation, then the hyperlink is preferably the same as that which led to A2, or simply another hyperlink leading to the same repository item.

One benefit of using multiple different addresses to correspond to the same item is that it allows the system to distinguish access requests for stored items from access requests for items contained in emails, which helps identify risks, classify potential attacks, and select the most suitable countermeasures in an automated manner. Therefore, the same item, saved on different computers and/or by different users would have a different associated URL or other address into the storage area, but may still correspond to the same stored data. If any user changes the data before storing it, then in one embodiment, this causes only the corresponding data to be changed, whereas in another embodiment, it changes the data as seen by other users, or as accessed from different computers as well.

A further benefit of using the approach of representing stored data as modified artifacts is that the system can automatically revoke access to all documents of some class to a selected user, e.g., a user who used to be an employee but who left the company, or to any data accessed from a laptop that has been reported stolen. At the same time, the user can still access the documents from another device that has not been reported stolen, as the corresponding artifacts from that device have different identities (such as names, keys, device identifiers such as HTML cookies, etc.) than those of the stolen laptop. A terminated employee or a user of a stolen laptop, simply speaking, would not be able to access any modified artifact, even if he or she were able to log in to the computer. This is because the security system would not respond to requests for data corresponding to modified artifacts, but would block these, send alternative information, or notify an admin of the access with the goal of starting an investigation. A3 could comprise an instance of a webview instance configured to access a document, where the computer of the end user is configured to store A3 after the user requests the storage of the data obtained from requesting A2. A person skilled in the art will recognize that there are other alternative approaches to achieve the same or very similar goals, apart from the example solutions and approaches to storing, managing and accessing data. This is a powerful digital rights management solution that protects against access of sensitive documents from devices that are not allowed to access the documents.

A person skilled in the art will recognize that the disclosed system protects data, associated to artifacts, whether they are sent from a user, received by a user, accessed by a user, or stored by a user, where this user is compromised by an attacker, being subverted, or otherwise exposed to risk. The system furthermore identifies whether an unknown user is likely to be a new persona of an already known and trusted user, based on scoring of the device(s) and their contexts used to send or receive messages, access messages and artifacts, and access stored elements.

In one embodiment, the system processes an email with an attachment A, generating the modified artifact A2, where A2 is a file that can be stored by the recipient, e.g., by dragging and dropping the attachment from the mail reader to the desktop or a selected folder. Example file types for the modified artifact include an HTML document, a webview element, and an executable element. The file corresponding to the modified artifact would be given a name corresponding to the name of A. For example, if the name of A is "invoice.pdf" then A2 may be named "invoice_pdf.html", "invoice.pdf.html", or "invoice.html." Alternative naming conventions are also possible, as will be appreciated by a person skilled in the art. When A2 is opened then it is causing a request to be sent to the security system, where the request includes an identifier, as described previously, used by the security system to identify the data corresponding to A. In addition, A2 will cause the sending of tracking data. Some of this tracking data may be automatically collected by virtue, for example, of A2 being an HTML file, causing it to be opened using a browser, which will then send cookies and other identifiers, as well understood by a person skilled in the art. The tracking data may also be collected by the executable element as it is engaged by the user, e.g., by the user double-clicking on it. Such data is then transmitted to the security system along with the request. If the element uses webview, then it is a browser instance, and has the capability of a web browser. In response to the request, the security system conditionally serves content data, which may either be rendered in the browser, webview or executable element, or cause the opening of an application, such as excel.

In one embodiment, the type of A is excel, for example, and A2 is an excel document with a macro that causes data to be requested from the security system, and then used to populate the excel document. It is beneficial for macros to be signed by the security system or another trusted party. The requested data is either the data of the document A or a key that is used to decrypt data contained in A2, where the decrypted data is the data of the document A. The same approach can be used for other document types, such as word documents, pdf documents or executable files, for example, as will be appreciated by a person skilled in the art.

The security system may use multiple encoding strategies at the same time, to encode files of different types and to conform to different user and organizational preferences. One organization, for example, may prefer using open standard versions for some document reader, and wish for all incoming documents that can be displayed using such an open standard reader to be displayed as such. Another may prefer excel documents to be converted to Google spreadsheet documents. Yet another may not allow webview elements to be downloaded, or may not allow macros. A person of skill in the art will also recognize that webview is just one example interface between the apparent document as seen by the user and the element that causes the request for data for the user, when opened or otherwise engaged. Similarly, one user may not have JavaScript enabled on one device, and may therefore need a conversion that is mindful of this.

In some contexts, the conversion type is determined by the security system in response to receiving the request for the data corresponding to the modified artifact, where the decision is made based on the identity or type of the requesting device, where the type may be a laptop, an iPhone, a windows computer, etc., and may describe the hardware, the software including the operating system, and/or any observed practical constraints, such as potential bandwidth constraints indicated by the file being requested over a carrier-mediated connection, as is evident from the headers of the request. The latter may result in a decision only to transmit data for portions of the document that the user is attempting to render.

The element used for viewing of the data is conditionally provisioned to allow the user to make changes, and to request the changes to be saved. When changes are saved, they are preferably transmitted to the backend of the security system. Alternatively, the changes are stored locally, potentially using a key that allows later decryption by the backend; and later transmitted to the backend as there is greater bandwidth or other conditions such as security conditions depending on the networks, the geographic location of the user, etc., are met. As described before, the connection between the user device and the backend is preferably encrypted and authenticated, e.g., employing a secure channel, e.g., using SSL/TLS.

In one embodiment, the security system identifies signs that requests for data corresponding to modified artifact are made in a manner that suggests scripted requests. This is indicated by unusual volumes of requests, unusual inter-arrival times of requests (such as very short durations or durations that are, as a collection, not likely to be generated by a human), and by headers indicating that the request was made using a piece of software used for scripting, or using an API. A sign of automated retrieval is not necessarily a sign of malice for all users; however, for a user that does not use scripted access requests according to the historical accesses, it is a sign of risk, and will preferably cause an escalation, such as a challenge, or may cause other security actions to be initiated, as described above. Similarly, the system identifies other likely scripted activities, including rendering of emails; sending of emails; or sending of stored artifacts according to a pattern or selection criteria that is normally not associated with a human user, or not associated with the user whose account or computer is used to initiate the action.

These types of scripted activities are also signs of risk when performed in the context of an account or device that is not historically associated with scripted actions. The system therefore detects anomalous access to artifacts, whether the artifacts are part of email messages in a user inbox, in a user sent box, another email box such as the archive; and when the artifacts are stored on the computer, whether the artifacts are part of data files or executable files. The former detects undesirable access to accounts, whether by an attacker that has stolen account credentials, has access to the account from an infected or stolen computer, or similar. The latter allows the system to determine, for example, that a device is being cloned; that a stolen device is inspected by the thief; that malware is scanning the contents of a device; or that a disgruntled employee is accessing a large number of sensitive files. A person of skill in the art will recognize that these are only illustrative examples of the benefits of the disclosed technology.

In one common scenario, an attacker obtains access to a victim email account, whether by stealing access credentials to the email account or by executing malicious code or scripts that accesses the email account; the attacker then performs a scan of the victim mailbox in order to collect intelligence about the victim and his/her contacts. The search can be remotely detected by the system by the pattern of renderings and access requests; moreover, the search can be reconstructed by the system, given information about renderings and access requests, and with knowledge of the likely search approach, the system can assess the risk of the situation. For example, attackers may commonly perform one out of four searches, which each results in a very different access pattern, where these access patterns, being distinct, can inform the actions of the security system:

1. In a first example, the attacker has access to the victim account, and searches for any email that has an attachment, mentions the word "invoice", and which is either sent or received by the victim. The attacker performs this search manually and obtains a list of search results, which does not cause renderings of the emails. However, as the attacker manually reviews a screenful of search results and clicks on a large portion of these, typically in order of increasing age, each email is rendered for a slightly different time and, for some of these, the attacker requests the modified artifact. This results in a pattern of renderings that is indicative of the search made, and the fact that it is manually performed—the latter due to the different rendering intervals, the occasional failure to request an email that was a search result, the occasional rendering of an email out of order, and the fact that not all renderings result in a request for a modified artifact. In this example, we may assume that the attacker connects remotely to the victim account, meaning that he has the access credentials and accesses the account from his or her own computer, as opposed to from the victim's computer. This will also be known to the system, which in addition to deducing the likely search requests and knowing that it is likely to have been made manually, will know that the access was not made from the victim's computer.

2. In a second example, the attacker performs a search for "CFO", and obtains a collection of search results. As above, the attacker manually accesses these, potentially looking for emails sent from a person whose title includes "CFO", which could be part of the signature file or the display name associated with an email. There may not be attachments to many of these, so most of the renderings do not result in any request for a modified artifact. Assuming this is not a very fruitful search, the attacker might look for several screenfuls of search results, which the system detects by a larger number of renderings, essentially in order of age. In this example, the attacker may have used a RAT to connect to the victim computer, and from there, manually perform the search. The fact that the attacker uses the victim's computer will be detected by the security system. The renderings will be performed on a recognized and trusted computer, namely that of the victim of the attack. In one instance, the requests for modified artifacts such as URLs may be made from another system, by the attacker simply copying the URL of interest and requesting it from his own system; in another, the request will also be made from the computer of the victim. When some requests are made from unknown computers, that is a strong signal of risk; however, when both requests and renderings are made from the victim computer system, this leads to uncertainty for the security system: whereas the security system knows with high certainty what search was made, it does not know with certainty that the search was not made by the legitimate owner of the account. This results in a lower risk score than if an attack associated with remote access is detected. Using anomaly detection based on the number of searches, the time of the day, and other indicators of normal or abnormal behavior, a risk score is computed. If the risk score exceeds a threshold, then the system will take an optional security action, such as generating a challenge, sending an alert, etc.

3. In a third example, the attacker uses a script to perform one or more searches, retrieve all the results in rapid succession, and request all modified artifacts associated with these. All are performed strictly in order of age with no omissions. The first search may be the same as that in the first example, but automated. This will result in a slightly different "search fingerprint" than in the first example, due to the scripted search, but the result will have more in common with that of example one than that of example two. The system will deduce that the search was scripted due to the largely uniform inter-arrival times of the renderings and the requests for modified artifacts. The script may correspond to a client-side script used at the computer from which the attacker is accessing the victim account, it may correspond to a script that is run on the computer of the victim computer, or it may correspond to a script that is run on a cloud app that has access to the account. These three options result in different patterns of renderings: the first results in renderings on a system that is not trusted, or not associated with the victim, as in example one above. The second results in renderings associated with the victim computer, as in example two above, but with the additional information derived by the security system that the access was scripted, which is a strong risk indicator for most users. The third example typically would not result in actual recorded renderings, but only in requests for modified artifacts. Requests for modified artifacts without associated renderings of the emails is not normal situation in the context of most user as people would render an email before requesting artifacts in typical situations. In some instances, it may be possible for the system to determine what search strategy of the attacker corresponds to the access requests; in other, it may simply be able to determine whether a known attacker strategy was used or not, which may help identify the nature of the threat among some number of known threats. In either case, the ordered access of artifacts associated with a particular search term, without associated rendering of the associated emails, is a strong signal of fully automated search and retrieval, which is likely to be performed by an attacker. Thus, each one of the searches and associated potential renderings and potential requests for modified artifacts conveys to the system what search was likely made, how (e.g., manually or in a scripted manner), from where (from the victim computer or not), and whether emails were read by a human requester or parsed by a script (where in the latter case, no renderings occur.)

4. In a fourth example, the attacker does not use an email client or browser email client to search, but instead accesses modified artifacts stored by the victim on his or her computer. Since most people store things in folders and subfolders, and the attacker is likely to access the elements in order of finding them, an attacker just browsing the contents of folders and attempting to access modified artifacts that have been stored, will give a different access pattern than an attacker that uses the finder of a computer, searching for a term (such as "invoice") and requesting the results of the search. These two cases can easily be distinguished from each other by the system, as the latter will likely result in a more structured ordering of the accesses, e.g., according to age of the stored item. The security system can also distinguish this set of requests from the examples described above. For one thing, if stored modified artifacts are associated with different requesting environments (e.g., different browser or webview, different application) that will be an indicator; moreover, the absence of associated rendering of the emails. Like explained in examples one and two above, the system will be able to determine whether a set of requests comes from an untrusted system or the system of the victim, and in the latter case, determine how anomalous the requests are based on prior behavior and observations.

In all of the examples above, the system can determine, with a high likelihood of correctness, what the search terms were. One way to do that is to maintain a list of common search terms used by criminals, and to determine what pattern of accesses each of these would have resulted in relative to a mailbox, and compare the determined pattern to the observed pattern. Another approach is to extract common terms of features of all the rendered or requested elements, such as all are associated with the word "invoice", or "only emails with attachments were rendered", and to use the commonalities as an indicator of the what the search likely involves.

Using one of the ways of detecting risk as is described in this disclosure, or a variation or a combination of the approaches, the system determines a risk score associated with a user account. It also preferably performs a classification that indicates the likely attack type, e.g., phishing or malware; the likely attacker mode of operation, e.g., manual access, scripted access; the likely intent, e.g., search for financial documents or tax documents; and more. The system then performs one or more security actions based on these determinations:

1. One security action is to filter the email messages being sent from an account that is associated with a high risk of being compromised, where the filtering comprises blocking, sending to an admin, adding a warning, removing information, replacing information, blocking requests for modified artifacts until a problem has been resolved, etc.

2. Another security action is to identify emails from accounts other than the believed compromised account, and in particular, from accounts that have not been previously observed, where these email messages have content related to content that the security system knows was potentially accessed by the attacker as he or she compromised the victim account. For example, if a realtor's email account is believed to have been compromised, then emails containing addresses associated with clients would be considered high-risk, whether these emails are sent from the believed-compromised account or other accounts. This is because of how the common fake-escrow-agency attack works, wherein a realtor is compromised and home buyers get emails appearing to come from an escrow company or an employee of an escrow company, asking the home buyer to transfer funds.

3. Another security action is to increase the scrutiny of any emails being sent to contacts of the user believed to be compromised, to the extent that the security system has the capability of doing this. For example, any email containing slightly higher risk content, or coming from new senders, may be given extra scrutiny, e.g., by an admin. This extra scrutiny can be selective based on who the likely targets may be. For example, an attacker searching for emails from or the term "CFO" and finding the name of the CFO in an email of the compromised account, is now likely to attempt to attack said CFO. Accordingly, the security system would increase the scrutiny of all emails to the CFO, especially when coming from the believed compromised account, containing higher-risk content, or being sent from previously not seen senders.

Other security actions are exemplified in this disclosure. A person skilled in the art would recognize that these examples are merely illustrative, and for the purpose of providing concrete instances, and not restrictive in any sense.

In one embodiment, the security system identifies attack signatures comprising information such as combinations of risk, variation or a combination of the approaches, anticipated search words and search patterns, one or more classifications that indicate the likely attack type, attacker mode of operation, likely intent, and more. The security system associates such a signature with one of a common type of attack, a particular malicious software package, a particular criminal group, or a combination of these; and use this signature to classify attacks rapidly, track and associate abuse with known actors, identify common techniques and changes of these, and more. It is beneficial for the system to notify admins of the commonality of various aspects of attack, including aspects corresponding to particular signatures. One attack may correspond to more than one signature, and may not always match all the signatures it is associated with, as attacks are known to change gradually over time, whether due to experimentation or human error. Such changes can be quantified by the system by determining the extent to which an attack matches one or more already established signatures.

As signatures are developed, stricter countermeasures can be more rapidly deployed in a selective manner. Consider an attack campaign that commonly involves transmitting encrypted zip files containing malware, and then, as a victim system is compromised, automatically identifying desirable targets according to some metrics associated with the attack, using the compromised account to send messages to these desirable targets. An encrypted zip file is an artifact, just like a zip file that is not encrypted as well as any other attachment, and will therefore be replaced with a modified artifact, the data of the encrypted zip file stored by the security system or conveyed in a manner that is encrypted using a key held by the system, and only conditionally sent to the message recipient.

Assume that this attack matches a set of signatures, and that a new attack instance is detected as matching at least some of these signatures. Then, instead of transmitting a message comprising a modified artifact, the system determines that this is a malicious message that should not be transmitted, and therefore blocks it. It may, in addition, initiate other security actions, such as notifications of the first victim or an admin associated with this party. If, on the other hand, a series of user actions does not cause a signature to be triggered by the security system, the security system stores the data of the encrypted zip file and transmits a message with a modified artifact associated with the stored data. If the recipient requests this data, the security system makes a security determination to decide whether to send relevant data to the requester or not. In the case where the system decides to send relevant data, it may still not send the content of the encrypted zip file, as that has a potential of posing a risk. Instead, it requests the decryption key from the recipient of the message (i.e., the party who initiated the request) and attempts to decrypt the encrypted zip file without first sending it to the requesting party.

From the user perspective, this is identical to or very close to the expected user experience, which is beneficial but not necessary. If the decryption succeeds, the system scans the contents of the zipped file, and determines whether any of these poses a risk. If none of them does, the contents are sent to the requester. If some of them correspond to a known threat, then the system performs a security action, such as not sending the dangerous items, not sending any items, sending a notification to the requesting user or an admin, modifying at least the items found to pose a risk, and more. In one embodiment, the decryption by the security system is optional, and can be predicated by the identity of the sender, the preferences of the recipient, the type of zipfile and whether it is accompanied by a digital certificate indicating that it should not be decrypted by the security system or the conditions under which it may be decrypted, such as by legal requirement. This applies not only to encrypted zipfiles but to any encrypted documents, such as encrypted word documents, encrypted pdfs, and more. Alternatively, the zipfile, whether encrypted or not, may contain multiple documents, some of which are individually encrypted and potentially associated with indications that they may not be decrypted by the security system. Thus, a person of skill in the art will recognize that the protection related to encryption applies to a hierarchy as well as to individual objects.

If some of the items have the potential of being dangerous, e.g., containing code, being encrypted files, etc., then another security action is taken, such as rewriting these items in a form that is not posing a risk, requesting that the requestor provides a PIN or password to decrypt the files before they are transmitted, etc. This limits the risk posed to the party who received the message. The system also preferably compiles statistics relating to the contents, such as the type of content, the assessed security risk associated with the different items, and whether any of the items matches a signature of known abuse associated with a threat actor or type of attack. The statistics can be made available to the recipient, for example, as well as to administrators associated with the recipient; the statistics can also be used to improve the performance of the system, provide better security, or other related improvements.

The system tracks the location of requests (e.g., expressed as the geolocation based on IP, or as a time zone, or as a server from which the requests are made); the device type (based on cookies and other trackers); the context of the request (such as whether it was made using a telephonic carrier, a broadband internet access such a DSL or cable TV); the manner in which the request is made (e.g., automated or manual, from a recognized device or not); the likely intentions associated with a request (e.g., being part of a pattern of requests that indicate a particular search term); the likely risk exposure type associated with the attack (e.g., whether additional victims are likely to be attacked from the observed device or account, from a protected account or device, or from an independent device or account); and other indicators as described above, where these may correspond to signatures.

Here, an observed account/device is one that corresponds to an observed user, and a protected account/device is one that corresponds to a protected user. The system preferably comprises a portal through which authorized users can view statistics associated with abusive behavior, preferably in a manner that indicates trends, differences based on the vertical of the victim type, and identify threats that are associated with particular types of infrastructure or the absence of such infrastructure. This enables a general risk scoring of individual organizations, members of these, verticals, groups of organizations or verticals, locations of victims, and more. This provides guidance for people wishing to understand the security threat posed, whether to remediate, insure, or otherwise inform about this level of risk. It also provides guidance for law enforcement and guidance for organizations considering whether they need to protect their users, accounts and assets using the system disclosed herein.

In one embodiment, an email E is sent by a party A to a party B, but is intercepted by the security service. The security service prevents the delivery of E to B, and instead transmits an email E' to B. The rendering of message E' causes a request to be sent to the security service. Alternatively, the message E' comprises a modified artifact that, when requested by B, causes a request to be sent to the security service. As the request, whether due to rendering E' or the user interacting with the modified artifact, is received by the security service, it is determined whether the context of the recipient B matches a known or secure context. Methods for doing that are described above.

If the security system determines that the request is associated with a secure context, then the security service causes the transmission of the message E to B. The message E' may contain a notification stating "You have received a message from A", or "Click here to receive a message from A" where the word "here" is hyperlinked and corresponds to the modified artifact. In one embodiment, E' does not appear to come from A, but appears to come from the security service or an entity associated with it. In one embodiment, the replacement of E with E', and then the later but conditional transmission of E, is performed conditional on a security assessment, e.g., based on the content of E; a security classification associated with either A or B, or both; due to a temporary increase of security requirements; or a combination of these.

In one embodiment, the security system is deployed by a financial institution. User A is an employee of the financial institution, and has an email account associated with the financial institution. In one example situation, the employee's job involves receiving and sending sensitive information related to mortgage applications. User B is interested in applying for a mortgage, and sends an email to user A. User A responds to a request from user A with an email E1 comprising at least one of an artifact (such as an attachment or a URL) and a text. The security system intercepts the email E1 and identifies artifacts and text, and, based on a policy replaces at least some of these elements, resulting in an email E1' that is sent to user B. In addition, the security system optionally incorporates instructions for user B, such as "Please click here to obtain a message from A", as also described in previous examples associated with other embodiments. As user B clicks on the link, or alternatively, simply renders the email E1', the security system collects one or more identifying pieces of information from the computer and system associated with user B; examples of such identifying pieces of information are HTML cookies; cache cookies; user agent data; other cookie-like identifiers as understood by a person skilled in the art; data related to the network associated with user B, such as server names, IP addresses and more, and uses at least one of these identifying pieces of information to make an identity assessment that preferably comprises a value indicating the certainty of the assessment as well as information associated with the identity of the user and associated computer.

The security system makes a security determination based at least on the identifying piece(s) of information, but potentially also on a certainty assessment, a policy indicating a user preference regarding security level, and an indication of whether the computer used for the access is believed to be a single-user computer or a shared computer. For example, if the security system has recorded the identifier associated with the computer for several accounts believed to be associated with distinct users, then the security system may conclude that the computer is a multi-user computer.

After a security determination is made, the system performs one of the following actions: it determines that the user is not the intended user and decided not to serve the content associated with E1 but not explicitly contained in E1'; it determines that the user requesting access is likely to be the correct user and serves the content associated with E1 but not explicitly contained in E1', e.g., by sending to user B a follow-up email to E1' that has these contents or by serving the contents to user B in a browser, preferably transmitting said contents using a secure connection; requires a login to an account associated with user B, such as user B's bank account; or requires a registration on the system comprising proving of an identity associated with user B, where this may involve disclosure of PII and be performed over a secure channel. If user B has in the past used the same computer for online banking with the financial institution, and logged in to his or her account, then this has allowed the financial institution and the security system to collect, after the login, identifying information associated with the computer used by user B. Therefore, a user who has used the same computer in a manner that associated the computer with knowledge of the login credentials, and there was no indication of abuse for the session, then the same identifiers or very closely related identifiers will be detected as user B renders E1' or opens or clicks on a modified artifact associated with E1'. A person skilled in the art will recognize that this enables the secure and encrypted transmission of sensitive data to user B, without any of the complications associated with the current prior art, thereby providing improved security. In addition, it provides the protection against corruption, whether by the sender or receiver; the system also provides such security relative to messages going in the opposite direction.

In an alternative embodiment, E1' comprises a modified artifact that comprises the content sent in E1 in an encrypted format, wherein the decryption key is provided by the security system over a secure channel, to the computer of user B after the security system has verified that the access request corresponding to opening the modified artifact or rendering the email E1' is secure, e.g., that the machine identifiers detected by the security system and associated with the computer of user B match previously observed identifiers associated with user B. If user B has not used the computer for online banking with the financial institution, then he or she may preferably be required to prove his or her identity to associate themselves and their PII with the computer used to access the modified artifact. An alternative to a secure channel is a second communication channel, such as SMS, where a one-time secret can be provided by the system to the recipient of a user and the user uses this to request access to one or more artifacts, to decrypt these, or a combination thereof. Authentication software such as Google Authenticator™ and competing products can also be used for these purposes.

An attacker that has gained access to user B's account or otherwise intercepted the email E1' and attempts to gain access to the sensitive information will not be able to so do, since his or her computer will not match a known computer associated with user B. In addition, if a code, key or one-time password is required for access, the attacker would additionally be in possession of the device or service used to obtain the access code. In one embodiment, the use of this additional mechanism is limited to when a challenge is required, based on comparison of identifiers of the requestor with identifiers associated with the profile of the same. An attacker that has compromised user B's computer and uses a script to request access to the modified artifact is likely to reveal this fact based on the nature of the artifact request(s), as the request will not have the same format as it normally does when used by user B, but contain indications of access from a script, contain inter-action timing measures associated with scripts, and similar.

In one embodiment, the security system may require requests from two different devices associated with user B in order to permit access to a resource. For example, user B attempts to open a modified artifact using his or her computer, and then be informed that he or she needs to perform the same action from his or her cell phone as well. As the security system detects two access requests from devices that are recognized to be associated with the user, it determines that it is highly unlikely that these are due to a corruption, whether a phished account, malware on a device, or a stolen device. This is an important security feature that can also be used as a second factor aspect in any of the other embodiments described herein. It can be used conditional on some triggering event such as a slightly anomalous request or aspect of a request; very high security requirements related to transmitted content; or as a result of a policy stated by the financial institution, the sender A or the recipient B. This enables a new form of document protection that is suitable for highly sensitive document transmission, e.g., for protecting documents between a financial institution and a client thereof. This aspect of the protection is preferably conditional on the settings of at least one of the document sender, the document recipient, or an indication in the message or its attachment(s).

In another embodiment, user B is receiving an email E1' that is a modified version or results from an email E1 sent by user A, and accesses email E1' using a computer that is not recognized by the security system, or otherwise is determined to not be a low-risk access request. As a result, the security system, instead of transmitting the sensitive content to be rendered at the computer of user B, displays an instruction for user B to prove that he or she has access to another piece of hardware, such as a cell phone associated with B. For example, the instruction may state "Click here to have a verification message sent to your registered cell phone." If the user clicks then a message is sent to a cell phone associated with user B. This can be done using an SMS to a known phone number associated with user B. If there is no such number known by the security service then an email E2 is sent to user B.

As described before, it can also be sent to user B using an email that is only delivered to select devices, such as a cell phone or a corporate computer. This is achieved by associating conditions with the message, where such conditions specify what devices may access the message; other conditions may also be used, as will be understood by a person of skill in the art. This message may say "To review the message from user A, then on your cell phone, click on thislink." If an SMS is sent to user B, then the message may state "To review the message from user A, click here."

In either case, if the user clicks from his or her phone, then the link is opened on a browser associated with the phone, and a connection is established to the associated URL. The security system is associated with that URL, which is preferably unique to the user and/or this session. The security system determines whether the device from which the request comes is a device associated with user B, and further determines that it is a cell phone. The latter can be done either by automatically inspecting headers and determine that they are indicative of it being a cell phone. Alternatively, it can be done simply based on comparison with an identity profile believed, based on past header inspections, to be a cell phone. Alternatively, it is not done at all, if the message was sent as an SMS; then, it is only determined that the device making the request is associated with user B.

If an attacker has corrupted the account or first device of user B, but has not corrupted or stolen a second device of user B, corresponding to the cell phone of user B, then the attacker will fail in impersonating the user, as the access request will not reveal identity information corresponding to user B. If the attacker is attempting a social engineering attack in which he asks for the message (such as the SMS or email) to be forwarded to him, then this will also fail, as the access request will come from a device other than a device registered to user B.

In one alternative example, it is not important that the second device is a cell phone, but simply that it is a device associated with user B, and that it is a device different from the one that, when making the access, first triggered the challenge by not corresponding to a low-risk access request. In one example alternative embodiment, a user application such as Google Authenticator™, or a competing product, preferably configured in a way that requires biometric authentication of the user, is used to verify access by the appropriate user. For code generators whose access requires biometric authentication the delivery is therefore made dependent on the correct biometrics being verified. Similarly, for devices used to receive messages that support biometric verification, the access to the message may be dependent on the expected user authenticating to the device. For example, a laptop computer may have a fingerprint scanner or support face biometrics, and may offer applications an API to these services; the message application, whether this is an email client, a web browser, or a dedicated application such as Slack, may request a verification of biometrics, and receive a certificate or other indicator of success by accessing the API, forwarding this indicator or a function thereof to the security service, and in response to the indicator being verified by the security service, access is given to one or more artifacts.

The security system may associate a policy with the access, requiring, for example biometric authentication when the most recent biometric verification of the user took place more than 15 minutes ago; when the user is in a public space, as determined by the IP address; when the user has indicated that he or she is traveling; or when the access is made from a high-risk environment. To the extent that the accessing device does not have biometric support, another device, such as a cell phone, can be used to verify the identity of the user before the artifacts can be accessed from a laptop. The condition under which biometrics are required may include a high-risk situation such as one that corresponds to a detected anomaly. In one embodiment, the described technology is used as a replacement to and improvement over SMS-based confirmation codes.

By sending a modified artifact or, more generally, an object such as a URL that when clicked causes a request to the security system, the security system uses the profiling from the collected identifying data to determine whether the user is legitimate, while defending against unwanted forwarding of the messages to a social engineer. The first time a user interacts with such a challenge message, the system only knows that the message was received by the user, assuming it has not already profiled the device used to send the challenge to. For consecutive uses, the identifying information would be used to determine whether the access should be allowed. For a first time, the website being requested by user B interacting with the modified artifact or URL may display a code that functionally replaces the code normally sent in the challenge SMS messages in traditional use scenarios. The user would provide this to the security system or associated party in order to gain access to a resource. However, for future uses, this is not needed, causing a simplification of the user experience at the same time as it prevents against attacks such as social engineering attacks in which user B is tricked to forward the challenge message, phishing attacks in which an attacker has gained access to the associated messaging account of user B, etc. The latter is a real problem as is well understood by a person skilled in the art, as attackers commonly trick users or carrier employees to forward traffic from a first number (e.g. corresponding to the cell phone of user B) to a second number (the attacker's phone). If this happens then the abuse is stopped, except when it happens to a user whose device has not been profiled by the security system. Once this has been done, the security system will detect the anomaly.

It should be noted that if a user replaces his or her phone, then this will result in a failed detection of the user device. Therefore, when a failed detection occurs, the system preferably does not automatically conclude that the user is under attack, but initiates an in-depth verification of the user device and/or situation. This may, for example, involve the comparison of the network neighborhood of the request to that normally associated with the user, where the network neighborhood includes predicates such as the time zone, the carrier, the IP address, the name of the server, etc. These predicates are available to the system from the headers of the request.

Based on the comparison, traditional challenge questions may be presented to the user and if correctly responded to, the user is permitted access and the new device is profiled and registered as being associated with the user. In addition, the security system preferably notifies the user that a new device has been detected, and requests an immediate response to block access to this device. This request is preferably sent on multiple channels, such as both email and SMS. This approach is of particular benefit in the context of security systems associated with large online services such as social networks, email access, and other services in which users are commonly logged in to accounts, as this automatically allows the recognition, by the security system, of the device of the user. It can be offered as a free-standing security service as well as part of a larger offering. A person of skill in the art will recognize that a combination of the disclosed methods can be used, whether in combination of each other or in a sequence where one security method is used conditional on the data observed in response to or after the use of another method.

Additional illustrative embodiments will now be described with reference to FIGS. 1 through 8.

FIG. 1 shows one illustrative embodiment. Email sender 100 is sending an email 101 comprising an artifact 102, where email 101 is addressed to recipient 110. Security system 120, also referred to as security system, causes email 102 to be processed by proxy 121. Proxy 121 generates an optional challenge 103 comprising artifact 104, where artifact 104 may be or comprise a tracker. In response to receiving challenge 103, a user associated with sender 100 optionally takes an action that causes a response 105 to be sent to interaction unit 125 of security system 120. Interaction unit 125 accesses a profile repository 122, potentially comprising a profile 123 that is associated with sender 100 and potentially comprising a profile 124 that is associated with recipient 110. In some instances, only one of these profiles exist, and in some instances, neither exists. Interaction unit 125 and proxy 121 can generate profiles for profile repository 122, and also access profiles stored in the profile repository 122. Proxy 121 makes a request to security assessor 127 relative to email 101, and security assessor 127 optionally generates a response to proxy 121. Proxy 121 transmits a modified email 111 to recipient 110, where modified email 111 comprises an artifact 112. Modified email 111 is a modification of email 101, and modified artifact 112 is a modification of artifact 102. In response to receiving modified email 111, a user associated with recipient 110 optionally takes an action related to the modified artifact 112 that causes a request 113 to be sent to interaction unit 125 of security system 120.

Interaction unit 125 accesses profile repository 122, repository 126 that stores data useful to generate a response 114 from a request 113, where the response is artifact data that in the common case corresponds to artifact 102, but which may optionally be replaced with fake artifact data, which can be generated on the fly by interaction unit 125 or stored by the repository 126 and accessed by interaction unit 125.

Security accessor 127 receives information from interaction unit 125, accesses profile repository 122, and makes a security determination. If proxy 121 sends a request to security assessor 127, then the security determination is sent to proxy 121, and if interaction unit 125 sends the request, then the security determination is sent to interaction unit 125. The security determination is used to generate or select response 114, modified email 111 and modified artifact 112, and to determine whether challenge 103 should be generated and transmitted. Security assessor 127 also stores records of these interactions in log 128, and conveys alerts to administrator unit 130, which can access both the security assessor 127 and log 128.

Figure 2:
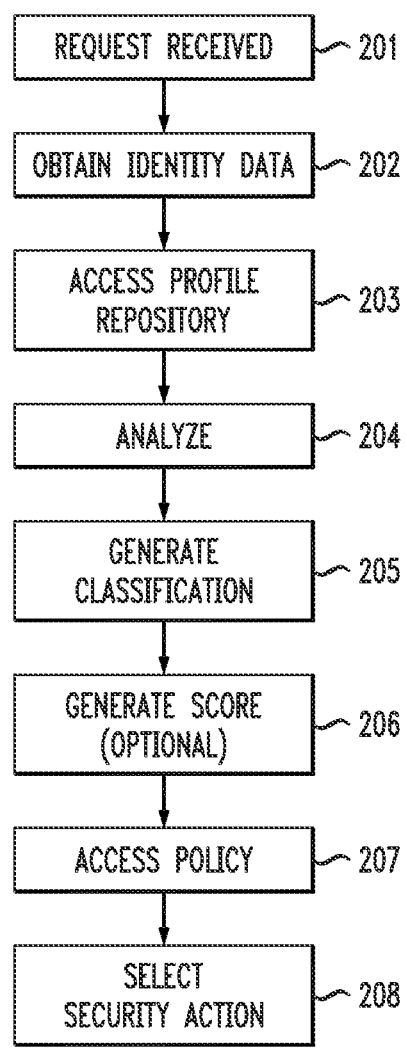
FIGS. 2 and 3 are flow diagrams of example processes associated with artifact modification and associated abuse detection in illustrative embodiments.

FIG. 2 shows a request 201 received by security assessor 127. In step 202, security assessor 127 obtains identity data, where example identity data comprise cookies, IP data, geolocation data, user agent data, mail user agent data, carrier data, and more. In step 203, security assessor 127 then accesses profile repository 122 to look up a record associated with identity data 202. In step 204, security assessor 127 performs analysis on the identity data and the accessed record, generating a resulting classification in step 205 and an optional associated score in step 206. In step 207, security assessor 127 accesses a policy relating to at least one of the sender 100 and the recipient 110, and based on the policy, the classification and the optional score, security assessor 127 selects a security action in step 208. The security action is preferably conveyed to at least one of the proxy 121, the interaction unit 125, admin 130, or stored in log 128.

Figure 3:
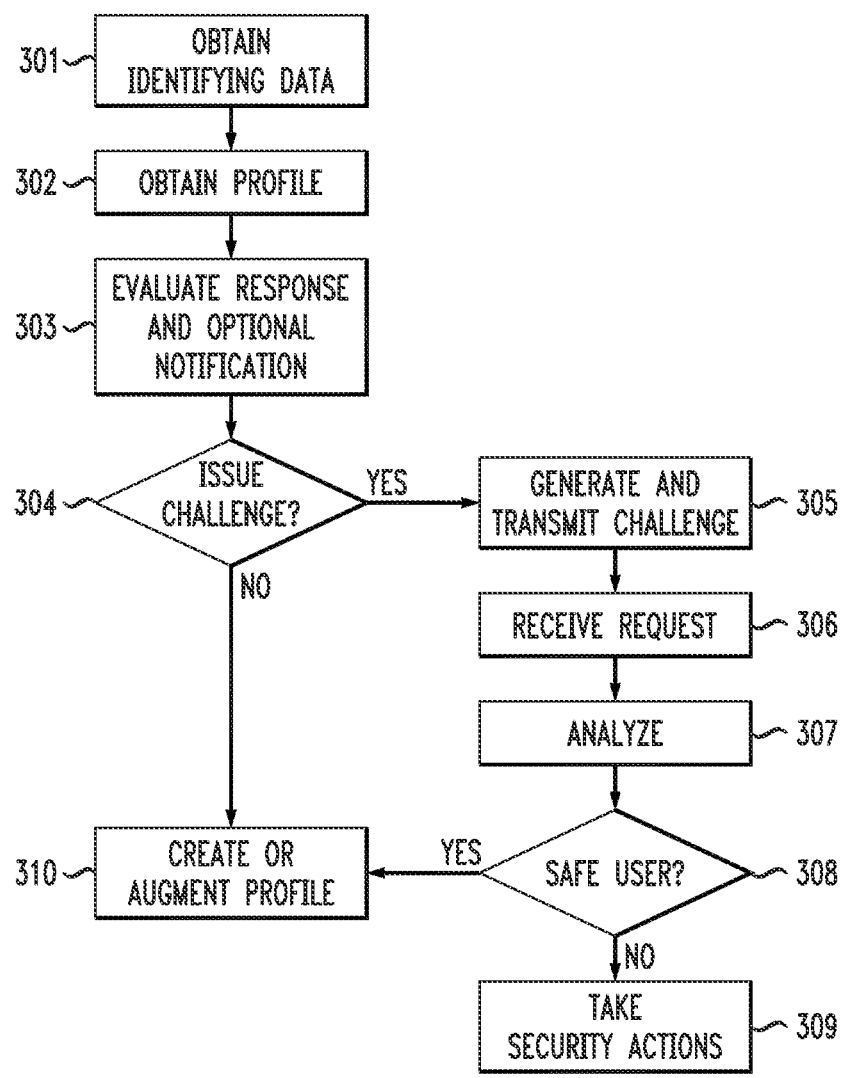

FIG. 3 shows the generation of a profile 123 or profile 124 stored in profile repository 122. In step 301, the proxy 121, the interaction unit 125 or the security assessor 127 obtains identifying data such as data associated with a modified artifact, a tracker, or a mail user agent. In step 302, the proxy 121, the interaction unit 125 or the security assessor 127 accesses the profile repository 122 to determine whether it has a profile matching the identifying data. If so, the accessing unit obtains a copy of at least part of the profile as part of step 302. If there are multiple matching profiles, then one or more of these are received in response. If there is no matching profile, then a notification of this fact is received in response.

In step 303, the proxy 121, the interaction unit 125 or the security assessor 127, having received the response, evaluates the response in the context of the identifying data. In step 304, the proxy 121, the interaction unit 125 or the security assessor 127 determines, based on the evaluation in step 303, whether to issue a challenge. If yes, then it proceeds to step 305, where a challenge corresponding to email 111 is generated and transmitted.

In 306, a response that is the same as request 113 is received in response to the challenge email 111, or a timeout occurs. In step 307, the reaction from step 306 is analyzed, and it is determined in step 308 whether the party that was sent the challenge is a safe user (as opposed to a likely corrupted user); if yes, then proceed to step 310, otherwise step 309. In step 309, a profile corresponding to an attacker is optionally generated and stored, and other security actions taken. In 310, the profile 123 or profile 124 is created if it did not exist already, or otherwise augmented with data associated with the evaluation in step 303, and potentially, related to the analysis in step 307.

Figure 4:
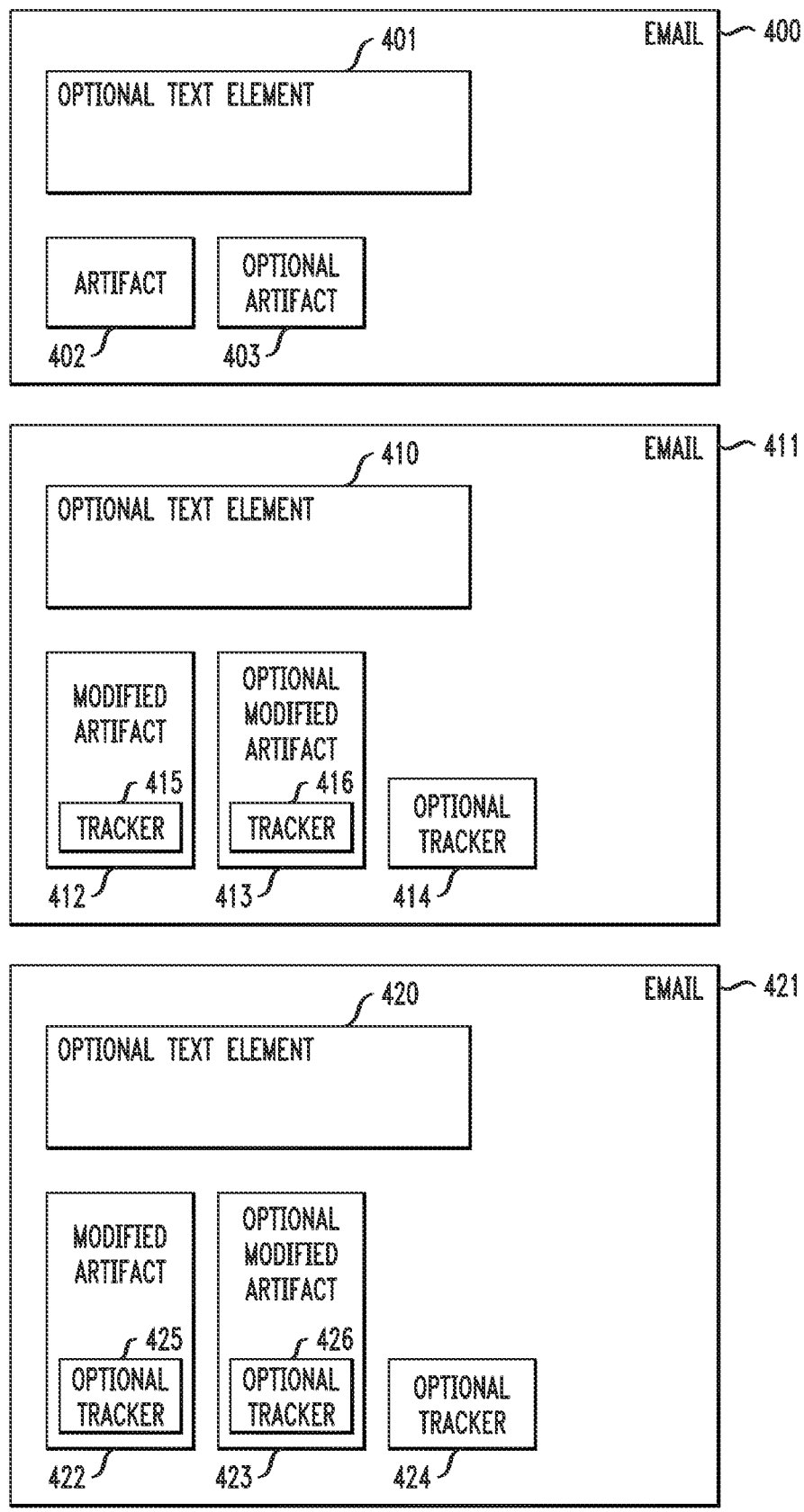
FIG. 4 shows examples of email messages with modified artifacts in an illustrative embodiment.

FIG. 4 shows three emails 400, 411 and 421. Email 400 is originated by an email sender 100, addressed to recipient 110. Email 400 comprises optional text element 401, artifact 402 and optional artifact 403. Email 400 is intercepted by proxy 121 of security system 120, and email 411 is transmitted in it its place to recipient 110. Email 411 comprises optional text element 410, modified artifact 412 and optional modified artifact 413. Here, optional text element 410 corresponds to optional text element 401. Modified artifact 412 corresponds to artifact 402, and optionally comprises tracker 415. Optional modified 413 corresponds to optional artifact 403, and optionally comprises tracker 416. Email 411 optionally but preferably comprises tracker 414 as well. When recipient 110 renders email 411, optional tracker 414 causes a communication to interaction unit 125 of security system 120, where the communication is associated with an identifier corresponding to email 411.

When recipient 110 interacts with modified artifact 412, optional tracker 415 causes a communication to interaction unit 125 of security system 120, where the communication is associated with at least one of an identifier corresponding to email 411 and an identifier associated with modified artifact 412. Similarly, if recipient 110 interacts with optional modified artifact 413, optional tracker 416 causes a communication to interaction unit 125 of security system 120, where the communication is associated with at least one of an identifier corresponding to email 411 and an identifier associated with modified artifact 413. Preferably, the communications also contain data associated with the information stored on hardware associated with recipient 110, such as one or more cookies, user agent information, and more.

Assume that recipient 110 forwards at least part of email 411 to second recipient, not pictured herein. Proxy 121 of security system 120 intercepts the outgoing email 411 and replaces it with email 421. Here, email 421 is transmitted to the second recipient. Email 421 comprises optional text element 420, modified artifact 422 and optional modified artifact 423. Here, optional text element 420 corresponds to optional text element 410. Modified artifact 422 corresponds to artifact 412, and optionally comprises tracker 425. Optional modified artifact 423 corresponds to optional artifact 413, and optionally comprises tracker 426. Email 421 optionally but preferably comprises tracker 424 as well.

When the second recipient renders email 421, optional tracker 424 causes a communication to interaction unit 125 of security system 120, where the communication is associated with an identifier corresponding to email 421. When the second recipient interacts with modified artifact 422, optional tracker 425 causes a communication to interaction unit 125 of security system 120, where the communication is associated with at least one of an identifier corresponding to email 421 and an identifier associated with modified artifact 422.

Similarly, if the second recipient interacts with optional modified artifact 423, optional tracker 426 causes a communication to interaction unit 125 of security system 120, where the communication is associated with at least one of an identifier corresponding to email 421 and an identifier associated with modified artifact 423. Preferably, the communications also contain data associated with the information stored on hardware associated with second recipient, such as one or more cookies, user agent information, and more. Data related to the emails, the artifacts and the trackers are stored by the security service 120, such as in repository 126, or are encoded in the modified artifacts and trackers, or both.

Figure 5:
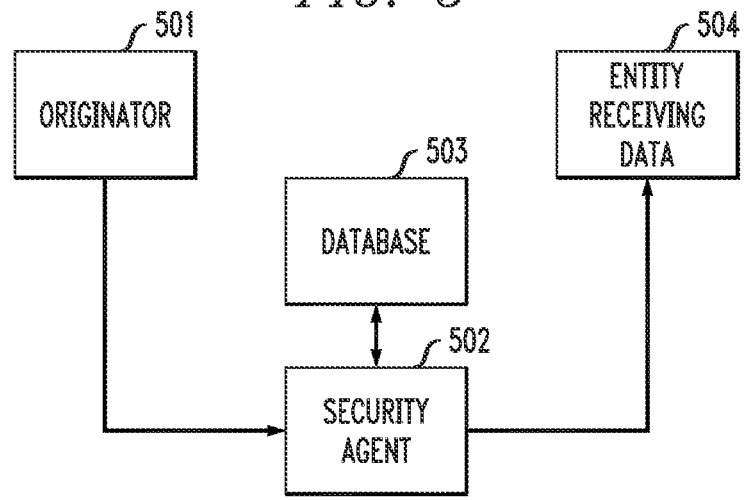
FIGS. 5 and 6 are block diagrams of other information processing systems configured with functionality for artifact modification and associated abuse detection in respective illustrative embodiments.

FIG. 5 shows an originator 501 transmitting data that is intercepted by security system agent 502, such as interaction unit 125, proxy 121 or other units associated with security system 120. The originator may be an email sender 100, a recipient 110 or another party associated with the security service 120. The security system agent 502 retrieves data from a database 503 that may be a cloud storage system, an internal database containing profile data, or other such repository. The security system agent then sends data, such as an email, a response to a request, or a challenge, to entity 504, which can be the same as originator 501, another party that originator 501 wishes to interact with, or an admin or a unit for logging of security events.

Figure 6:
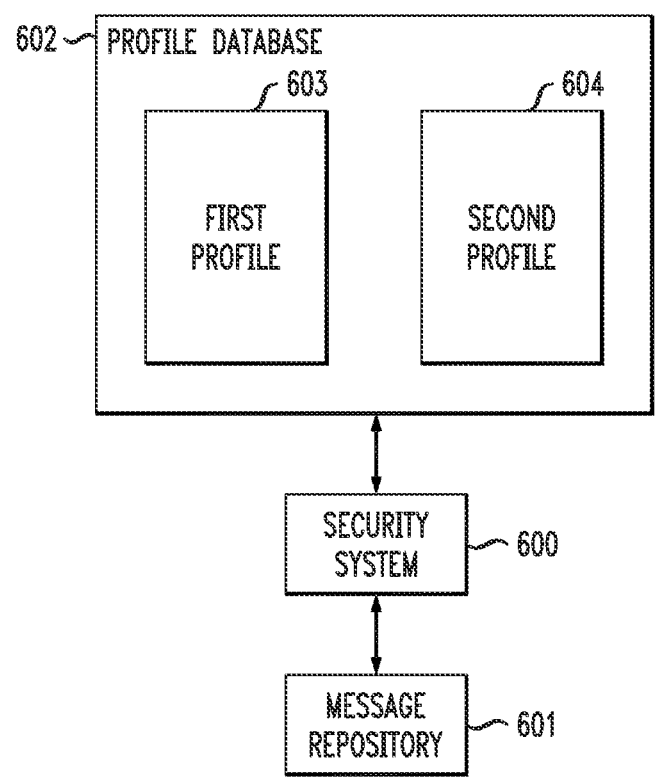

FIG. 6 shows a security system 600 connected to a message repository 601, which is typically an on-premises storage, an inline unit of a communication system such as an MTA or a gateway, or a cloud storage unit. Security system 600 accesses at least one message stored by message repository 601, and requests data from profile database 602, which comprises a first profile 603 relating to messaging, such as the transmission of emails or SMSs, and a second profile 604 relating to web requests, storing, for example data associated to the headers generated as a result of a user or his or her software agent requesting or providing data using a GET request or PUT request. Security system 600 uses the retrieved data from profile database 602 to determine whether to make a modification to one or more messages associated with message repository 602, and to optionally determine what type of modification to make.

The actions carried out by security system 600 relating to message repository 601 are performed periodically, on demand such as in response to an indication received by security system 600 from message repository 601, on demand based on a request or indication received from a third party (not shown in the figure), based on other events detected by security system 600. One example such event is the detection of an attempted attack on a first user, resulting in the scrutiny of messages related to a second user, where the first and second users may have interacted; may be part of the same organization or associated organizations; or may have no relation at all. The security system 600 makes at least one modification to at least one message associated with message repository 601, where example modifications comprise deleting a message; rewriting a message by modifying contents such as artifacts, modified artifacts or text; moving a message from one folder to another, including to or from a folder associated with quarantine; generating a warning message, and marking a message as being one of a high-priority message, a dangerous message, a read message and an unread message.

FIG. 7 shows a risk computation. In step 701, security system 600 receives a message identifier associated with an email 102 sent to recipient 110, where the message comprises data embedded in a tracker or a modified artifact 112. In step 702, security system 600 retrieves a profile 123 from profile repository 122 which may be the same as profile database 602, where the retrieved profile 123 is associated with the received message identifier. An example message identifier is a unique number that is part of a URL that represents the modified artifact 112. In step 703, security system 600 receives one or more identifiers associated with a user, a user device, the network of the user, the time zone of the user, and more. These identifiers are also referred to as identity data, where example identity data comprise cookies, IP data, geolocation data, user agent data, mail user agent data, carrier data, and more.

In step 704, security system 600 computes a risk score. In step 705, security system 600 computes a confidence score. In step 706, security system 600 compares the computed risk score to a first threshold, and continues to step 707 if the computed risk score exceeds the first threshold, otherwise to step 709. In step 707, security system 600 compares the computed confidence score to a second threshold, and continues to step 708 if the computed confidence score exceeds the second threshold, otherwise to step 709. In step 708, security system 600 initiates a security action. In step 709, security system 600 performs additional processing. Step 709, in one embodiment, comprises additional comparisons of the computed risk score and the computed confidence score to a third and a fourth threshold.

FIG. 8 shows a high-level illustration of the transmission of an email from a sender S 801 to a recipient R 807. Sender S 801 transmits a message 802 comprising an artifact A 803, addressed to a recipient R 807, and is intercepted by intercepting unit 804. Intercepting unit 804 identifies artifact A 803 in message 802, and replaces artifact A 803 with an artifact X 806, resulting in modified message 805 that comprises artifact X 806 instead of artifact A 803. This is transmitted to recipient R 807. Intercepting unit 804 transmits artifact A 803, information relating to artifact X 806, information about sender S 801 and information about recipient R 807 to central unit 809. Central unit 809 stores this information in storage 810. Recipient R 807 optionally generates a request 811 related to message 802 and artifact X 806, where request 811 is transmitted to central unit 809.

Central unit 809 retrieves stored information from storage 810, and determines that request 811 of artifact X 806 is related to the stored information relating to artifact X 806 is related to a message 802 sent from sender S 801 to recipient R 807. In this example, the request 811 is determined to be associated with recipient R 807 based on profile information collected by central unit 809 in response to the receipt of request 811, which is compared with previously stored information related to recipient R 807. In another case, central unit 809 could have determined that there is no such correspondence.

Based on determining that the originator of request 811 is not anomalous, central unit 809 transmits a response 812 comprising artifact A 803 to the recipient R 807, where artifact A 803 is rendered or otherwise engaged with. If the characterization of the requestor identifies a likely attack, the system takes a security action. As described previously, all email in a protected user's email account is secured—both the incoming and outgoing email. The system also protects all locally saved attachments of these users—e.g., attachments that the protected user saves on his/her computer. Moreover, all incoming email of all other users that comes from protected users will also be secured, as previously described.

One benefit of the disclosed technology is that it provides methods for a security system to identify a likely threat, as described in detail using various exemplary embodiments above, and then to identify the traffic associated with a corrupted node leading up to the point in time of the detection of the corruption. The system determines what emails and other types of communication, prior to the detection time, are high-risk events. What constitutes a high-risk event preferably is assessed in the context of the classified nature of the detected risk; for example, if the security system classifies the risk as likely to be associated with malware running on the corrupted computer, then the system will scrutinize historical events that are associated with a greater risk of malware infection, such as incoming messages with attachments and incoming messages with URLs that are not trusted. This is possible if the corrupted user is a protected user.

Although the system avoids abuse from taking place by replacing artifacts with modified artifacts, and scrutinizing the data associated with the artifacts, it is well understood that this is not likely to protect against all threats, as some may not be detected in time. By scanning for the threats again at the time of known corruption, the system has access to more information about threats than it did at the time of the actual compromise, and thus, there is an increased chance of detection. The system can also analyze web browsing logs, USB access logs, dropbox activity, and more, in order to pinpoint the likely triggering event leading to the corruption. Similarly, if the classified threat is that of phishing, i.e., credential theft, then the system scans for events that are a greater risk of constituting such threats. If a likely triggering event is found, information about this is used to improve the protection of users onwards. To some extent, this is automated, e.g., by generation of new signatures and addition of new blacklists, or modification of existing whitelists; or using manual effort by one or more admins.

In addition, the system scans all activity, especially occurring after a believed corruption event, if detected, but otherwise for some set period of time, such as two weeks back, where this time period can be informed by external events, anomalies detected on the system, or using a simple rule that always goes back some fixed amount of time. All activity during this time period is scrutinized, at least in part using automated algorithms, to detect risks arising from the corruption of the detected corrupted device or account. For example, when an attacker corrupts a user's computer or account, he typically collects information and/or attempts to transmit messages to users associated with the corrupted party. The system identifies information that is likely to have been stolen, e.g., by reviewing logs of accesses to modified artifacts, renderings of emails, and transmission of messages; and also performs analysis identifying the meaning of these, as described above. An example meaning would be a likely search for messages to/from a CFO associated with the organization of the corrupted account or device, and another meaning would be the transmission of weaponized attachments to all users who are direct reports of the person whose account or computer was corrupted.

The information and the meaning are important for the system for at least two reasons. For one, it allows automated scrutiny of potentially affected accounts and computers, and traffic associated with these; thereby allowing for a transitive closure of the search for high-risk activities and contexts. For another, it is important to generate reports describing the nature of the threat, and, in addition, details on how the threat was either addressed or not, and the consequences of the corruption. This is done both relative to internal and external parties, where an internal party is another employee of the affected organization, or other computers or accounts belonging to or being accessible by the party known or believed to have been corrupted; an external party is a vendor, a service provider, an employer, etc., of the corrupted party, or a user in an apparent trust relationship with the user believed to be corrupted. Trust relationships are determined in various ways, such as by identifying large volumes of interaction between users, repeated interaction of a type that is associated with high-risk actions, such as transmitting invoices, and using a graph of employee and collaborator relationships, where some of this information is available using LDAP, and other is available using analysis of historical traffic logs.

In some embodiments, a security system or other type of apparatus comprises at least one processing device comprising a processor coupled to a memory. For example, the one or more processing devices can be configured to implement an analysis unit and/or one or more other modules or components of the security system for providing artifact modification and associated abuse detection as disclosed herein.

In such an embodiment, the one or more processing devices are illustratively configured to identify artifacts in a plurality of messages of an account of a user, and to replace the identified artifacts in the messages with respective modified artifacts while also maintaining in access-controlled storage at least information related to the identified artifacts. The one or more processing devices receive from a requestor a request for a given one of the identified artifacts that has been replaced with a corresponding modified artifact, and determine a profile of the requestor based at least in part on the request. The one or more processing devices make a security determination based at least in part on the determined profile, and take at least one automated action based at least in part on the security determination.

In embodiments of this type, references to "while also maintaining" are intended to be broadly construed, and should not be viewed as being limited to any strict or immediate temporal concurrence. For example, the replacement of the identified artifacts can occur at various times after which at least the information related to the identified artifacts is stored in the access-controlled storage.

Also, references to a "request" for an artifact are similarly intended to be broadly construed. For example, requesting an artifact in some embodiments can include sending a message, forwarding a message, copying a message, or taking some other action that references a modified artifact.

The plurality of messages in some embodiments comprise respective email messages of an email account of a user, although it is to be appreciated that a wide variety of other types of messages and accounts can be used. Various entities can perform the operation of identifying artifacts. For example, the entity can comprise an entity that has access to received messages of the account. As another example, the entity can comprise a proxy that does not necessarily have access to received messages of the account. Numerous other arrangements of one or more entities are possible.

In some embodiments, the given artifact comprises an attachment of its corresponding message, although numerous other types of artifacts, and combinations of multiple artifacts, possibly of different types, can be used. The term "artifact" as used herein is therefore intended to be broadly construed, so as to encompass, for example, files, images and other types of data objects, as well as URLs and other types of links.

Replacing the identified artifacts with respective modified artifacts illustratively comprises replacing at least a subset of the identified artifacts with at least respective links to those identified artifacts, although many other arrangements are possible. For example, the identified artifacts can be replaced by links and images. Also, the replaced artifact can comprise a file or other data object that itself comprises one or more links.

In some embodiments, determining a profile of the requestor based at least in part on the request comprises determining the profile along each of a plurality of distinct dimensions including at least an automation dimension providing one or more indicators of automation associated with the request, and one or more of a device dimension comprising device data associated with the request and an environmental dimension comprising environmental data associated with the request. Examples of such automation, device and environmental dimensions were previously described.

The profile of the requestor in some embodiments is determined based at least in part on timing data relating to delivery of one of more of the messages and corresponding requests for one or more artifacts associated with the one or more messages. Such timing data can be part of one or more of the above-noted dimensions, such as the automation dimension, or can be utilized separately.

In some embodiments, making a security determination based at least in part on the determined profile comprises comparing the determined profile with an additional profile stored in association with the given artifact, and making the security determination based at least in part on a result of the comparing. The additional profile can be encoded in the modified artifact, and/or stored in association with the artifact in other ways.

Additionally or alternatively, making a security determination based at least in part on the determined profile more particularly comprises computing a risk score for the request, and identifying the request as an anomalous request responsive to the risk score exceeding a specified threshold. Various detailed examples of risk score computation that can be used in such embodiments were previously described herein.

In some embodiments, taking at least one automated action based at least in part on the security determination comprises granting or denying the request based at least in part on the security determination.

Other arrangements are possible. For example, taking at least one automated action based at least in part on the security determination can comprise providing a deliberately falsified artifact, also referred to herein as a "fake artifact," in place of the corresponding identified artifact responsive to the request.

As another example, taking at least one automated action based at least in part on the security determination can comprise classifying the request as being associated with a particular type of attack.

The given artifact in some embodiments is replaced with a corresponding modified artifact that comprises an encrypted version of the given artifact. In an arrangement of this type, the information related to the given artifact that is maintained in the access-controlled storage comprises a cryptographic key.

Some embodiments are configured to implement a process that includes the following steps:

1. Identify devices associated with users, whether protected users or users that protected users receive email from or send email to. These identities are recorded. The identification is made using cookies, user agent, and stored objects.

2. Identify discrepancies from the recorded identities, indicating a risk of a new device being used.

3. Identify signs of scripting or signs of new methods of transmitting messages, as well as anomalies of how the messages are sent. These are indicative of risk of malware infection directing the actions of a corrupted device.

4. Challenge users corresponding to increased risk to resolve high-risk situations and enroll new device identities (corresponding to step 1).

Such embodiments utilize the above-listed steps to detect ATO risk. When there is an identified likely ATO, illustrative embodiments perform a substitution of data (attachment and content) so that:

a. Data sent to a corrupted user is replaced with fake data that is not sensitive, but which potentially confuses the attacker.

b. Data sent from a corrupted user is scrutinized and optionally removed or replaced to avoid propagation of dangerous material.

Furthermore, attacker devices are "tagged" so that they can be recognized later on, similar to how user devices are identified (step 1).

Another aspect of illustrative embodiments involves generating audit data that can be used to determine, after the fact, what resulted in a corruption, and what other devices may also be affected beyond one that has already been determined to be a likely victim of ATO.

One aspect used to identify devices, and to enable the substitution of data as described above, is to replace artifacts (e.g., attachments and other content) with "modified artifacts", where a modified artifact is illustratively used to (a) perform identification, and (b) based on the outcome of the comparison with recorded identities, present data related to the modified artifact, where this data can be the original data of the artifact or a replaced version. The same technique is used in challenges, where responding to a challenge involves engaging with an artifact, and potentially performing additional tasks.

The goal in some embodiments is to preserve, as far as is possible, the existing user experience. Users will simply click on attachments, click on hyperlinks, engage with websites and documents, and use standard tools such as 2FA tools. This is a benefit of the disclosed technology, and is hard to achieve: it is undesirable to modify the user experience in a dramatic manner, and beneficial to address the problem while only using techniques that (to the user) are well understood. The backend illustratively adds functionality that is non-standard, and the combination of the tools deployed in a given embodiment is also non-standard, but such an embodiment can maintain a simple and already understood user experience while addressing the most common threat vectors related to ATO and related attacks.

Illustrative embodiments provide these and numerous other significant advantages in a wide variety of ATO-related contexts. For example, some embodiments are configured to combat ATO-based fraud that involves sending a malicious message from a corrupted account to an intended victim, with the goal of making that person perform a task.

These embodiments address the problem of detecting messages coming from (or going to) a system that has been the victim of an ATO attack.

Some embodiments are therefore particularly directed to the context of message-related ATO. In the context of messaging systems, collection in illustrative embodiments is applied using methods that are layered on top of the existing user experience, while avoiding any significant degradation of the user experience.

Illustrative embodiments implement approaches that are applicable to two parties (both sender and receiver of a message). Such embodiments can therefore be configured, for example, to detect when a recipient of a message has been compromised.

Some embodiments utilize machine identifiers that cannot be read by a party with access to an account or device, and add interaction that helps detect ATO of recipient, as well as a challenge mechanism.

In some embodiments, a compromise of an account does not include the compromise of the associated device. In such cases, it is not possible for the attacker to determine the cookie or other identifying information associated with the compromised account. For example, simply having access to an email account does not permit a user or attacker to read cookies stored on the associated device.

Also, in the context of an attack that involves a compromised device, traditional HTML cookies can be stolen by the attacker. However, illustrative embodiments remedy this problem by not using only HTML cookies but also cookies based on hidden information that the attacker cannot harvest.

Some types of cookies such as cache cookies require knowledge of secret information in order to read the cookie of a user. This is because the cache cookie is based on querying for information on the client machine, where one has to know the query in order to access the cookie repository. The disclosed technology, in one embodiment, uses cache cookies or similar technology to recognize a device. An attacker compromising such a device would not be able to determine the cache cookie associated with the corrupted device, and would therefore not be able to replicate it.

The particular features and other advantages described above are examples presented in the context of illustrative embodiments, and therefore such features and advantages need not be present in other embodiments.

Illustrative embodiments include systems, methods, apparatus and computer program products comprising non-transitory storage media storing program code.

For example, in one embodiment a method for detecting account takeover risk comprises processing, by first proxy, a message comprising a first artifact, wherein the first artifact comprises at least one of a URL, an image, an attachment and a text segment; modifying, by the first proxy, the message by replacing the first artifact with a second artifact; storing in a repository, by the first proxy, information associating the second artifact to an account; receiving, by a second proxy, a request corresponding to the second artifact; retrieving from the repository, by the second proxy, information associated with the second artifact; determining, by the second proxy, information related to the request; comparing, by the second proxy, the retrieved information associated with the second artifact and the information related to the request; and performing a classification, by the second proxy, based at least in part on the results of the comparison.

The classification illustratively indicates a risk assessment comprising at least one of a low risk, a medium risk, a high risk.

The classification may indicate a risk assessment comprising at least one of a risk of phishing, a risk of malware, a risk of theft, a risk of display name deception, and a risk of account compromise.

A score indicating the confidence in the classification is illustratively generated by the second proxy.

A security action is taken in some embodiments based at least in part on the classification, the security action comprising at least one of permitting access, blocking access, giving access to a data different from the data associated with the first artifact, conveying a warning, generating a log entry, initiating a challenge, and generating an alert.

The account illustratively corresponds to one of a recipient of the message and a sender of the message.

A security system illustratively comprises the first proxy and the second proxy.

The classification in some embodiments is performed at least in part based on a tracker. For example, the modified message illustratively comprises the tracker.

The modified message in some embodiments comprises information associated with the tracker.

The request in some embodiments comprises information associated with the tracker.

The message in some embodiments comprises an email, although the disclosed techniques are applicable to a wide variety of other types of messages.

In some embodiments, the message processed by the first proxy is accessed by the first proxy from a cloud storage facility.

The first proxy in other embodiments obtains the message processed by the first proxy from an inline filter placed on the delivery path to the message recipient.

The classification in some embodiments is made based on at least a threshold number of comparisons corresponding to at least a threshold number of requests, where the at least a threshold number of requests are made within a period of time not exceeding a threshold time period.

Some illustrative embodiments disclosed herein are configured to perform a process comprising at least a subset of the following operations:

1. Profiling a requestor of an artifact, determining whether the profile is anomalous, and based on the determination deciding whether to serve the artifact. A profile can also be generated based simply on observing an email sent from a user (as opposed to a requestor of an artifact).

2. Creating a profile that is a combination of information about the device, its environment, and indications of automation. Here, indications of automation include information in the header(s) of the request(s) as well as timing data related to the delivery of one or more messages and the subsequent access requests to artifacts associated with the message(s).

3. Determining a likely attack associated with a detected anomaly, where this determination is based on information about the device, environment, automation, and on patterns associated with multiple requests.

4. Based on the profiling of a user and the potential detection of an anomaly, determining an action. Here, the action may be to deliver a message, block a message, generate a warning, transmit the requested artifact, and/or transmit a fake artifact in place of the requested artifact. Other actions include creating or augmenting a profile, whether related to a sender, a recipient, or an attacker.

5. Generating log data related to attacks, where the log data can be used to prioritize law enforcement efforts or other security actions.

As another example, an illustrative embodiment can be implemented in the form of a security system comprising a message sender unit, a message recipient unit, an analysis unit, and a storage unit. The analysis unit identifies at least one artifact associated with a message transmitted by a message sender unit for a message recipient unit, and replaces the at least one artifact with at least one modified artifact and causes the storage, by the storage unit, of information related to the at least one artifact. Accordingly, the artifact itself need not be stored. For example, the modified artifact in some embodiments comprises an encrypted version of the artifact, where some key information is stored as the information related to the at least one artifact.

In response to at least one request related to at least one modified artifact, the analysis unit determines a first profile associated with the at least one request, and compares the first profile to a second profile, where the second profile is at least one of stored by the storage unit and encoded in the modified artifact.

Based on the comparison of the first profile and the second profile, a security determination is made, and based on the security determination, an action is taken, where the action comprises at least one of transmitting the at least one artifact, transmitting at least one element purported to be the at least one artifact, transmitting a warning, initiating a challenge, generating and storing a profile, modifying a stored profile, and classifying the at least one request as at least one of a legitimate request, a request associated with a phishing attack, a request associated with a malware attack, a request associated with the theft of a device, and a request associated with undesirable forwarding of messages.

In some embodiments, the challenge causes the collection, by the analysis unit, of additional information, comprising at least one of additional profile data, data related to biometric authentication, data related to second factor authentication, and data related to information known by the legitimate user.

The warning is illustratively transmitted to at least one of the sender of the message, the recipient of the message, an admin associated with the sender of the message, an admin associated with the recipient of the message and an admin associated with law enforcement. For example, the warning sent to at least one of the sender of the message and the recipient of the message is transmitted to a device that is determined not to be corrupted by an attacker.

In some embodiments, the classification is based on at least one of comparison of device data associated with the first profile and device data associated with the second profile; comparison of environmental data associated with the first profile and environmental data associated with the second profile; comparison of automation data associated with the first profile and automation data associated with the second profile; analysis of timing data of multiple requests; analysis of at least one topic associated with at least one request.

The action illustratively comprises transmitting the at least one artifact in response to the comparison not resulting in an anomaly.

The classification in some embodiments uses pattern matching to determine whether the request is associated with a first known attack method or a second known attack method.

In some embodiments, the first profile is associated with an attacker, and the system determines, based on comparing the first profile whether the attacker is likely to correspond to a first known attacker or a second known attacker.

An example of the above-noted security action includes filtering at least one future message, although numerous other security actions may be used.

In some embodiments wherein email messages are digitally signed, the system may remove or replace a digital signature associated with the message in conjunction with the replacement of an artifact with a modified artifact. If a new digital signature is included, this is preferably generated using a private key/public key pair associated with the security system, where a computer associated with the recipient of the message can verify that the public key used is known to the computer, is certified by a trusted party, or is otherwise authentic.

These and other particular features of illustrative embodiments are presented by way of example only, and should not be viewed as limiting in any way.

The security system and other processing entities described herein may be part of an information processing system. A given such entity in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, a microcontroller, an application-specific integrated circuit (ASIC), a field-programmable gate array (FPGA), a central processing unit (CPU), an arithmetic logic unit (ALU), a digital signal processor (DSP), a graphics processing unit (GPU) or other similar processing device component, as well as other types and arrangements of processing circuitry, in any combination.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

Processing devices in a given embodiment can include, for example, laptop, tablet or desktop personal computers, mobile telephones, or other types of computers or communication devices, in any combination.

Communications between the various elements of an information processing system comprising processing devices associated with respective parties or other system entities may take place over one or more networks. Such networks can illustratively include, for example, a global computer network such as the Internet, a wide area network (WAN), a local area network (LAN), a satellite network, a telephone or cable network, a cellular network such as a 4G or 5G network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network such as a 4G or 5G network, a wireless network such as a WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA, a CPU, an ALU, a DSP, a GPU or other type of processing circuitry, as well as portions or combinations of such circuitry elements. The memory may comprise RAM, ROM, flash memory or other types of memory, in any combination.

Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM, flash memory or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines, such as operating system level virtualization infrastructure comprising Docker containers or other types of containers implemented using respective Linux kernel control groups. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and processing devices than those utilized in the particular illustrative embodiments described herein, and in numerous alternative ATO-related processing contexts. Combinations of the disclosed embodiments may be utilized to address various distinct security needs. Also, the particular types and configurations of system entities, processing devices and process operations can be varied in other embodiments. In addition, the particular assumptions made herein in the context of describing aspects of certain illustrative embodiments need not apply in other embodiments. These and numerous other alternative embodiments will be readily apparent to those skilled in the art.

What is claimed is:

1. An apparatus comprising:
at least one processing device comprising a processor coupled to a memory;
said at least one processing device being configured:
to identify artifacts in a plurality of messages of an account of a user;
to replace the identified artifacts in the messages with respective modified artifacts while also maintaining in access-controlled storage at least information related to the identified artifacts;
to associate one or more trackers with at least one of the plurality of messages, wherein in conjunction with at least a portion of said at least one of the plurality of messages being rendered by a given computing device, at least one of the one or more trackers collect data from the given computing device that is used to render at least a portion of said at least one of the plurality of messages;
to receive from a requestor a request for a given one of the identified artifacts in said at least one of the plurality of messages that has been replaced with a corresponding modified artifact;
to determine a profile of the requestor based at least in part on the request;
to make a security determination based at least in part on the determined profile and the data collected from the given computing device that is used to render at least a portion of said at least one of the plurality of messages; and
to take at least one automated action based at least in part on the security determination.

2. The apparatus of claim 1 wherein said at least one processing device implements an analysis unit of a security system.

3. The apparatus of claim 1 wherein the plurality of messages comprise respective email messages of an email account of a user.

4. The apparatus of claim 1 wherein the given artifact comprises an attachment of its corresponding message.

5. The apparatus of claim 1 wherein replacing the identified artifacts with respective modified artifacts comprises replacing at least a subset of the identified artifacts with at least respective links to those identified artifacts.

6. The apparatus of claim 1 wherein determining a profile of the requestor based at least in part on the request comprises determining the profile along each of a plurality of distinct dimensions including at least an automation dimension providing one or more indicators of automation associated with the request and one or more of a device dimension comprising device data associated with the request and an environmental dimension comprising environmental data associated with the request.

7. The apparatus of claim 1 wherein the profile of the requestor is determined based at least in part on timing data relating to delivery of one of more of the messages and corresponding requests for one or more artifacts associated with the one or more messages.

8. The apparatus of claim 1 wherein making a security determination based at least in part on the determined profile comprises:
comparing the determined profile with an additional profile stored in association with the given artifact; and
making the security determination based at least in part on a result of the comparing.

9. The apparatus of claim 8 wherein the additional profile is encoded in the modified artifact.

10. The apparatus of claim 1 wherein making a security determination based at least in part on the determined profile comprises:
- computing a risk score for the request; and
- identifying the request as an anomalous request responsive to the risk score exceeding a specified threshold.

11. The apparatus of claim 1 wherein taking at least one automated action based at least in part on the security determination comprises granting or denying the request based at least in part on the security determination.

12. The apparatus of claim 1 wherein taking at least one automated action based at least in part on the security determination comprises providing a deliberately falsified artifact in place of the corresponding identified artifact responsive to the request.

13. The apparatus of claim 1 wherein taking at least one automated action based at least in part on the security determination comprises classifying the request as being associated with a particular type of attack.

14. The apparatus of claim 1 wherein the given artifact is replaced with a corresponding modified artifact that comprises an encrypted version of the given artifact and the information related to the given artifact that is maintained in the access-controlled storage comprises a cryptographic key.

15. A method comprising:
- identifying artifacts in a plurality of messages of an account of a user;
- replacing the identified artifacts in the messages with respective modified artifacts while also maintaining in access-controlled storage at least information related to the identified artifacts;
- associating one or more trackers with at least one of the plurality of messages, wherein in conjunction with at least a portion of said at least one of the plurality of messages being rendered by a given computing device, at least one of the one or more trackers collect data from the given computing device that is used to render at least a portion of said at least one of the plurality of messages;
- receiving from a requestor a request for a given one of the identified artifacts in said at least one of the plurality of messages that has been replaced with a corresponding modified artifact;
- determining a profile of the requestor based at least in part on the request;
- making a security determination based at least in part on the determined profile and the data collected from the given computing device that is used to render at least a portion of said at least one of the plurality of messages; and
- taking at least one automated action based at least in part on the security determination;
- wherein the method is performed by at least one processing device comprising a processor coupled to a memory.

16. The method of claim 15 wherein the profile of the requestor is determined based at least in part on timing data relating to delivery of one of more of the messages and corresponding requests for one or more artifacts associated with the one or more messages.

17. The method of claim 15 wherein making a security determination based at least in part on the determined profile comprises:
- comparing the determined profile with an additional profile stored in association with the given artifact; and
- making the security determination based at least in part on a result of the comparing.

18. A computer program product comprising a non-transitory processor-readable storage medium having stored therein program code of one or more software programs, wherein the program code when executed by at least one processing device causes said at least one processing device:
- to identify artifacts in a plurality of messages of an account of a user;
- to replace the identified artifacts in the messages with respective modified artifacts while also maintaining in access-controlled storage at least information related to the identified artifacts;
- to associate one or more trackers with at least one of the plurality of messages, wherein in conjunction with at least a portion of said at least one of the plurality of messages being rendered by a given computing device, at least one of the one or more trackers collect data from the given computing device that is used to render at least a portion of said at least one of the plurality of messages;
- to receive from a requestor a request for a given one of the identified artifacts in said at least one of the plurality of messages that has been replaced with a corresponding modified artifact;
- to determine a profile of the requestor based at least in part on the request;
- to make a security determination based at least in part on the determined profile and the data collected from the given computing device that is used to render at least a portion of said at least one of the plurality of messages; and
- to take at least one automated action based at least in part on the security determination.

19. The computer program product of claim 18 wherein the profile of the requestor is determined based at least in part on timing data relating to delivery of one of more of the messages and corresponding requests for one or more artifacts associated with the one or more messages.

20. The computer program product of claim 18 wherein making a security determination based at least in part on the determined profile comprises:
- comparing the determined profile with an additional profile stored in association with the given artifact; and
- making the security determination based at least in part on a result of the comparing.

\* \* \* \* \*